United States Patent
Ito et al.

(10) Patent No.: US 7,462,382 B2
(45) Date of Patent: Dec. 9, 2008

(54) OPTICAL COMPENSATING SHEET, PRODUCTION METHOD THEREOF, OPTICAL FILM, AND POLARIZING PLATE AND LIQUID CRYSTAL DISPLAY DEVICE USING THE SAME

(75) Inventors: Yoji Ito, Minami-Ashigara (JP); Tomokazu Yasuda, Minami-Ashigara (JP); Nobutaka Fukagawa, Minami-Ashigara (JP); Makoto Tanaka, Minami-Ashigara (JP); Keiji Mihayashi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 277 days.

(21) Appl. No.: 10/535,248

(22) PCT Filed: Dec. 16, 2003

(86) PCT No.: PCT/JP03/16128

§ 371 (c)(1),
(2), (4) Date: May 18, 2005

(87) PCT Pub. No.: WO2004/055558

PCT Pub. Date: Jul. 1, 2004

(65) Prior Publication Data

US 2006/0040070 A1    Feb. 23, 2006

(30) Foreign Application Priority Data

Dec. 16, 2002 (JP) ............................. 2002-364034
Mar. 26, 2003 (JP) ............................. 2003-085455

(51) Int. Cl.
G02F 1/13363 (2006.01)
B05D 1/34 (2006.01)

(52) U.S. Cl. .................... 428/1.33; 428/1.54; 427/164; 349/117

(58) Field of Classification Search .................. 428/1.3, 428/1.33, 1.5, 1.54; 427/162, 164; 349/117
See application file for complete search history.

(56) References Cited

U.S. PATENT DOCUMENTS

| 5,498,510 | A | 3/1996 | Ogawa |
| 5,624,974 | A * | 4/1997 | Onishi et al. .................. 522/96 |
| 6,151,169 | A | 11/2000 | Kim |
| 6,330,108 | B1 | 12/2001 | Nishikouji et al. |
| 6,417,904 | B1 | 7/2002 | Yamaoka et al. |
| 6,476,892 | B2 | 11/2002 | Aminaka |
| 7,052,745 | B2 * | 5/2006 | Negoro et al. ................. 428/1.1 |
| 7,105,270 | B2 * | 9/2006 | Fujita et al. ............... 430/270.1 |
| 2002/0048639 | A1 * | 4/2002 | Negoro et al. ................. 428/1.2 |
| 2002/0168511 | A1 * | 11/2002 | Schneider et al. ........... 428/333 |
| 2004/0036828 | A1 | 2/2004 | Aminaka et al. |
| 2007/0132139 | A1 | 6/2007 | Aminaka et al. |

FOREIGN PATENT DOCUMENTS

| EP | 0 537 779 A1 | 4/1993 |
| EP | 0 911 656 A2 | 4/1999 |
| EP | 1 079 244 A2 | 2/2001 |
| JP | A-5-127305 | 5/1993 |
| JP | 7-136578 | 5/1995 |
| JP | A-7-136578 | 5/1995 |
| JP | 11-148080 A | 6/1999 |
| JP | A-2000-9936 | 1/2000 |
| JP | 2001-330725 | 11/2001 |
| JP | 2002-71949 A | 3/2002 |
| JP | 2002-71955 A | 3/2002 |
| JP | 1 235 106 A2 | 8/2002 |
| JP | 2002-236215 A | 8/2002 |
| JP | A-2002-311577 | 10/2002 |
| TW | 451071 | 8/2001 |
| TW | 451078 | 8/2001 |

OTHER PUBLICATIONS

JPO Website Machine English Translation of JP2001-330725A, Ogawa, Nov. 30, 2001.*

* cited by examiner

Primary Examiner—Keith D. Hendricks
Assistant Examiner—Sophie Hon
(74) Attorney, Agent, or Firm—Buchanan Ingersoll & Rooney PC

(57) ABSTRACT

The present invention provides a method for producing an optical compensating sheet, comprising a step of simultaneously coating at least two coating solutions on a transparent support, wherein at least one of the coating solutions simultaneously coated in that step contains a liquid crystalline compound and another coating solution contains a surface active agent; an optical compensating sheet obtained by this method; an optical film comprising a support having thereon an optically anisotropic layer formed containing a liquid crystalline compound and a fluoroaliphatic group-containing copolymer containing a repeating unit derived from a fluoroaliphatic group-containing (meth)acrylate monomer and a repeating unit derived from a polyoxyalkylene (meth)acrylate monomer; and a polarizing plate and a liquid crystal display device each using the optical compensating sheet or optical film.

18 Claims, No Drawings

OPTICAL COMPENSATING SHEET, PRODUCTION METHOD THEREOF, OPTICAL FILM, AND POLARIZING PLATE AND LIQUID CRYSTAL DISPLAY DEVICE USING THE SAME

TECHNICAL FIELD

The present invention relates to an optical compensating sheet, a production method thereof, an optical film, and a polarizing plate and a liquid crystal display device each using the optical compensating sheet or optical film.

BACKGROUND ART

An optical film where a liquid crystal compound is highly oriented and fixed is recently overspread in various uses such as optical compensating film of liquid crystal display devices, brightness enhancing film, and optical correction film of projection display devices. In particular, the progress as an optical compensating film of liquid crystal display devices is remarkable.

The liquid crystal display device comprises polarizing plates and a liquid crystal cell.

In a TN-mode TFT liquid crystal display device which is predominating at present, an optical compensating sheet is interposed between a polarizing plate and a liquid crystal cell to realize a liquid crystal display device having high display grade. However, this method has a problem that the thickness of the liquid crystal display device itself becomes large.

JP-A-1-68940 (the term "JP-A" as used herein means an "unexamined published Japanese patent application") discloses an invention where an elliptically polarizing plate comprising a polarizing film having a retardation plate on one surface and a protective film on another surface is used and thereby the front contrast can be elevated without increasing the thickness of the liquid crystal display. However, the retardation film (optical compensating sheet) of this invention cannot provide a sufficiently high effect of improving the view angle and the display grade of the liquid crystal display device disadvantageously decreases.

JP-A-7-191217 and EP-A-0911656 disclose an invention where an optical compensating sheet comprising a transparent support having provided thereon an optically anisotropic layer formed of a discotic (disc-like) compound is used directly as the protective film of the polarizing plate and thereby the problem regarding the view angle is overcome without increasing the thickness of the liquid crystal display device.

In conventional techniques, the optical compensating sheet has been studied by mainly taking account of a small- or medium-size liquid crystal display device of 15 inches or less. However, in recent years, a large-size liquid crystal display device of 17 inches or more having high brightness must be also taken into consideration.

When an optical compensating sheet according to conventional techniques is fit as the protective film on a polarizing plate of a large-size liquid crystal display device, unevenness is generated on the panel. This defect is not so distinct in a small- or medium-size liquid crystal display device. However, with the progress of a large-size liquid crystal display device having high brightness, it becomes necessary to further develop an optical film coping with the unevenness due to light leakage.

JP-A-11-148080 discloses a technique of improving the unevenness by incorporating a leveling agent into the polymerizable liquid crystal. However, this is found to be effective only when the polymerizable liquid crystal is oriented in homogeneous alignment, but cannot be applied to complicated orientations including hybrid alignment.

The optical compensating sheet using the discotic liquid crystalline molecule is generally produced by dissolving a discotic liquid crystalline molecule in a certain organic solvent to prepare a coating solution and coating the solution. However, this method has a problem that unevenness ascribable to the process from coating to drying is generated with high frequency and a sheet having uniform optical properties over a wide size range can be hardly ensured, as a result, the yield greatly decreases.

The generation of this unevenness is caused by the fluctuation in the layer thickness of coated layer, brought about due to uneven drying. Therefore, a method of adding a certain surface active agent to a coating solution of discotic liquid crystalline molecule to improve the coatability of coating solution and thereby inhibit the layer thickness from fluctuating at the drying is disclosed (see, for example, JP-A-9-230143 and JP-A-2001-330725). However, in this method, the orientation of surface active agent slowly proceeds to the air-liquid interface and the drying is completed before the coatability of coating solution is improved. Thus, a sufficiently high improving effect cannot be obtained.

DISCLOSURE OF THE INVENTION

An object of the present invention is to provide an optical compensating sheet comprising a support having thereon a liquid crystalline compound-containing layer, which is free of unevenness and favored with excellent optical uniformity in the sheet plane, and a production method thereof.

Another object of the present invention is to provide a polarizing plate and a liquid crystal display device, using the optical compensating sheet having excellent properties.

A still another object of the present invention is to provide means for optically compensating a liquid crystal cell by using a polarizing plate having an optical compensation function, and an optical film for use in the means.

In particular, an object of the present invention is to provide a method for displaying an image having a high image grade without causing unevenness even in a large-size liquid crystal display device, and an optical film for use therein.

These objects of the present invention can be attained by the following constitutions.

1. A method for producing an optical compensating sheet, comprising a step of simultaneously coating at least two coating solutions on a transparent support, wherein at least one of the coating solutions simultaneously coated in said step contains a liquid crystalline compound, and another coating solution of the coating solutions contains a surface active agent.

2. The method as described in the item 1, wherein the surface active agent is a fluorine-containing surface active agent.

3. The method as described in the item 2, wherein the surface active agent is a fluorine-containing copolymer.

4. The method as described in the item 3, wherein the surface active agent is a fluoroaliphatic group-containing copolymer containing a repeating unit derived from the following monomer (i) and a repeating unit derived from the following monomer (ii):

(i) a fluoroaliphatic group-containing monomer represented by the following formula [1], and (ii) a poly(oxyalkylene) acrylate and/or a poly(oxy-alkylene) methacrylate:

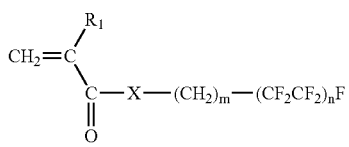

[1]

wherein $R_1$ represents a hydrogen atom or a methyl group, X represents an oxygen atom, a sulfur atom or —N($R_2$)—, m represents an integer of 1 to 6, n represents an integer of 2 to 4, and $R_2$ represents a hydrogen atom or an alkyl group having from 1 to 4 carbon atoms.

5. The method as described in the item 3, wherein the surface active agent is a fluoroaliphatic group-containing copolymer containing a repeating unit derived from the following monomer (i), a repeating unit derived from the following monomer (ii) and a repeating unit derived from the following monomer (iii):

(i) a fluoroaliphatic group-containing monomer represented by formula [1] described in the item 4, (ii) a poly (oxyalkylene) acrylate and/or a poly(oxy-alkylene) methacrylate, and (iii) a monomer copolymerizable with (i) and (ii) and represented by the following formula [2]:

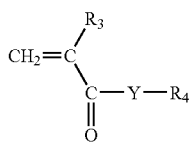

[2]

wherein $R_3$ represents a hydrogen atom or a methyl group, Y represents a divalent linking group, and $R_4$ represents a linear, branched or cyclic alkyl group having from 4 to 20 carbon atoms, which may have a substituent.

6. An optical compensating sheet produced by the method described in any one of the items 1 to 5.

7. An optical film comprising a support having thereon an optically anisotropic layer comprising a liquid crystalline compound, wherein said optically anisotropic layer comprises a fluoroaliphatic group-containing copolymer containing a repeating unit derived from the following monomer (i) and a repeating unit derived from the following monomer (ii):

(i) a fluoroaliphatic group-containing monomer represented by the following formula [1], and (ii) a poly(oxyalkylene) acrylate and/or a poly(oxy-alkylene) methacrylate:

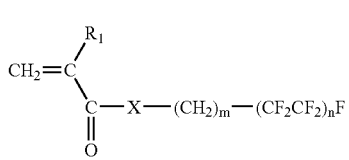

[1]

wherein $R_1$ represents a hydrogen atom or a methyl group, X represents an oxygen atom, a sulfur atom or —N($R_2$)—, m represents an integer of 1 to 6, n represents an integer of 2 to 4, and $R_2$ represents a hydrogen atom or an alkyl group having from 1 to 4 carbon atoms.

8. The optical film as described in the item 7, wherein said optically anisotropic layer comprises a fluoroaliphatic group-containing copolymer containing a repeating unit derived from the following monomer (i), a repeating unit derived from the following monomer (ii) and a repeating unit derived from the following monomer (iii):

(i) a fluoroaliphatic group-containing monomer represented by formula [1] described in the item 7, (ii) a poly(oxyalkylene) acrylate and/or a poly(oxy-alkylene) methacrylate, and (iii) a monomer copolymerizable with (i) and (ii) and represented by the following formula [2]:

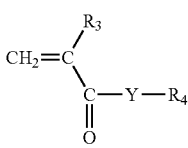

[2]

wherein $R_3$ represents a hydrogen atom or a methyl group, Y represents a divalent linking group, and $R_4$ represents a linear, branched or cyclic alkyl group having from 4 to 20 carbon atoms, which may have a substituent.

9. The optical film as described in the item 7 or 8, wherein said liquid crystalline compound is a discotic compound.

10. A polarizing plate comprising the optical compensating sheet described in the item 6 or the optical film described in any one of the items 7 to 9.

11. A liquid crystal display device comprising the optical compensating sheet described in the item 6 or the optical film described in any one of the items 7 to 9.

12. A polarizing plate comprising a polarizing film and protective films disposed on both sides of the polarizing film, wherein one of the protective films is an optical compensating sheet having an optically anisotropic layer comprising a liquid crystalline compound, and said optical compensating sheet is the optical compensating sheet described in the item 6.

13. A liquid crystal display device comprising a liquid crystal cell and two polarizing plates disposed on both sides of the liquid crystal cell, wherein at least one of the polarizing plates is the polarizing plate described in the item 10 or 12.

14. The liquid crystal display device as described in the item 13, wherein the liquid crystal cell is a TN-mode, bend alignment-mode or vertical alignment-mode liquid crystal cell.

BEST MODES OF CARRYING OUT THE INVENTION

The method for producing an optical compensating sheet of the present invention is characterized by comprising a step of simultaneously coating at least two coating solutions on a transparent support, wherein at least one of the coating solutions used in that step contains a liquid crystalline compound and another coating solution contains a surface active agent.

Liquid Crystalline Compound-Containing Layer:

[Optically Anisotropic Layer]

In the present invention, the liquid crystalline compound used in the optically anisotropic layer is preferably a discotic liquid crystalline compound (disc-like liquid crystalline compound) or a rod-like liquid crystalline compound, more preferably a discotic liquid crystalline compound having a polymerizable group or a rod-like liquid crystalline compound having a polymerizable group. The liquid crystalline compound is preferably fixed by polymerization in a state that liquid crystalline molecules are aligned.

In the optical compensating sheet of the present invention, the angle made by the disc plane of the discotic liquid crystalline compound and the transparent support plane is preferably changed in the depth direction of the optically anisotropic layer (hybrid alignment). The optically anisotropic layer is preferably formed by orienting a liquid crystalline compound by an orientation film and fixing the discotic liquid crystalline compound in that oriented state.

The discotic liquid crystalline compound is described in various publications (see, for example, C. Destrade et al.,

*Mol. Crysr. Liq. Cryst.*, Vol. 71, page 111 (1981); "*Ekisho no Kagaku*", *Kikan Kagaku Sosetsu* ("*Chemistry of Liquid Crystal*", *Quarterly Chemical Review*), No. 22, Chap. 5, Chap. 10, Paragraph 2, compiled by Nippon Kagaku Kai (1994); B. Kohne et al., *Angew. Chem. Soc. Chem. Comm.*, page 1794 (1985); J. Zhang et al., *J. Am. Chem. Soc.*, Vol. 116, page 2655 (1994)). The polymerization of discotic liquid crystalline compound is described in JP-A-8-27284.

In order to fix the discotic compound by polymerization, a polymerizable group must be bonded as a substituent to the disc-like core of discotic compound. However, if a polymerizable group is bonded directly to the disc-like core, the oriented state can be hardly maintained at the polymerization reaction. Therefore, a linking group is introduced between the disc-like core and the polymerizable group. In this meaning, the discotic compound having a polymerizable group is preferably a compound represented by the following formula (III):

(III)

wherein D is a disc-like core, L is a divalent linking group, Q is a polymerizable group, and n is an integer of 4 to 12.

Examples of the disc-like core (D) are set forth below. In the following, LQ (or QL) means a combination of a divalent linking group (L) and a polymerizable group (Q).

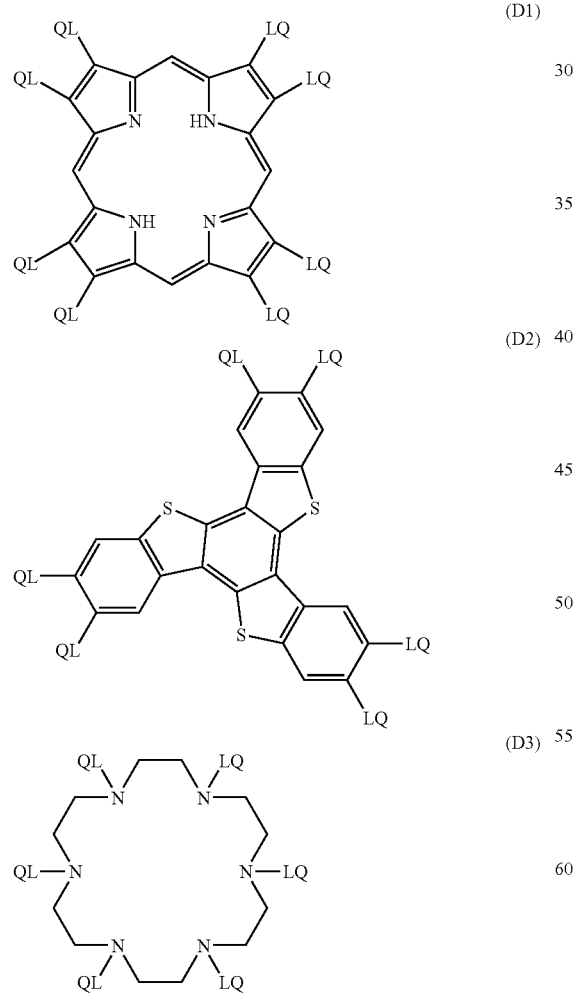

-continued

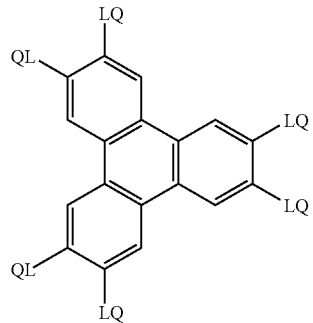
(D4)

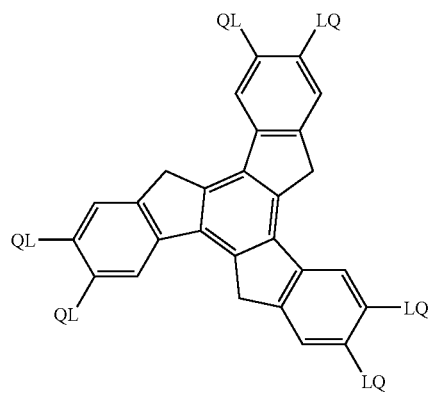
(D5)

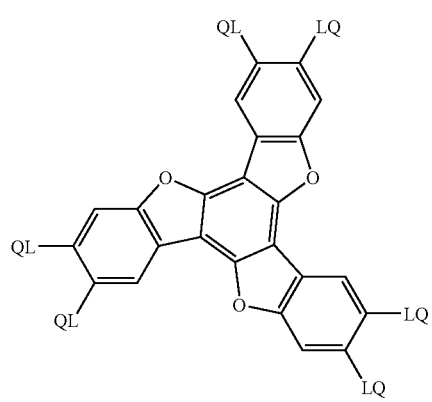
(D6)

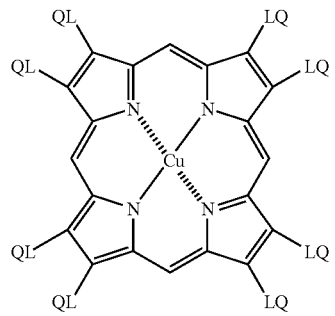
(D7)

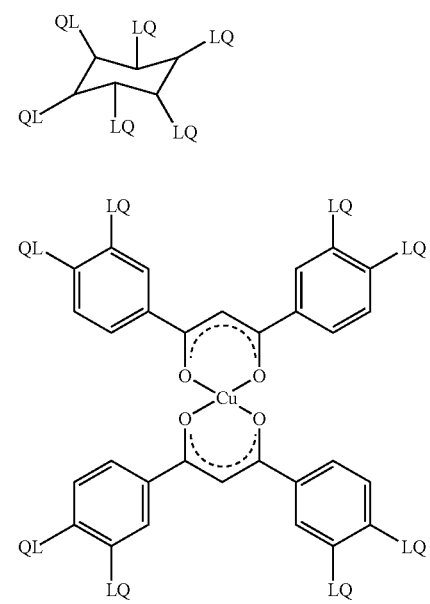
(D8)
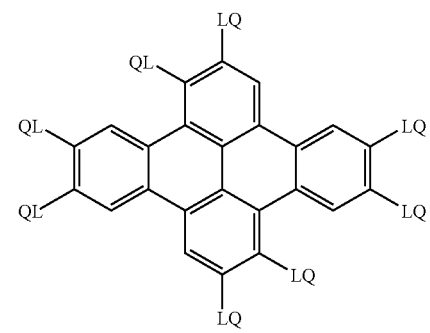
(D9)
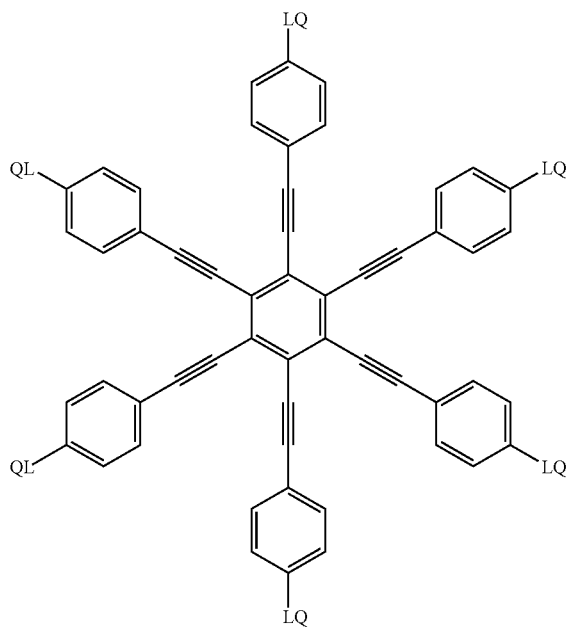
(D10)
(D11)
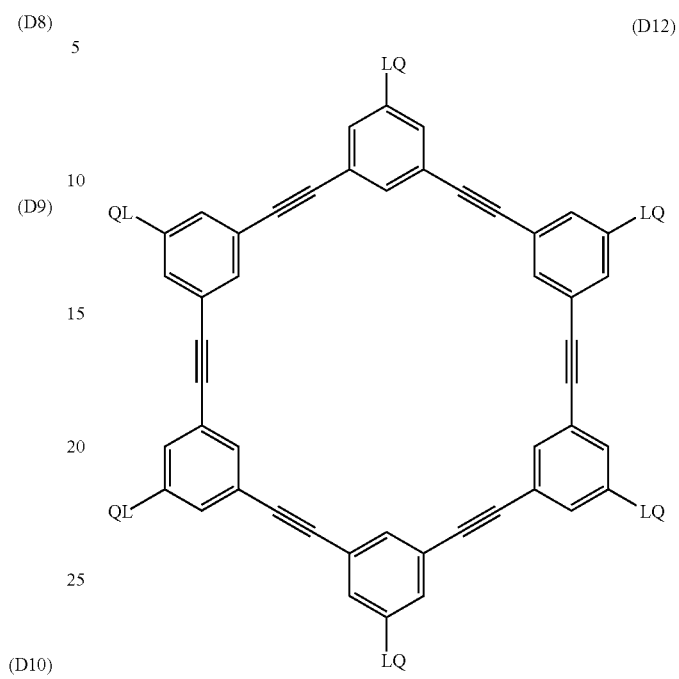
(D12)
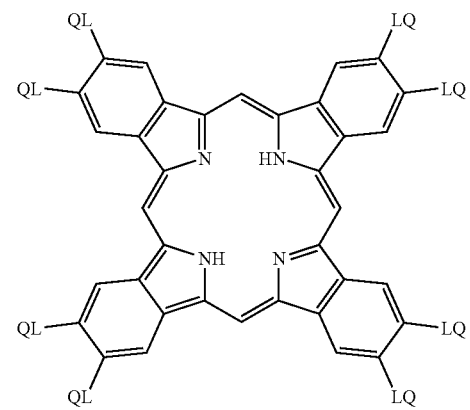
(D13)
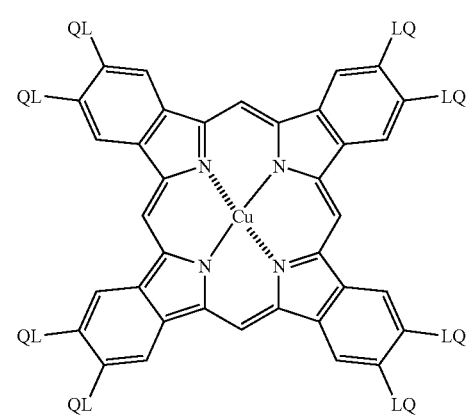
(D14)

-continued

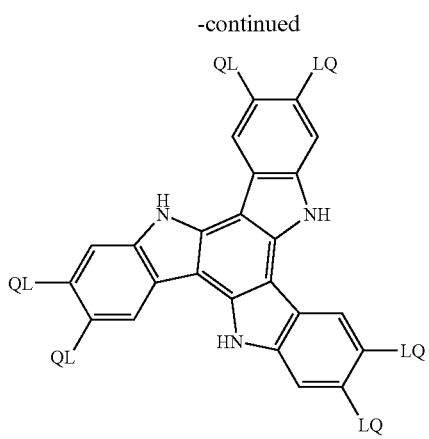
(D15)

In formula (III), the divalent linking group (L) is preferably a divalent linking group selected from the group consisting of an alkylene group, an alkenylene group, an arylene group, —CO—, —NH—, —O—, —S— and a combination thereof, more preferably a divalent linking group formed by combining at least two divalent groups selected from the group consisting of an alkylene group, an arylene group, —CO—, —NH—, —O— and —S—, and most preferably a divalent linking group formed by combining at least two divalent groups selected from the group consisting of an alkylene group, an arylene group, —CO— and —O—. The number of carbon atoms in the alkylene group is preferably from 1 to 12, the number of carbon atoms in the alkenylene group is preferably from 2 to 12, and the number of carbon atoms in the arylene group is preferably from 6 to 10.

Examples of the divalent linking group (L) are set forth below. The left side is bonded to the disc-like core (D) and the right side is bonded to the polymerizable group (Q). AL means an alkylene group or an alkenylene group and AR means an arylene group. The alkylene group, the alkenylene group and the arylene group each may have a substituent (e.g., alkyl group).

L1: —AL-CO—O-AL-
L2: —AL-CO—O-AL-O—
L3: —AL-CO—O-AL-O-AL-
L4: —AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O—AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

In formula (III), the polymerizable group (Q) is determined according to the kind of polymerization reaction. The polymerizable group (Q) is preferably an unsaturated polymerizable group or an epoxy group, more preferably an unsaturated polymerizable group, and most preferably an ethylenic unsaturated polymerizable group.

In formula (III), n is an integer of 4 to 12. The specific numeral is determined according to the kind of disc-like core (D). The plurality of combinations of L and Q may be different but are preferably the same.

In the hybrid alignment, the angle between the long axis (disc plane) of discotic compound and the plane of support, namely, the tilt angle is increased or decreased as the distance from the plane of polarizing film in the depth direction of optically anisotropic layer increases. The angle is preferably decreased as the distance increases. The change of tilt angle may be continuous increase, continuous decrease, intermittent increase, intermittent decrease, change containing continuous increase and continuous decrease, or intermittent change containing increase and decrease. In the intermittent change, a region where the tilt angle is not changed is present on the way in the thickness direction. Even when a region having no change of angle is present, it may suffice if the tilt angle is increased or decreased as a whole. However, the tilt angle is preferably changed continuously.

The average direction (average of long axis directions of individual molecules) of long axis (disc plane) of the discotic compound can be generally adjusted by selecting the discotic compound or orientation film material or by selecting the rubbing method. Also, the long axis (disc plane) direction of discotic compound in the surface side (air side) can be generally adjusted by selecting the kind of discotic compound or additive used together with the discotic compound. Examples of the additive-used together with the discotic compound include a plasticizer, a surface active agent, a polymerizable monomer and a polymer. The degree of change in the orientation direction of long axis can be adjusted similarly to the above by selecting the liquid crystalline molecule and additive.

The plasticizer, surface active agent and polymerizable monomer used together with the discotic compound preferably have compatibility with the discotic compound and give change in the tilt angle of the discotic compound or not inhibit the orientation. Among these additive components, a polymerizable monomer (for example, a compound having a vinyl group, a vinyloxy group, an acryloyl group or a methacryloyl group) is preferred. The amount of this compound added is generally from 1 to 50 mass %, preferably from 5 to 30 mass %, based on the discotic compound. When a polymerizable monomer having 4 or more reactive functional groups is mixed, the adhesion between the orientation film and the optically anisotropic layer can be enhanced.

The optically anisotropic layer contains the fluoroaliphatic polymer according to the present invention, however, another polymer may be used together with the discotic compound and this polymer preferably has compatibility with the discotic compound to a certain extent and gives change of tilt angle to the discotic compound.

Examples of the polymer include cellulose esters. Preferred examples of the cellulose ester include cellulose acetate, cellulose acetate propionate, hydroxypropyl-cellulose and cellulose acetate butyrate. For not inhibiting the orientation of discotic compound, the amount of the polymer added is preferably from 0.1 to 10 mass %, more preferably from 0.1 to 8 mass %, still more preferably from 0.1 to 5 mass %, based on the discotic compound.

The discotic nematic liquid crystal phase-solid phase transition temperature of the discotic compound is preferably from 70 to 300° C., more preferably from 70 to 170° C.

(Rod-Like Liquid Crystalline Molecule)

Preferred examples of the rod-like liquid crystalline molecule include azomethines, azoxys, cyanobiphenyls, cyanophenyl esters, benzoic esters, phenyl cyclohexane-carboxylates, cyanophenylcyclohexanes, cyano-substituted phenylpyridines, alkoxy-substituted phenylpyrimidines, phenyldioxanes, tolanes and alkenylcyclohexylbenzonitriles.

The rod-like liquid crystalline molecule also includes metal complexes. A liquid crystal polymer containing a rod-like liquid crystalline molecule in the repeating unit can also be used as the rod-like liquid crystalline molecule. In other words, a rod-like liquid crystalline molecule may be bonded to a (liquid crystal) polymer. The rod-like liquid crystalline molecule is described in "*Ekisho no Kagaku*", *Kikan Kagaku Sosetsu* ("*Chemistry of Liquid Crystal*", *Quarterly Chemical Review*), Vol. 22, Chap. 4, Chap. 7, Chap. 11, compiled by Nippon Kagaku Kai (1994); and *Ekisho Device Handbook* (*Liquid Crystal Device Handbook*), Chap. 3, complied by Nippon Gakujutsu Shinko Kai, Committee No. 142.

The birefringence of the rod-like liquid crystalline molecule is preferably from 0.001 to 0.7.

The rod-like liquid crystalline molecule preferably has a polymerizable group so as to fix its aligned state. The polymerizable group is preferably an unsaturated polymerizable group or an epoxy group, more preferably an unsaturated polymerizable group, and most preferably an ethylenic unsaturated polymerizable group.

The low molecular weight rod-like liquid crystalline compound having a polymerizable group is particularly preferably a rod-like liquid crystalline compound represented by the following formula (I):

Q1-L1-Cy1-L2-(Cy2-L3)n-Cy3-L4-Q2 (I)

wherein Q1 and Q2 each is independently a polymerizable group, L1 and L4 each is independently a divalent linking group, L2 and L3 each is independently a single bond or a divalent linking group, Cy1, Cy2 and Cy3 each is a divalent cyclic group, and n is 0, 1 or 2.

The polymerizable rod-like liquid crystal compound is described below.

In formula (1), the polymerization reaction of the polymerizable group represented by Q1 and Q2 is preferably an addition polymerization (including a ring-opening polymerization) or a condensation polymerization. In other words, the polymerizable group is preferably a functional group capable of undergoing an addition polymerization reaction or a condensation polymerization reaction. Examples of the polymerizable group are set forth below.

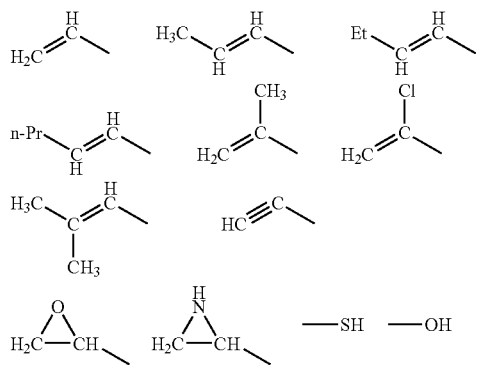

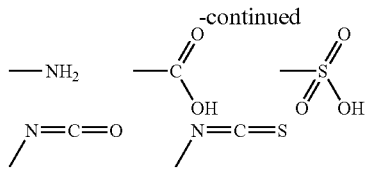

L1 and L4 each is independently a divalent linking group, preferably a divalent linking group selected from the group consisting of —O—, —S—, —CO—, —NR2—, a divalent chained group, a divalent cyclic group and a combination thereof, wherein R2 is an alkyl group having from 1 to 7 carbon atoms or a hydrogen atom.

Examples of the divalent linking group comprising a combination are set forth below. Here, the left side is bonded Q (Q1 or Q2) and the right side is bonded to Cy (Cy1 or Cy3).

L-1: —CO—O-divalent chained group-O—
L-2: —CO—O-divalent chained group-O—CO—
L-3: —CO—O-divalent chained group-O—CO—O—
L-4: —CO—O-divalent chained group-O-divalent cyclic group-
L-5: —CO—O-divalent chained group-O-divalent cyclic group-CO—O—
L-6: —CO—O-divalent chained group-O-divalent cyclic group-O—CO—
L-7: —CO—O-divalent chained group-O-divalent cyclic group-divalent chained group-
L-8: —CO—O-divalent chained group-O-divalent cyclic group-divalent chained group-CO—O—
L-9: —CO—O-divalent chained group-O-divalent cyclic group-divalent chained group-O—CO—
L-10: —CO—O-divalent chained group-O—CO-divalent cyclic group-
L-11: —CO—O-divalent chained group-O—CO-divalent cyclic group-CO—O—
L-12: —CO—O-divalent chained group-O—CO-divalent cyclic group-O—CO—
L-13: —CO—O-divalent chained group-O—CO-divalent cyclic group-divalent chained group-
L-14: —CO—O-divalent chained group-O—CO-divalent cyclic group-divalent chained group-CO—O—
L-15: —CO—O-divalent chained group-O—CO-divalent cyclic group-divalent chained group-O—CO—
L-16: —CO—O-divalent chained group-O—CO—O-divalent cyclic group-
L-17: —CO—O-divalent chained group-O—CO—O-divalent cyclic group-CO—O—
L-18: —CO—O-divalent chained group-O—CO—O-divalent cyclic group-O—CO—
L-19: —CO—O-divalent chained group-O—CO—O-divalent cyclic group-divalent chained group-
L-20: —CO—O-divalent chained group-O—CO—O-divalent cyclic group-divalent chained group-CO—O—
L-21: —CO—O-divalent chained group-O—CO—O-divalent cyclic group-divalent chained group-O—CO—

The divalent chained group means an alkylene group, a substituted alkylene group, an alkenylene group, a substituted alkenylene group, an alkynylene group or a substituted alkynylene group. The divalent chained group is preferably an alkylene group, a substituted alkylene group, an alkenylene group or a substituted alkenylene group, more preferably an alkylene group or an alkenylene group.

The alkylene group may have a branch. The number of carbon atoms in the alkylene group is preferably from 1 to 12, more preferably from 2 to 10, still more preferably from 2 to 8.

The alkylene moiety of the substituted alkylene group is the same as the above-described alkylene group. Examples of the substituent include a halogen atom.

The alkenylene group may have a branch. The number of carbon atoms in the alkenylene group is preferably from 2 to 12, more preferably from 2 to 10, still more preferably from 2 to 8.

The alkynylene moiety of the substituted alkynylene group is the same as the above-described alkynylene group. Examples of the substituent include a halogen atom.

Specific examples of the divalent chained group include ethylene, trimethylene, propylene, butamethylene, 1-methyl-butamethylene, 2-butenylene and 2-butynylene.

The definition and examples of the divalent cyclic group are the same as the definition and examples of Cy1, Cy2 and Cy3 described later.

R2 is preferably an alkyl group having from 1 to 4 carbon atoms or a hydrogen atom, more preferably a methyl group, an ethyl group or a hydrogen atom, still more preferably a hydrogen atom.

L2 and L3 each is independently a single bond or a divalent linking group, preferably a divalent linking group selected from the group consisting of —O—, —S—, —CO—, —NR2—, a divalent chained group, a divalent cyclic group and a combination thereof, or a single bond, wherein R2 is an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom. The divalent chained group and divalent cyclic group are the same as those in the definition of L1 and L4.

In formula (I), n is 0, 1 or 2. When n is 2, two L3s may be the same or different and two Cy2s may be the same or different. n is preferably 1 or 2, more preferably 1.

In formula (I), Cy1, Cy2 and Cy3 each is independently a divalent cyclic group.

The ring contained in the cyclic group is preferably a 5-, 6- or 7-membered ring, more preferably a 5- or 6-membered ring, and most preferably a 6-membered ring.

The ring contained in the cyclic group may be a condensed ring, but the ring is preferably a monocyclic ring rather than a condensed ring.

The ring contained in the cyclic group may be an aromatic ring, an aliphatic ring or a heterocyclic ring. Examples of the aromatic ring include a benzene ring and a naphthalene ring. Examples of the aliphatic ring include a cyclohexane ring. Examples of the heterocyclic ring include a pyridine ring and a pyrimidine ring.

Preferred examples of the cyclic group having a benzene ring include 1,4-phenylene. Preferred examples of the cyclic group having a naphthalene ring include naphthalene-1,5-diyl and naphthalene-2,6-diyl. Preferred examples of the cyclic group having a pyridine ring include pyridine-2,5-diyl. Preferred examples of the cyclic group having a pyrimidine ring include pyrimidine-2,5-diyl.

The cyclic group may have a substituent. Examples of the substituent include a halogen atom, a cyano group, a nitro group, an alkyl group having from 1 to 5 carbon atoms, a halogen-substituted alkyl group having from 1 to 5 carbon atoms, an alkoxy group having from 1 to 5 carbon atoms, an alkylthio group having from 1 to 5 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms.

Examples of the polymerizable liquid crystal compound represented by formula (I) are set forth below, however, the present invention is not limited thereto.

I-1)

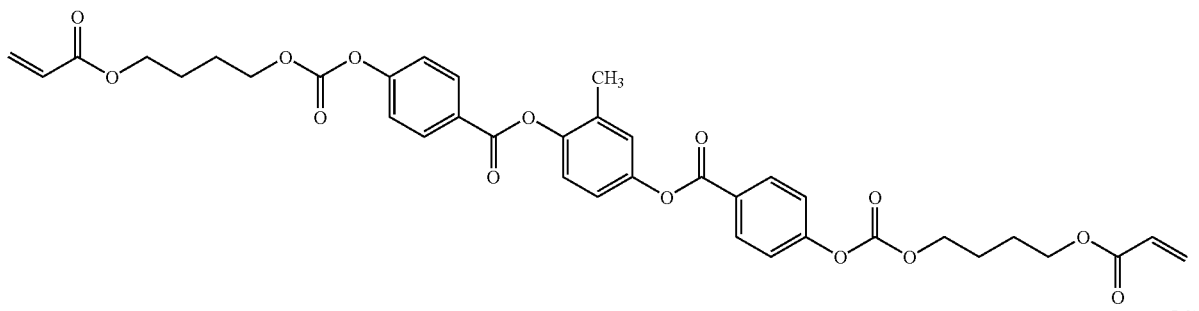

I-2)

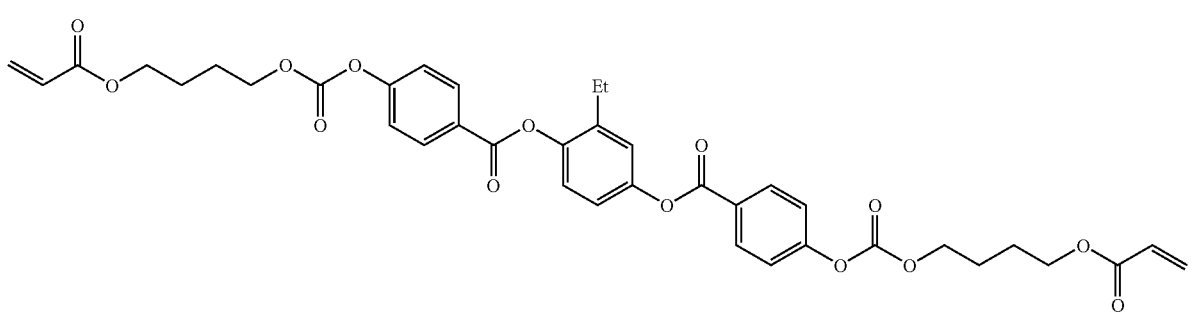

-continued
I-3)
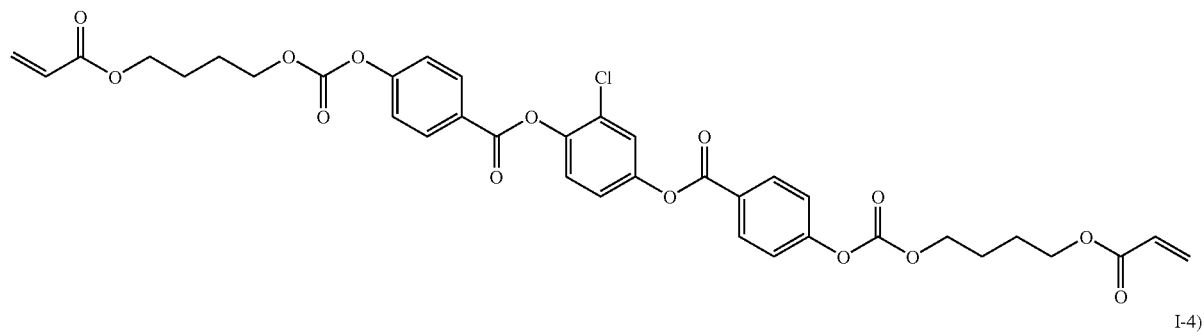
I-4)
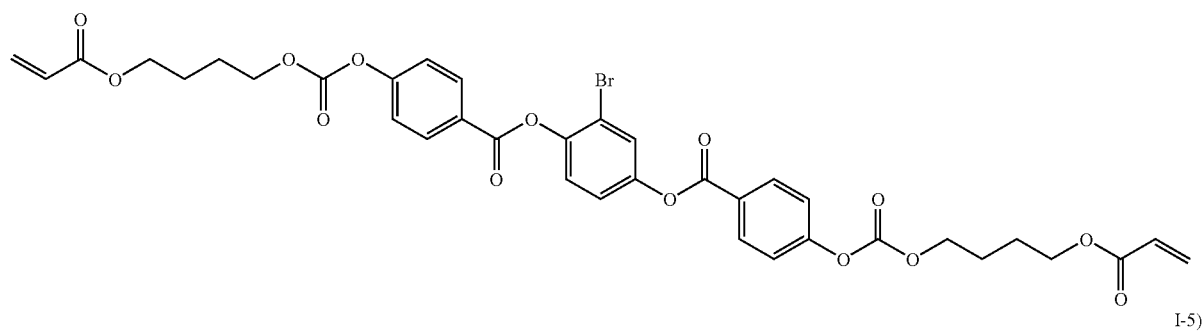
I-5)
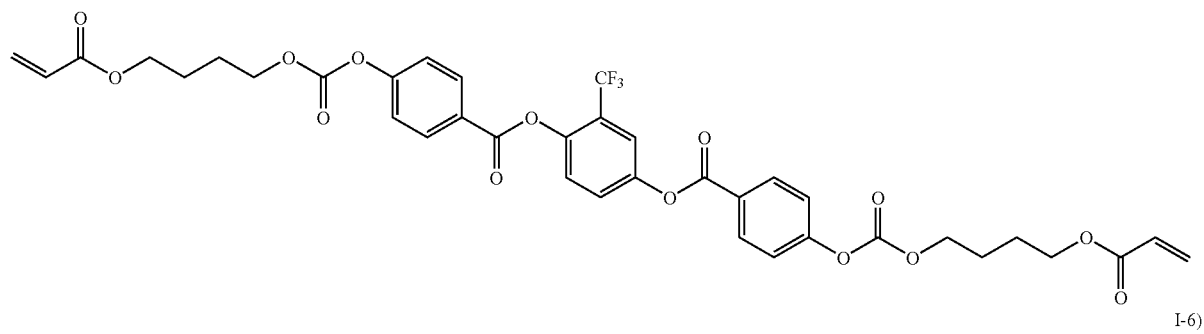
I-6)
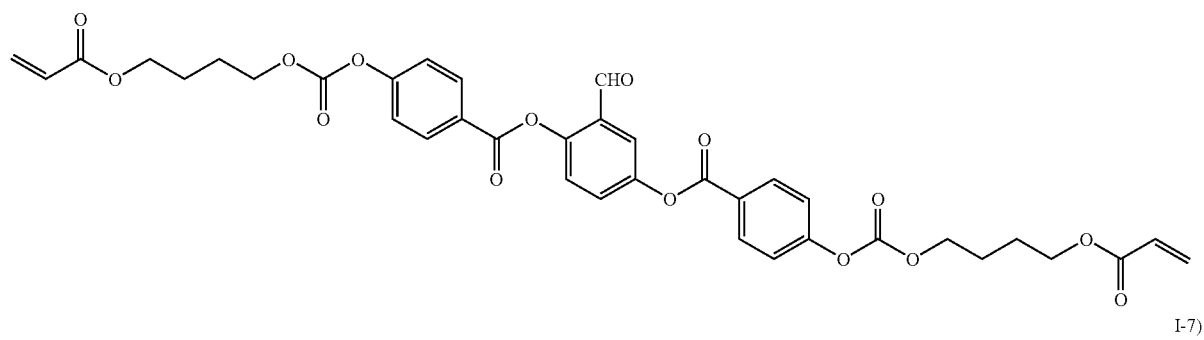
I-7)
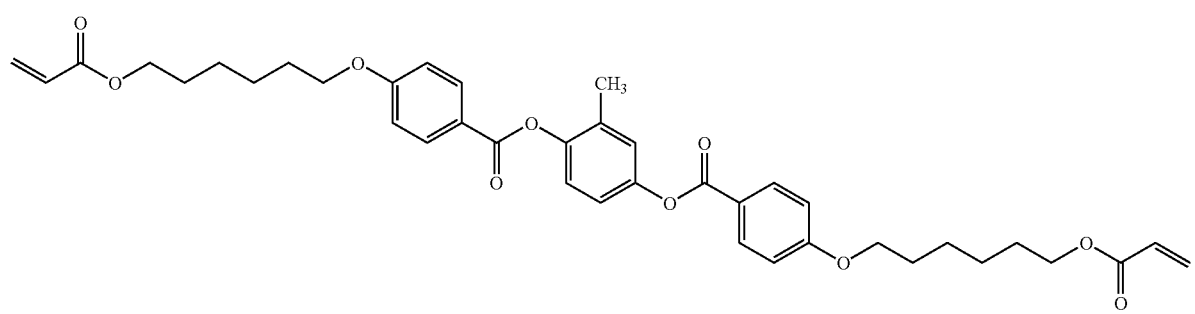

-continued
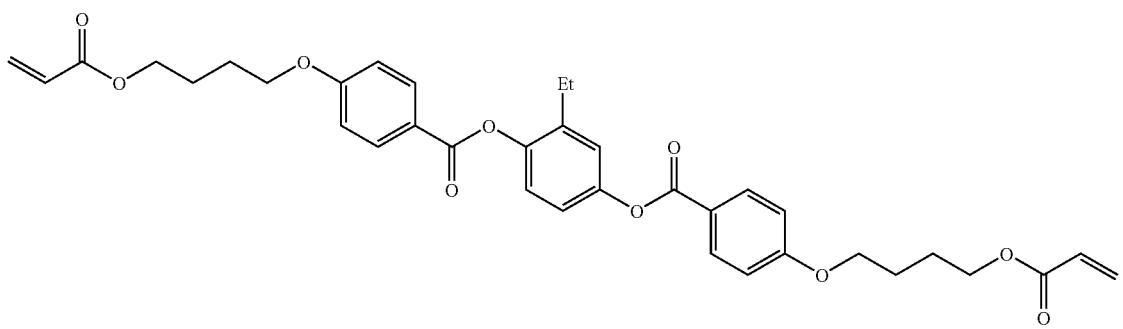
I-8)
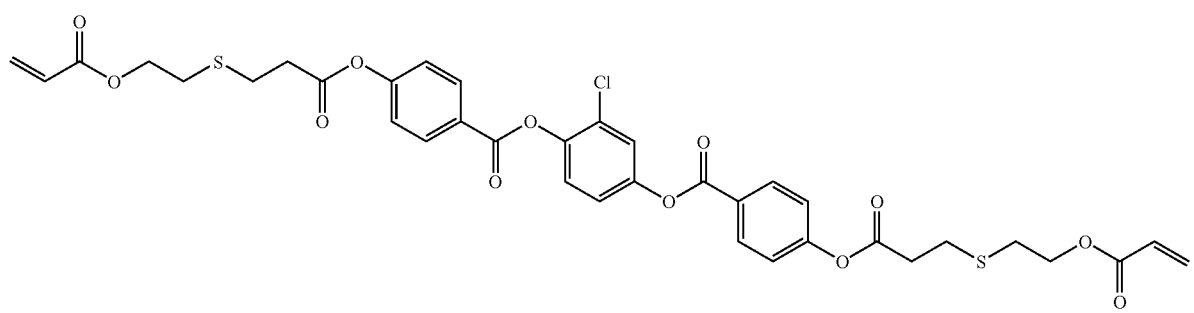
I-9)
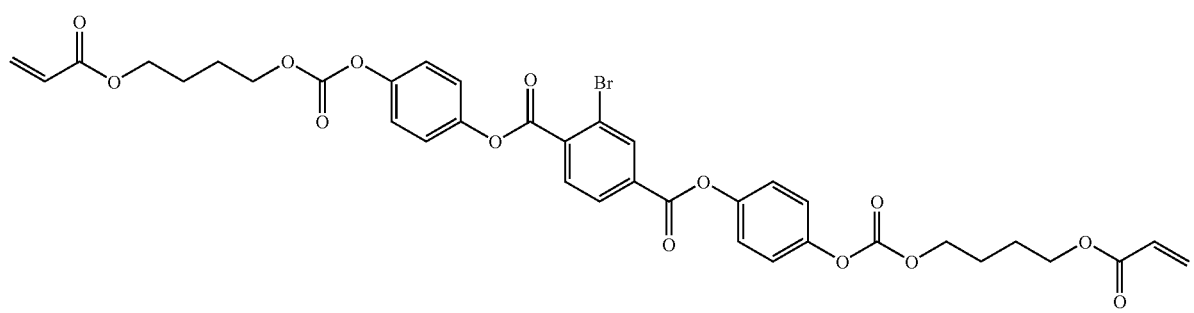
I-10)
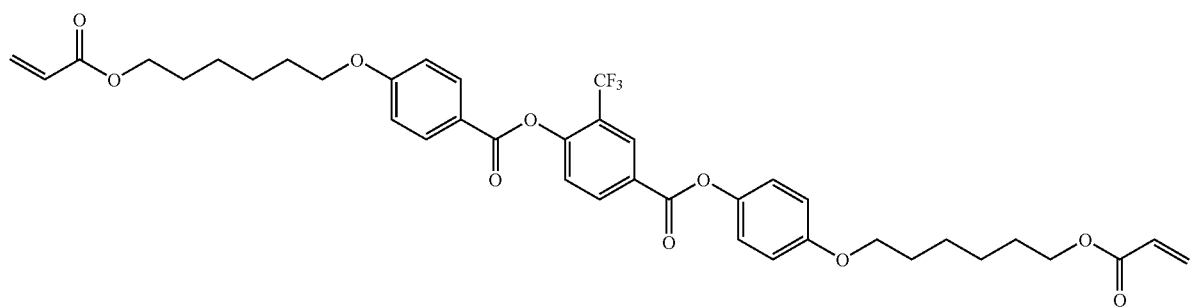
I-11)
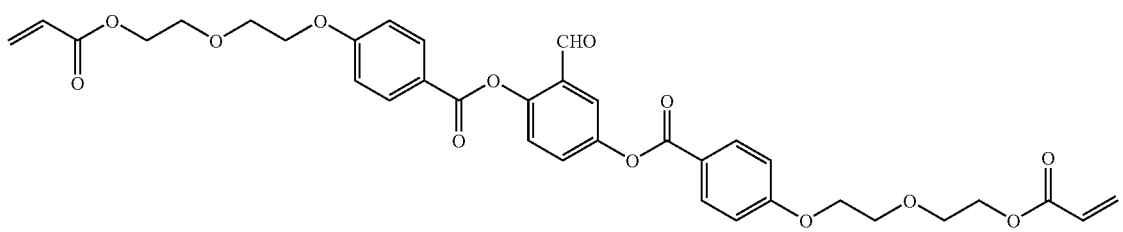
I-12)

-continued
I-13)
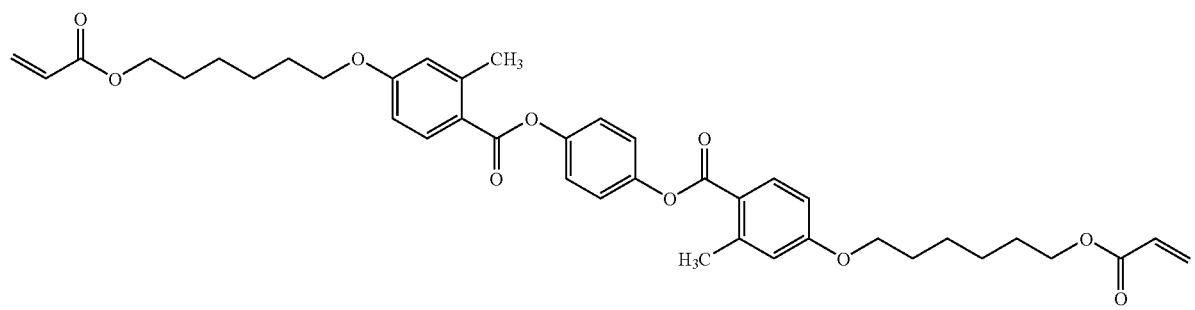
I-14)
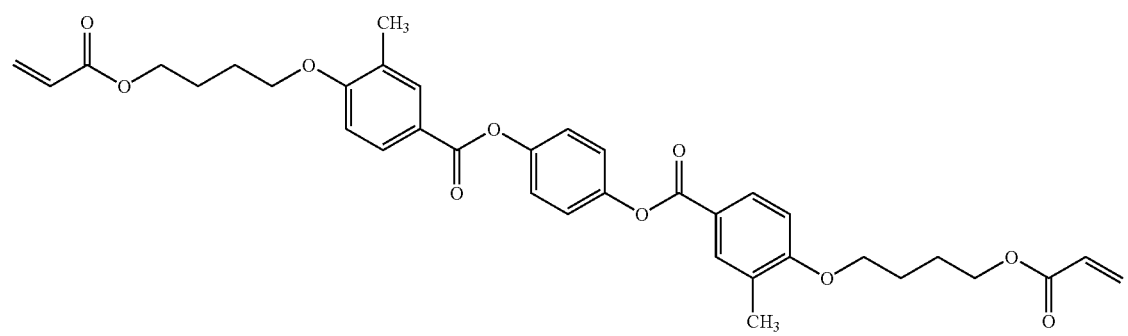
I-15)
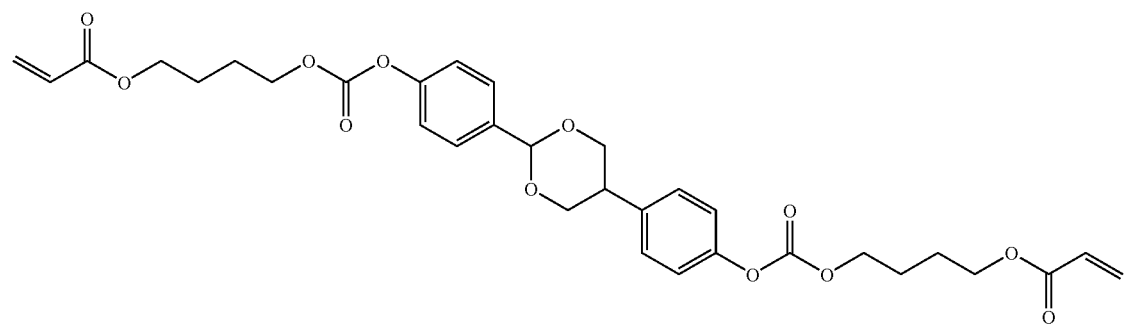
I-16)
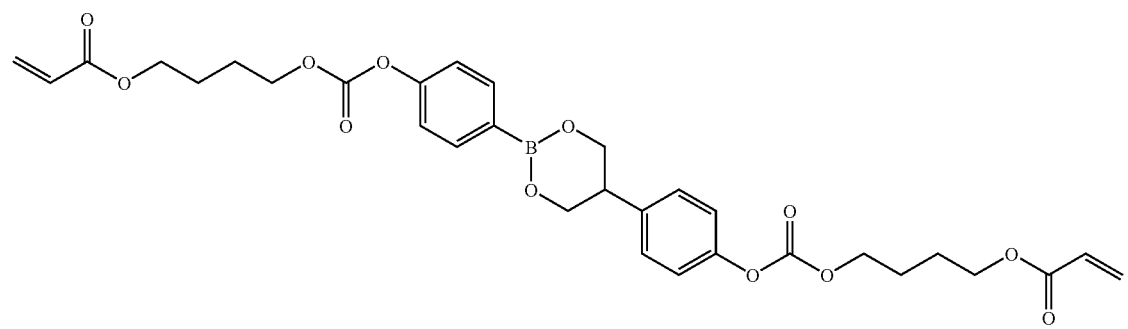

-continued
I-17)
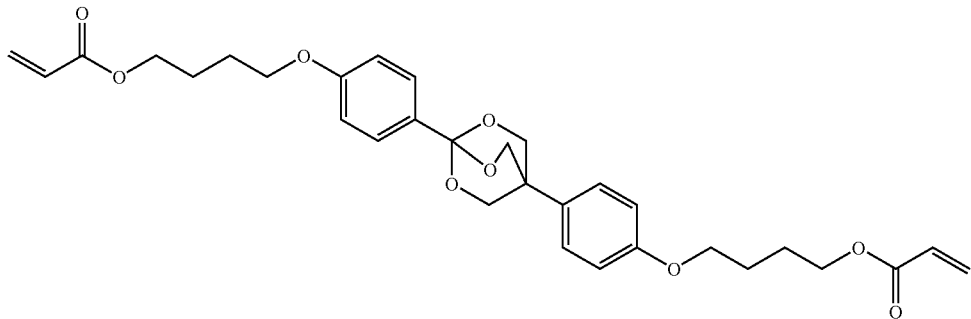
I-18)
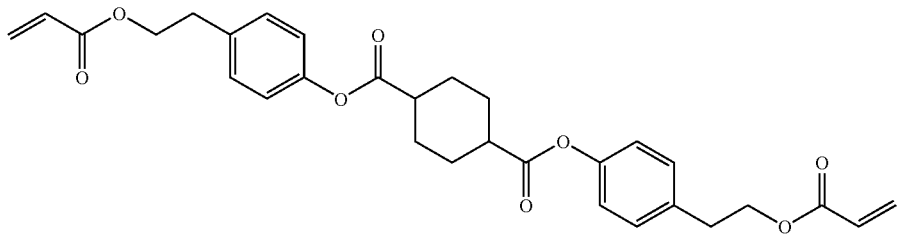
I-19)
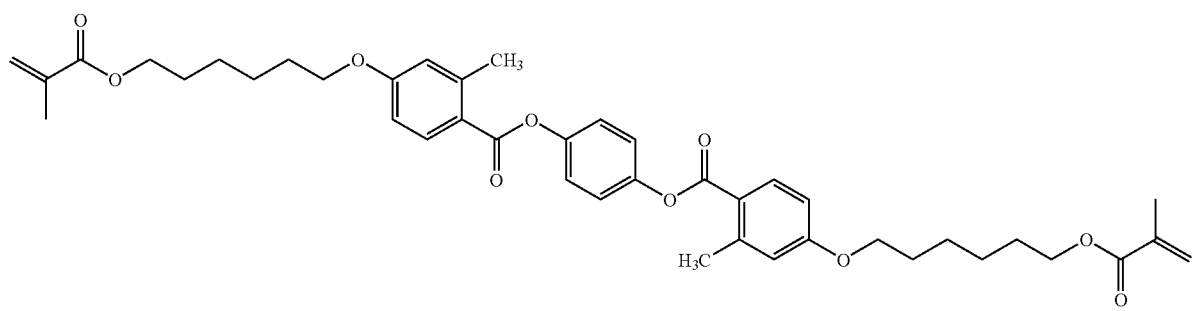
I-20)
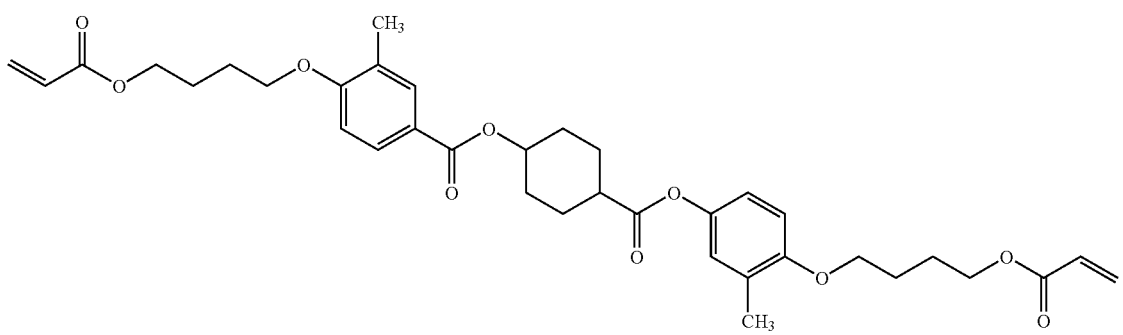
I-21)
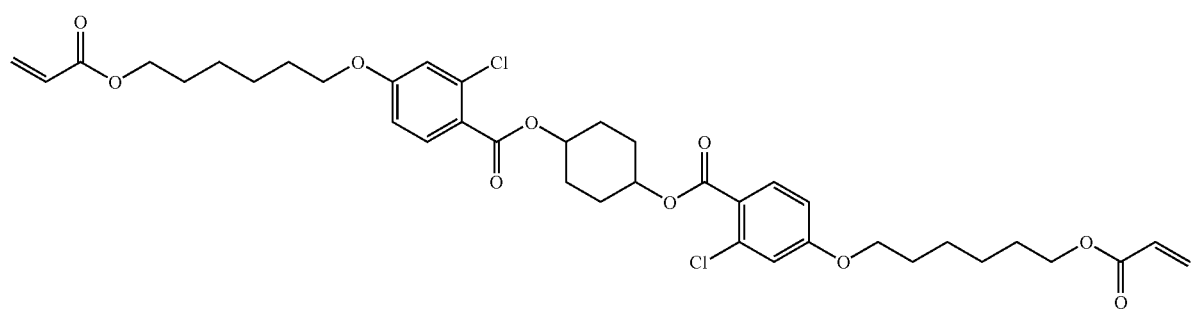

-continued

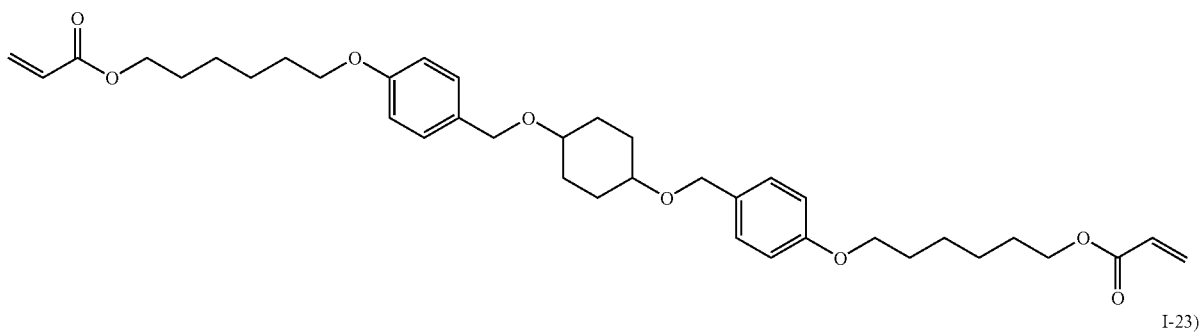

I-22)

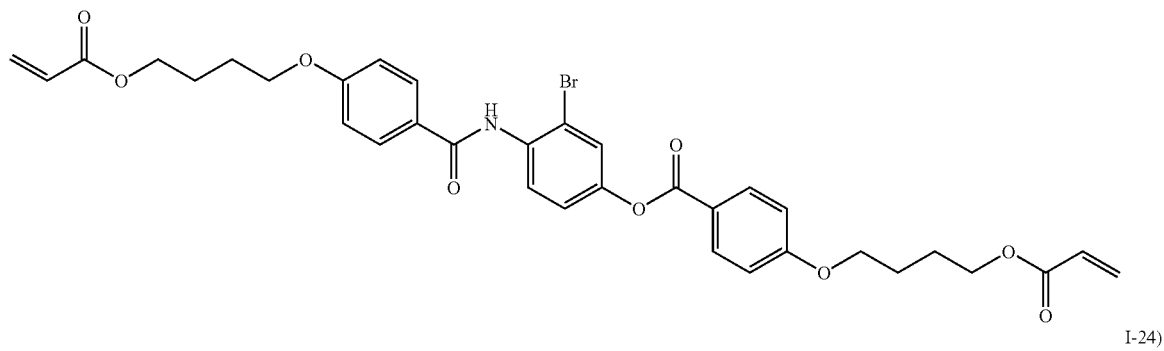

I-23)

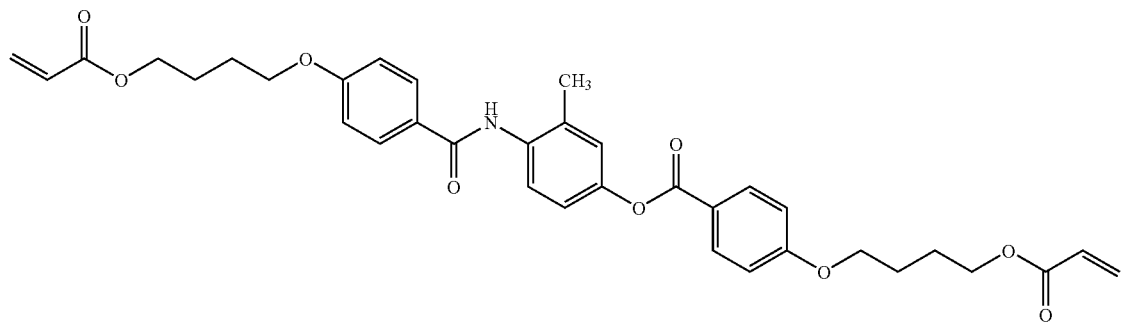

I-24)

<Additive of Optically Anisotropic Layer>

In the optically anisotropic layer, arbitrary additives may be used in addition to the liquid crystalline compound. Examples of the additive include a shedding-preventing agent, an additive for controlling the pre-tilt angle of orientation film, a polymerization initiator, an additive for decreasing the orientation temperature (plasticizer), and a polymerizable monomer.

(Shedding-Preventing Agent)

In general, as the material used together with the discotic liquid crystalline compound to prevent the shedding at the coating, a polymer can be suitably used.

The polymer used is not particularly limited insofar as it has compatibility with the liquid crystalline compound and does not extremely inhibit the tilt angle change or orientation of the liquid crystalline compound.

Examples of the polymer include those described in JP-A-8-95030 and specific examples of particularly preferred polymers include cellulose esters. Examples of the cellulose ester include cellulose acetate, cellulose acetate propionate, hydroxypropylcellulose and cellulose acetate butyrate. From the standpoint of not inhibiting the orientation of liquid crystalline compound, the amount added of the polymer used for preventing the shedding is generally from 0.1 to 10 mass %, preferably from 0.1 to 8 mass %, more preferably from 0.1 to 5 mass %.

(Polymerizable Monomer)

The polymerizable monomer used together with the liquid crystalline compound is not particularly limited insofar as it has compatibility with the liquid crystalline compound and does not extremely inhibit the tilt angle change or orientation of liquid crystalline compound. Among these polymerizable monomers, compounds having a polymerization-active ethylenic unsaturated group such as vinyl group, vinyloxy group, acryloyl group and methacryloyl group are preferred. The amount of the polymerizable monomer added is generally from 1 to 50 mass %, preferably from 5 to 30 mass %, based on the liquid crystalline compound. When a monomer having two or more reactive functional groups is used, an effect of enhancing the adhesion between the orientation film and the optically anisotropic layer may be provided and therefore, this is particularly preferred.

The polymerization initiator for use in the polymerization is described later.

<Formation of Optically Anisotropic Layer>

The optically anisotropic layer is preferably formed by applying a coating solution containing the liquid crystalline compound, a polymerization initiator described below, and other additives onto the orientation film. The solvent used in the preparation of the coating solution is preferably an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Among these, alkyl halides and ketones are preferred. Two or more organic solvents may be used in combination.

The thickness of the optically anisotropic layer is preferably from 0.1 to 100 μm, more preferably from 0.5 to 20 μm.

The aligned liquid crystalline molecules are fixed while keeping the aligned state. The fixing is preferably performed by a polymerization reaction. The polymerization reaction includes a thermal polymerization reaction using a thermal polymerization initiator, and a photopolymerization reaction using a photopolymerization initiator. Of these, a photopolymerization reaction is preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The amount of the photopolymerization initiator used is preferably from 0.01 to 20 mass %, more preferably from 0.5 to 5 mass %, based on the solid content of the coating solution.

The light irradiation for the polymerization of liquid crystalline molecules is preferably performed by using an ultraviolet ray.

The irradiation energy is preferably from 20 to 5,000 mJ/cm$^2$, more preferably from 100 to 800 mJ/cm$^2$. In order to accelerate the photopolymerization reaction, the light irradiation may be performed under heating.

Also, a protective layer may be provided on the optically anisotropic layer.

[Surface Active Agent]

In the method for producing an optical compensating sheet of the present invention, at least one of coating solutions which are simultaneously coated contains a surface active agent. In the present invention, a coating solution containing a surface active agent and a coating solution containing a liquid crystalline molecule for forming the optically anisotropic layer are preferably coated at the same time.

As the surface active agent for use in the present invention, various surface active agents may be used, but a fluorine-containing surface active agent is preferred.

Examples of the fluorine-containing surface active agent include F-1 to F-10 disclosed in JP-A-2001-330725 (paragraphs 0027 to 0028), and FS-1 to FS-23 and FS-25 disclosed in JP-A-2002-229169 (paragraphs 0120 to 0123).

The fluorine-containing surface active agent may be a polymer. The polymer fluorine-containing surface active agent is described in detail in JP-A-2002-311577 (paragraphs 0017 to 0054) and specific structure examples of the fluorine-base polymer include P-1 to P-68 described in this patent publication (paragraphs 0055 to 0065) and P-69 shown below (in the formula, the numeral shows the molar ratio of each monomer component and Mw represents a weight average molecular weight):

P-69:

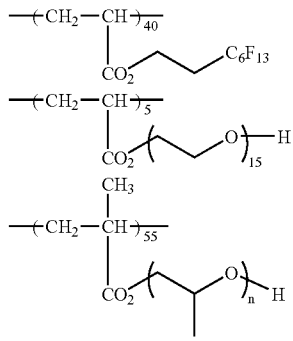

In the method for producing an optical compensating film of the present invention, the surface active agent is more preferably a fluoroaliphatic group-containing copolymer described below.

The optical film of the present invention is characterized in that the optically anisotropic layer contains a copolymer having a fluoroaliphatic group-containing structure and a poly(oxyalkylene) acrylate or methacrylate structure. By the coexistence of this copolymer, unevenness ascribable to the optical film produced by combining an optical compensating sheet and a polarizing plate can be prevented. Accordingly, when this optical film is applied to a large-size liquid crystal display device, an image having high display grade can be displayed without causing unevenness.

The optical properties can be controlled by further adding a monomer represented by formula [II] as a copolymerization component to the fluoroaliphatic group-containing copolymer, whereby the effect of the present invention can be more enhanced or the adaptability for liquid crystal display device can be adjusted.

The copolymer having a fluoroaliphatic group (hereinafter, sometimes simply referred to as "fluorine-base polymer") for use in the present invention is described in detail below.

As the fluorine-base polymer for use in the present invention, a copolymer satisfying the requirement described in (1) or (2) above and comprising an acrylic resin, a methacrylic resin and a vinyl-base monomer copolymerizable therewith is useful.

One of the fluoroaliphatic groups in the fluorine-base polymer for use in the present invention is derived from a fluoroaliphatic compound produced by teromerization (also called a teromer process) or oligomerization (also called an oligomer process). These production methods of fluoroaliphatic compound are described, for example, in Nobuo Ishikawa (supervisor), *Fusso Kagobutsu no Gosei to Kino (Synthesis and Function of Fluorine Compounds)*, pp. 117-118, CMC (1987), and Milos Hudlicky and Attila E. Pavlath (compilers), "*Chemistry of Organic Fluorine Compounds II*", Monograph 187, pp. 747-752, American Chemical Society (1995). The teromerization is a process where a fluorine-containing vinyl compound such as tetrafluoroethylene is radical-polymerized using an alkyl halide having a large chain transfer constant, such as iodide, as the terogen to synthesize a teromer (one example is shown in Scheme 1).

Scheme 1:

The obtained terminal iodinated teromer is usually subjected to an appropriate terminal chemical modification, for example, as in "Scheme 2" and derived to a fluoro-aliphatic compound. This compound is, if desired, further converted into a desired monomer structure and used for the production of a fluoroaliphatic group-containing polymer.

Scheme 2:

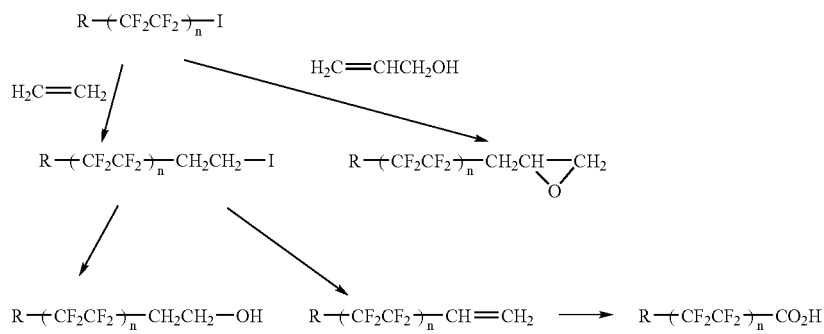

In formula [1] of the present invention, $R_1$ represents a hydrogen atom or a methyl group, and X represents an oxygen atom, a sulfur atom or —N($R_2$)—, wherein $R_2$ represents a hydrogen atom or an alkyl group having from 1 to 4 carbon atoms, specifically, methyl group, ethyl group, propyl group or butyl group, and preferably represents a hydrogen atom or a methyl group. X is preferably an oxygen atom.

In formula [1], m is preferably an integer of 1 to 6, more preferably 2.

In formula [1], n is a number of 2 to 4, preferably 2 or 3, and a mixture thereof may also be used.

Specific examples of the fluoroaliphatic group-containing monomer represented by formula [1] are set forth below, however, the monomer is not limited thereto.

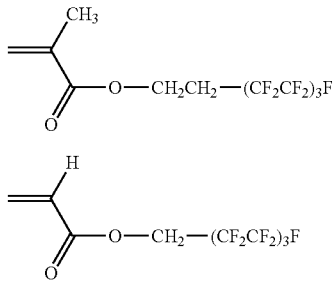

F-1

F-2

F-3

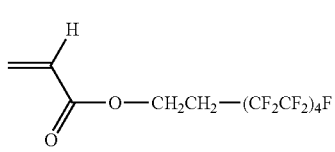

F-4

F-5

-continued

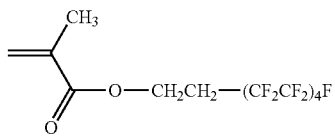

F-6

F-7

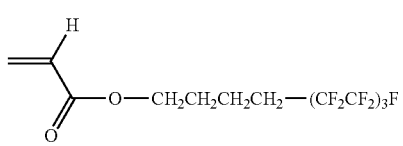

F-8

F-9

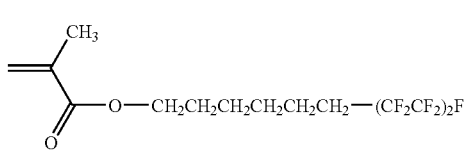

F-10

F-11 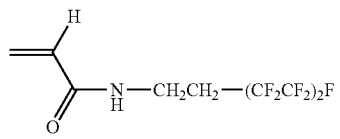
F-12 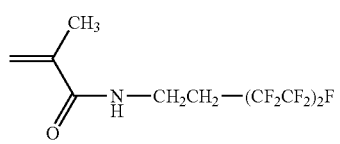
F-13 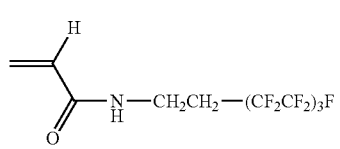
F-14 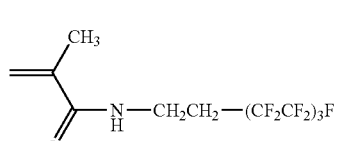
F-15 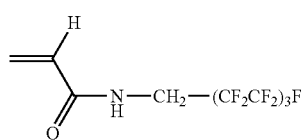
F-16 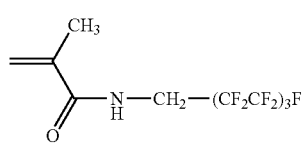
F-17 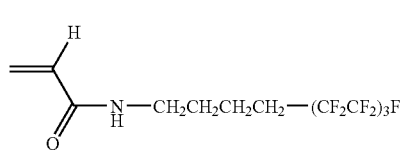
F-18 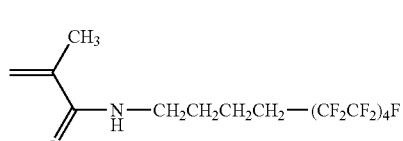
F-19 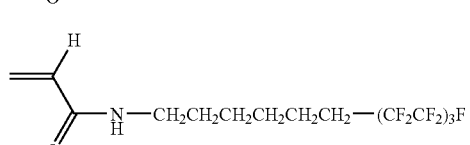
F-20 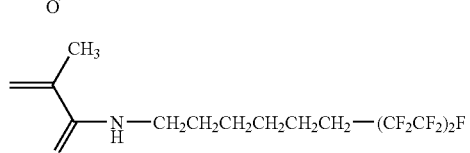
F-21 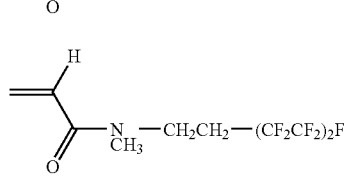
F-22 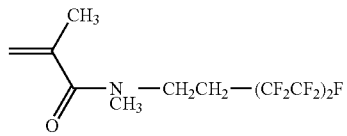
F-23 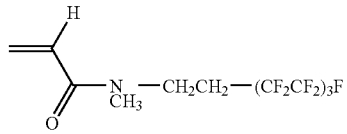
F-24 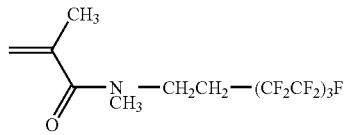
F-25 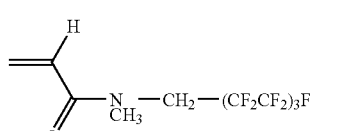
F-26 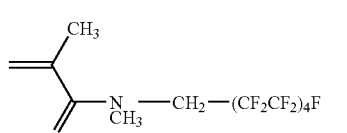
F-27 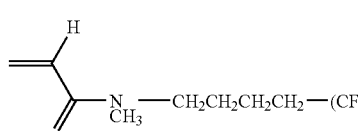
F-28 
F-29 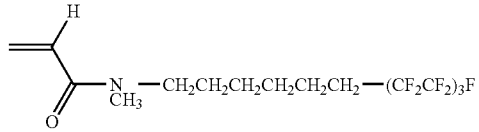
F-30 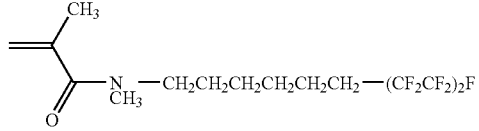
F-31 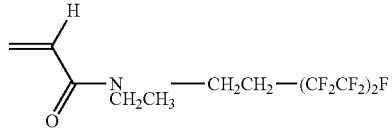
F-32 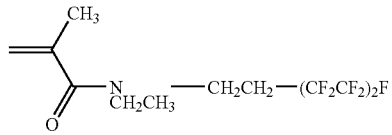

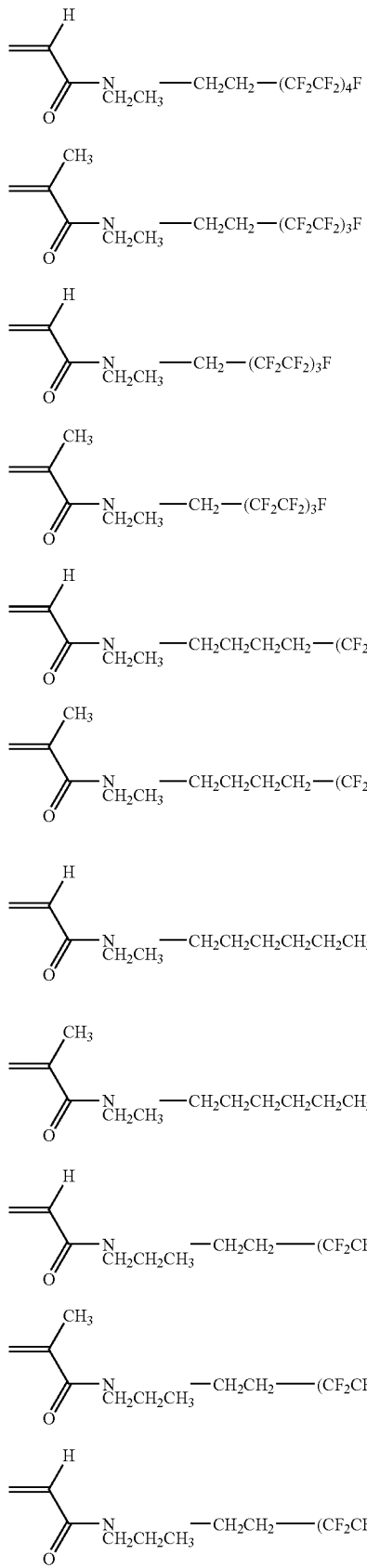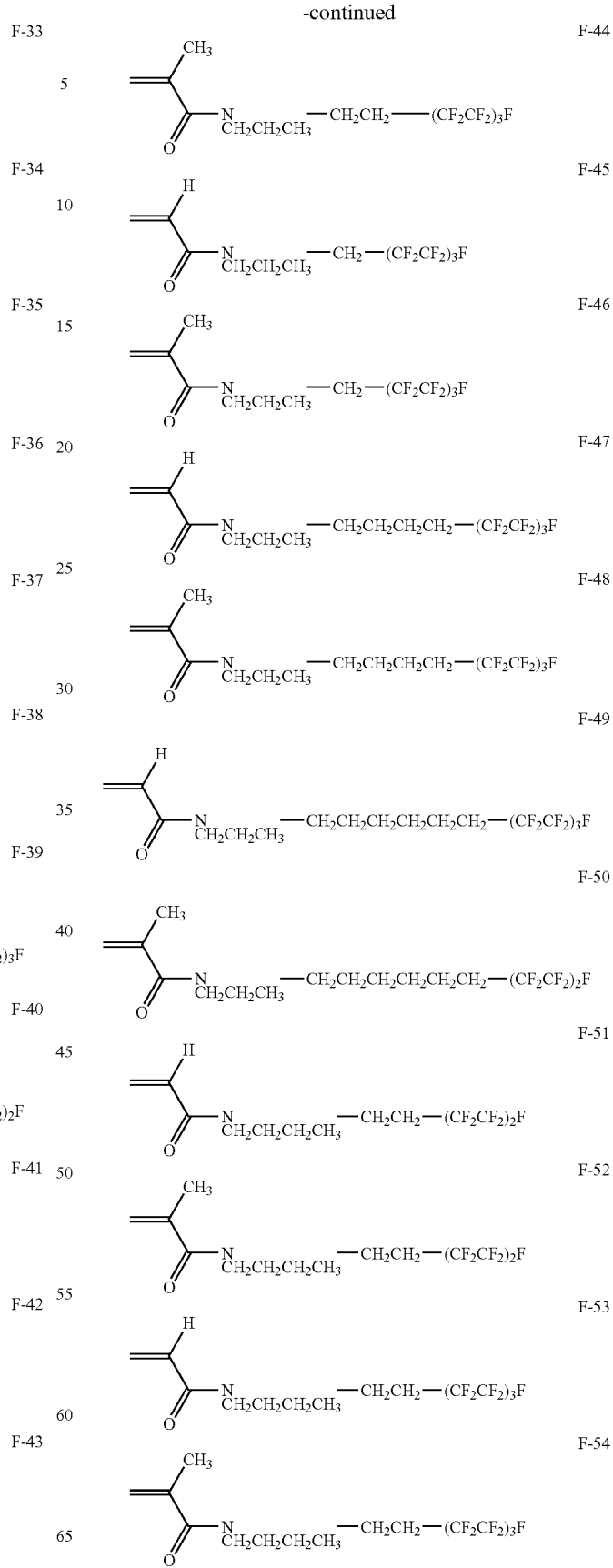

-continued

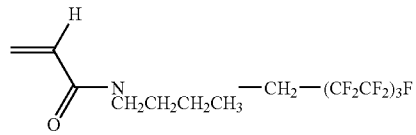
F-55

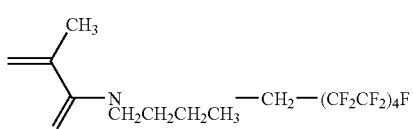
F-56

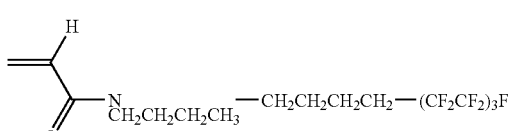
F-57

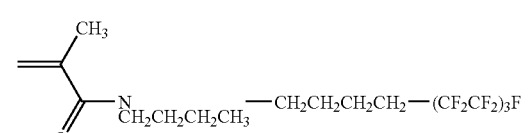
F-58

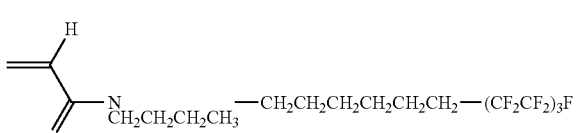
F-59

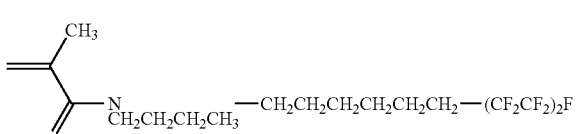
F-60

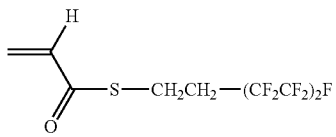
F-61

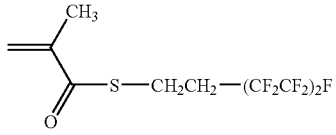
F-62

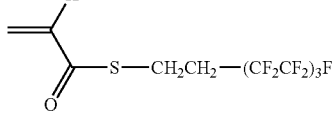
F-63

F-64

In formula [2], $R_3$ represents a hydrogen atom or a methyl group, and Y represents a divalent linking group. The divalent linking group is preferably an oxygen atom, a sulfur atom or —N($R_5$)—, wherein $R_5$ is preferably a hydrogen atom or an alkyl group having from 1 to 4 carbon atoms, such as methyl group, ethyl group, propyl group or butyl group, and more preferably a hydrogen atom or a methyl group.

Y is preferably an oxygen atom, —N(H)— or —N($CH_3$)—.

$R_4$ represents a linear, branched or cyclic alkyl group having from 4 to 20 carbon atoms, which may have a substituent. Examples of the substituent of the alkyl group represented by $R_4$ include a hydroxyl group, an alkylcarbonyl group, an arylcarbonyl group, a carboxyl group, an alkyl ether group, an aryl ether group, a halogen atom such as fluorine, chlorine and bromine, a nitro group, a cyano group and an amino group, but the substituent is not limited thereto. Examples of the linear, branched or cyclic alkyl group having from 4 to 20 carbon atoms, which is suitably used, include a linear or branched butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched octadecyl group, a linear or branched eicosanyl group, a monocyclic cycloalkyl group such as cyclohexyl group and cycloheptyl group, and a polycyclic cycloalkyl group such as bicycloheptyl group, bicyclodecyl group, tricycloundecyl group tetracyclododecyl group, adamantyl group, norbornyl group and tetracyclodecyl group.

Specific examples of the monomer represented by formula [2] are set forth below, however, the monomer is not limited thereto.

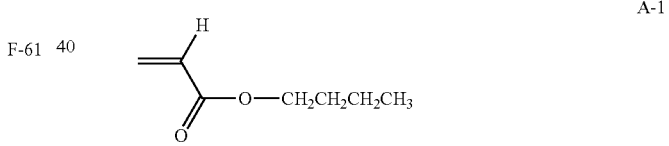
A-1

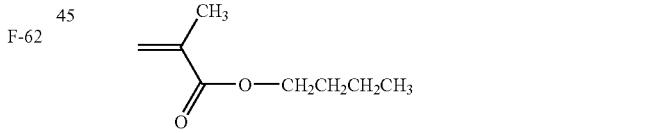
A-2

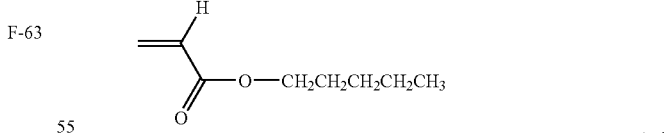
A-3

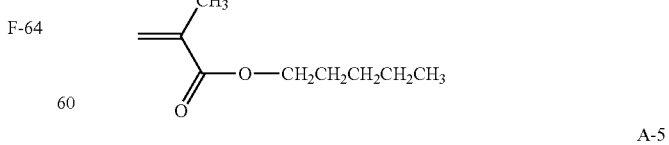
A-4

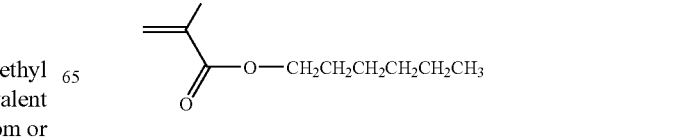
A-5

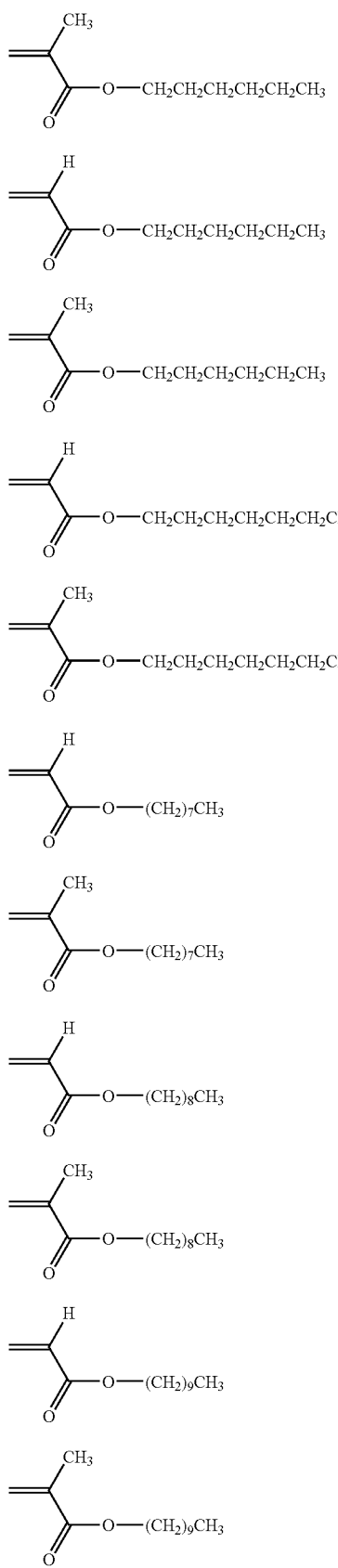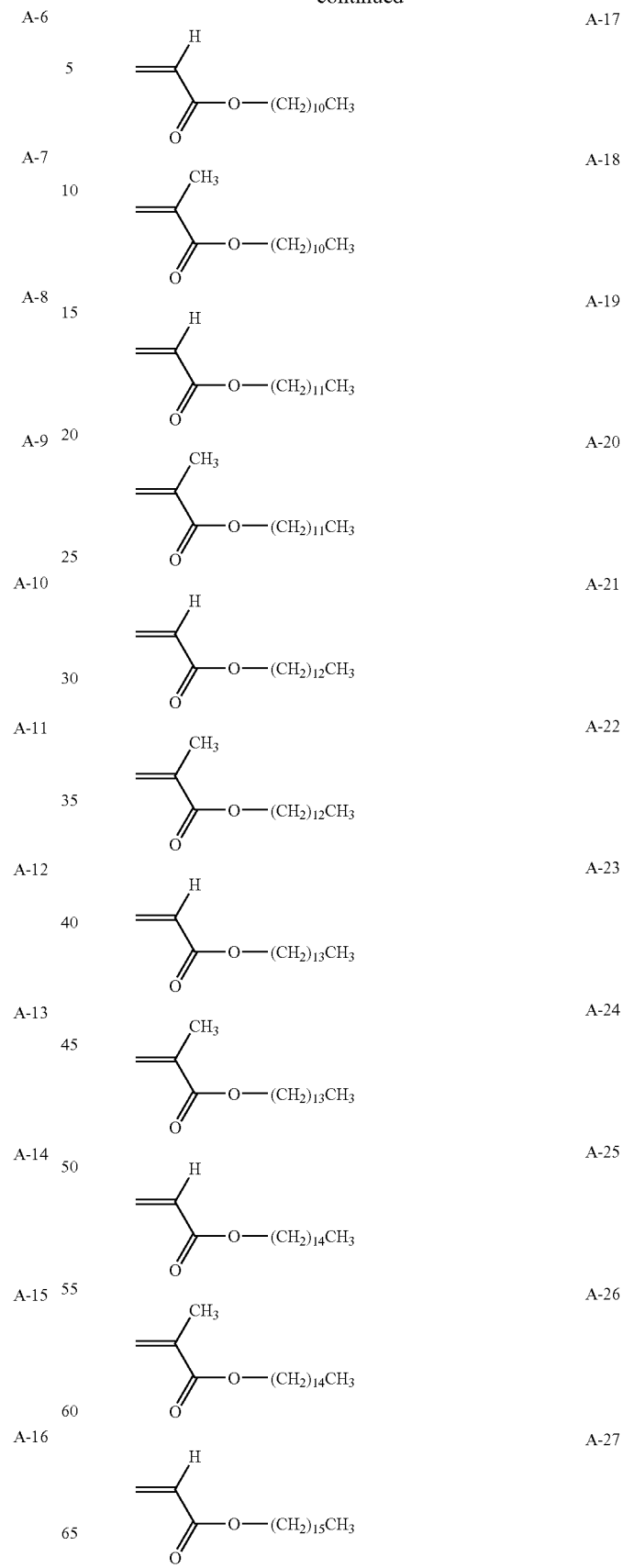

-continued
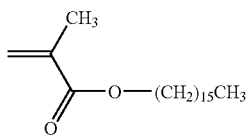 A-28
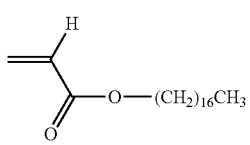 A-29
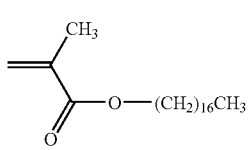 A-30
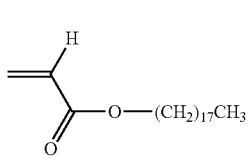 A-31
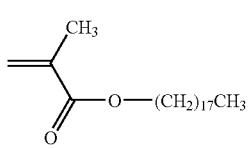 A-32
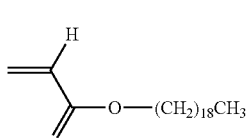 A-33
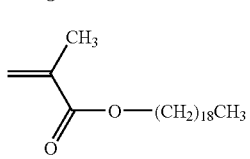 A-34
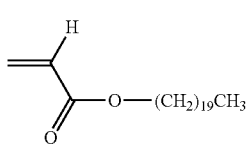 A-35
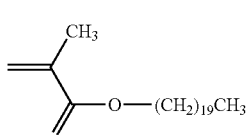 A-36
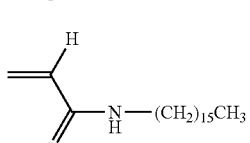 A-37
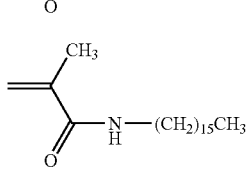 A-38
-continued
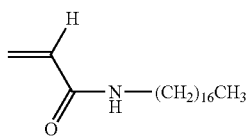 A-39
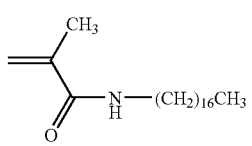 A-40
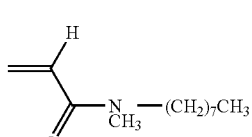 A-41
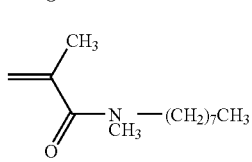 A-42
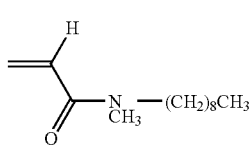 A-43
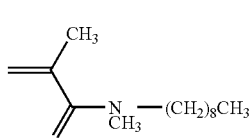 A-44
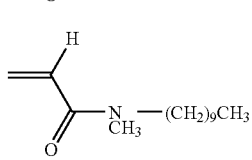 A-45
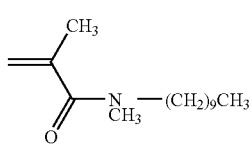 A-46
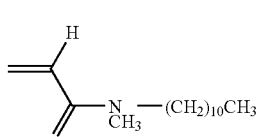 A-47
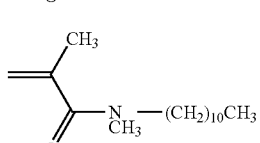 A-48
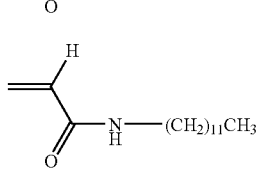 A-49

-continued
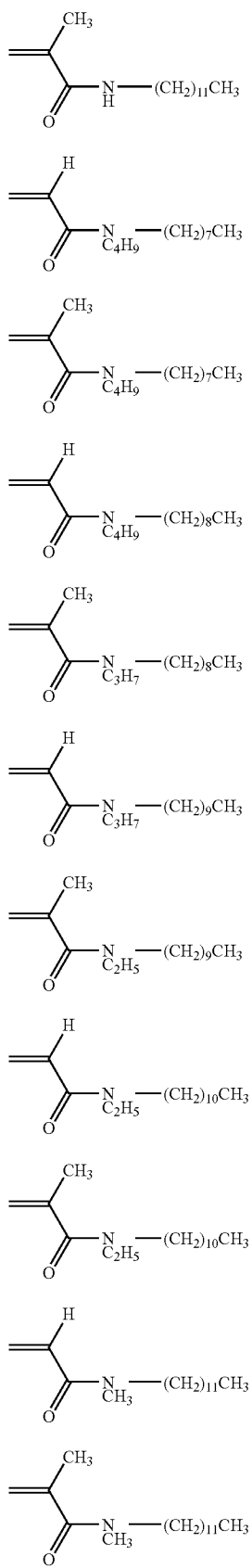
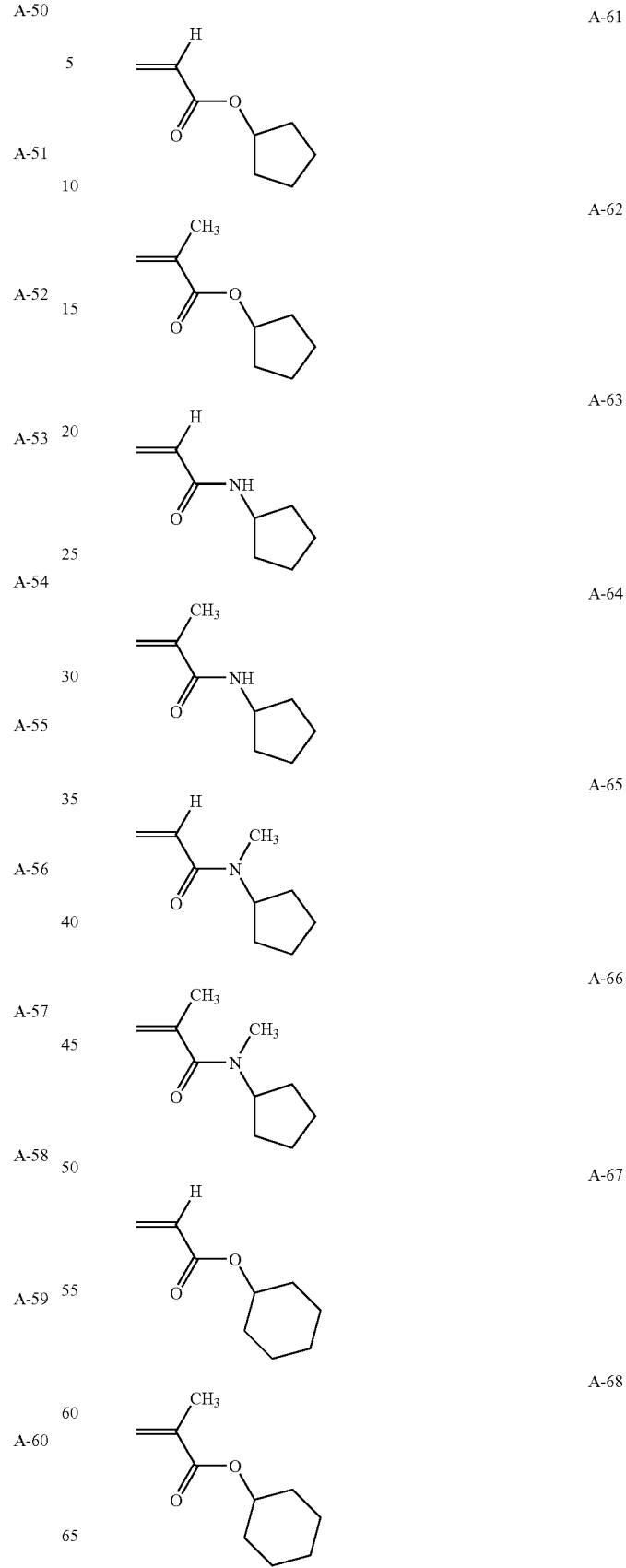

-continued
A-69 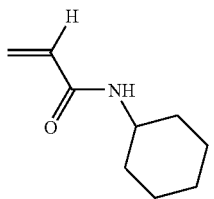
A-70 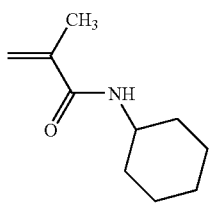
A-71 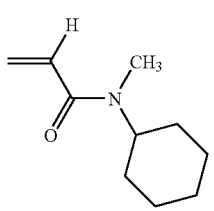
A-72 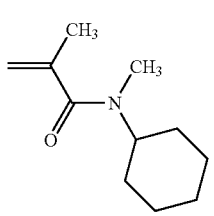
A-73 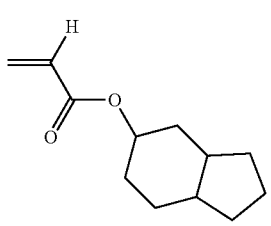
A-74 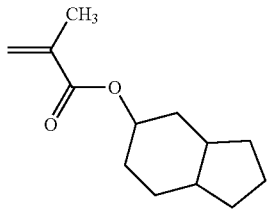
A-75 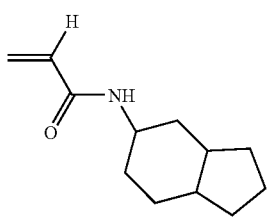
-continued
A-76 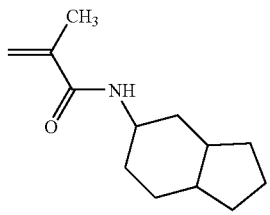
A-77 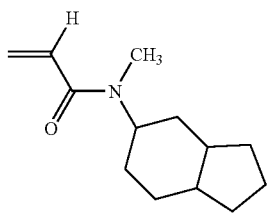
A-78 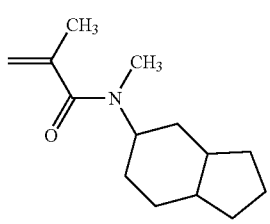
A-79 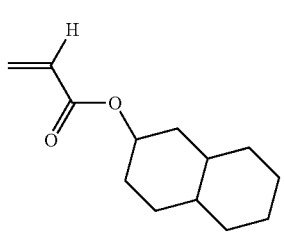
A-80 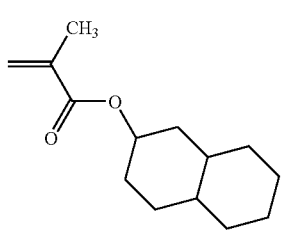
A-81 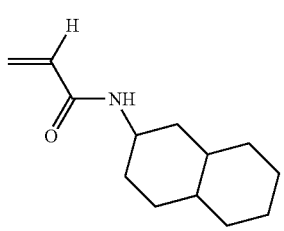
A-82 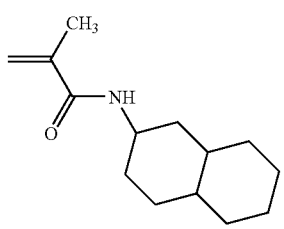

-continued
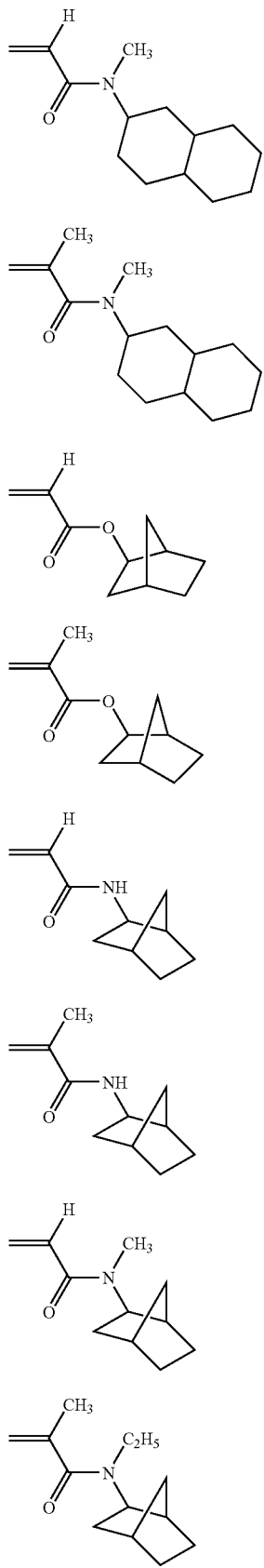
A-83
A-84
A-85
A-86
A-87
A-88
A-89
A-90
-continued
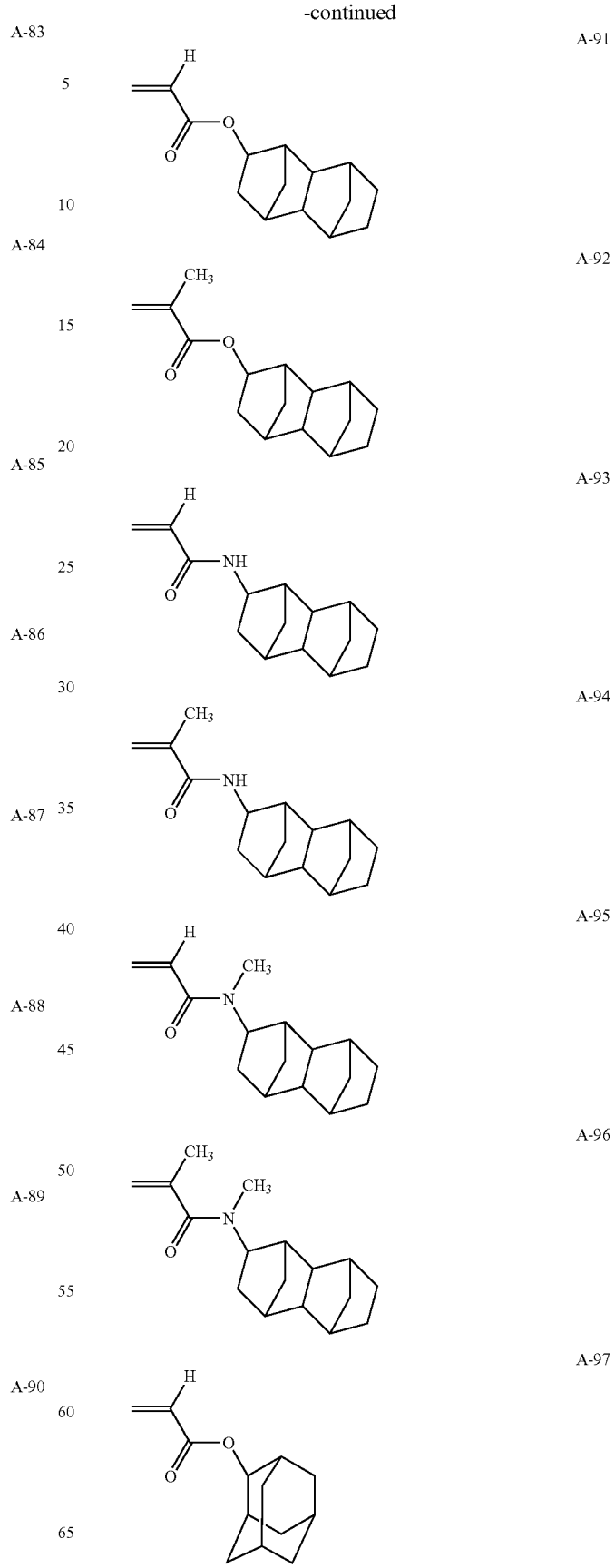
A-91
A-92
A-93
A-94
A-95
A-96
A-97

A-98 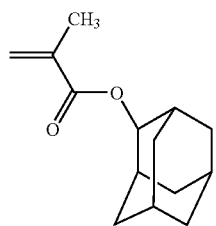
A-99 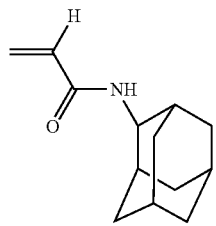
A-100 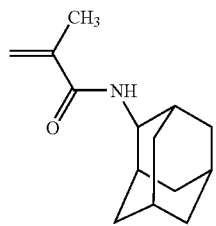
A-101 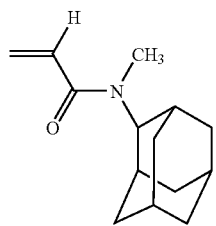
A-102 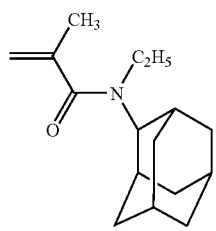
A-103 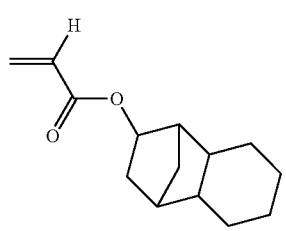
A-104 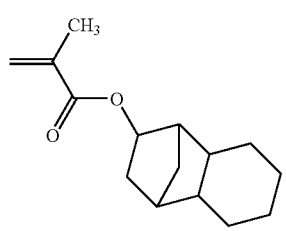
A-105 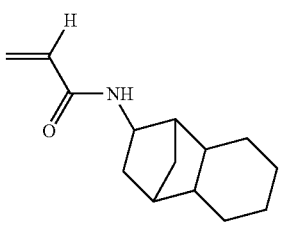
A-106 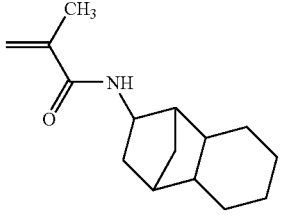
A-107 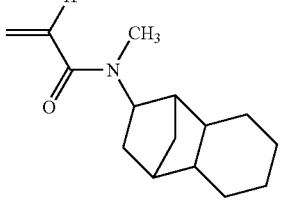
A-108 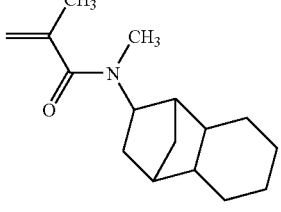
A-109 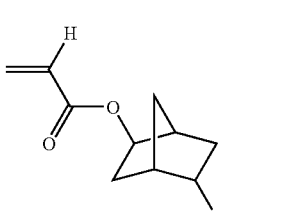
A-110 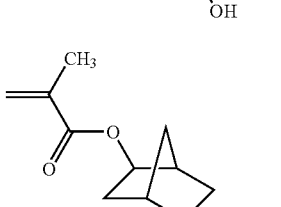
A-111 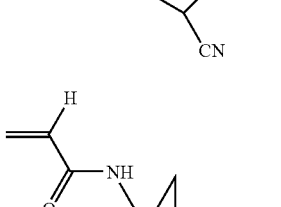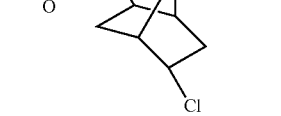

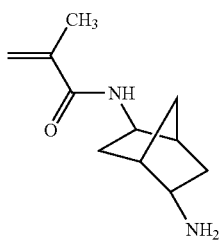
A-112
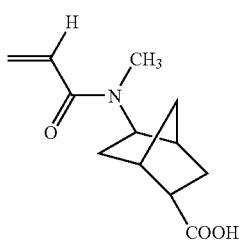
A-113
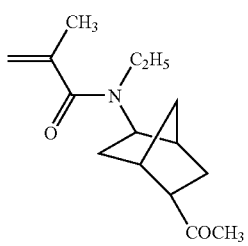
A-114
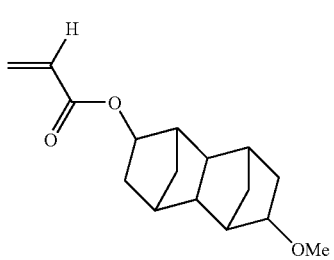
A-115
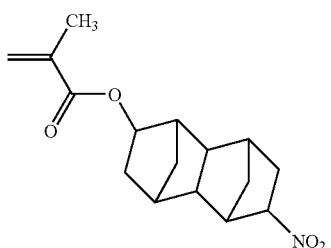
A-116
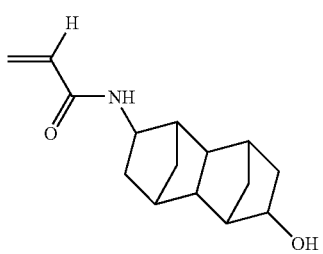
A-117
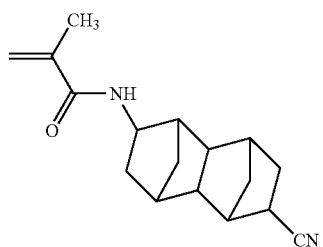
A-118
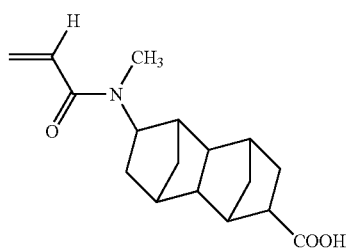
A-119
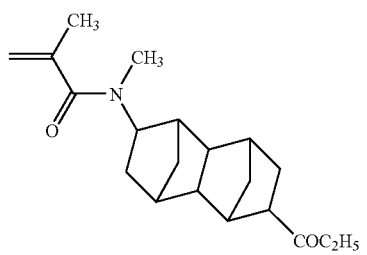
A-120
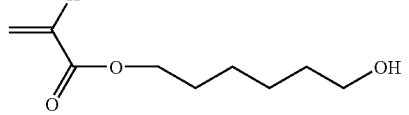
A-121
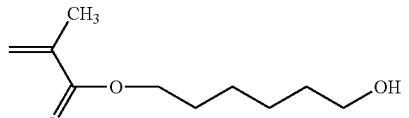
A-122
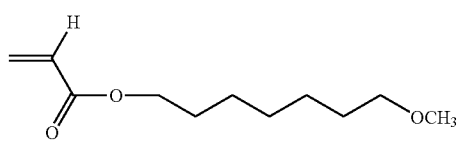
A-123
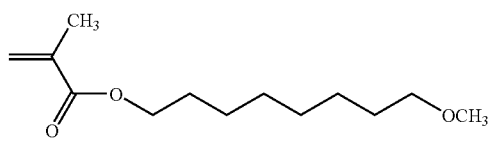
A-124

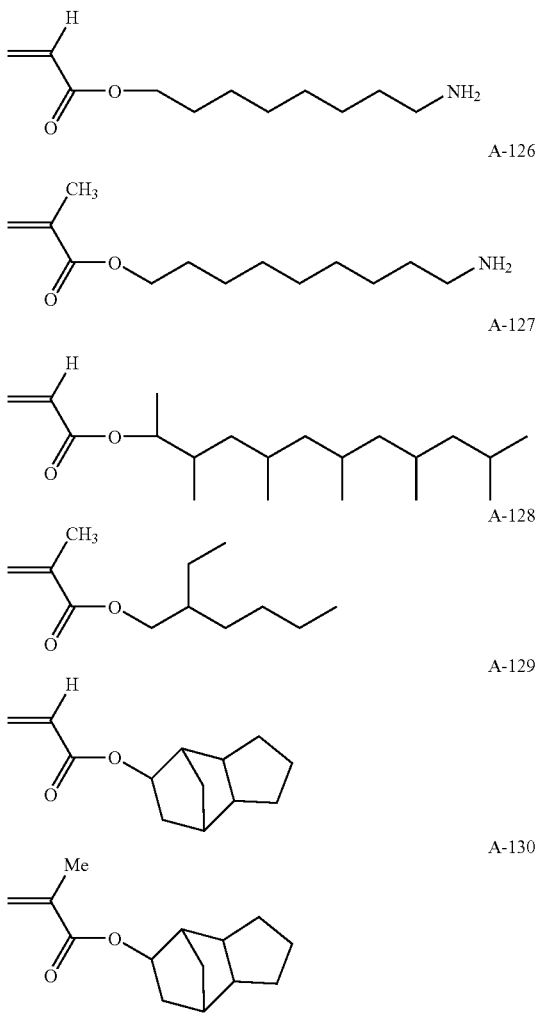

The poly(oxyalkylene) acrylate and/or poly(oxy-alkylene) methacrylate which are an essential component of the optically anisotropic layer constituting the optical film of the present invention are described below (hereinafter, when acrylate and methacrylate both are indicated, these are sometimes collectively called "(meth)acrylate").

The polyoxyalkylene can be represented by $(OR)_x$, wherein R is an alkylene group having from 2 to 4 carbon atoms and preferably, for example, —$CH_2CH_2$—, —$CH_2CH_2CH_2$, —$CH(CH_3)CH_2$— or —$CH(CH_3)CH(CH_3)$—.

In the poly(oxyalkylene) group, the oxyalkylene units may be the same as in poly(oxypropylene), or two or more oxyalkylene units differing from each other may be irregularly distributed. Also, the oxyalkylene unit may be a linear or branched oxypropylene or oxyethylene unit, or may be present as a block of linear or branched oxypropylene units or a block of oxyethylene units.

This poly(oxyalkylene) chain may contain a plurality of poly(oxyalkylene) units connected with each other through one or more linking bond (for example, —CONH-Ph-NHCO— or —S—, wherein Ph represents a phenylene group). In the case where the linking bond has three or more valences, this provides means for obtaining a branched oxyalkylene unit. In the case of using this copolymer in the present invention, the molecular weight of the poly(oxyalkylene) group is suitably from 250 to 3,000.

The poly(oxyalkylene) acrylate or methacrylate can be produced by reacting a commercially available hydroxypoly(oxyalkylene) material, for example, a product available under the trade name "Pluronic" (produced by Asahi Denka Co., Ltd.), "Adeka Polyether" (produced by Asahi Denka Co., Ltd.), "Carbowax" (produced by Glyco Products Co.), "Toriton" (produced by Rohm and Haas Co.) or "P.E.G." (produced by Dai-ichi Kogyo Seiyaku Co., Ltd.), with an acrylic acid, a methacrylic acid, an acryl chloride, a methacryl chloride or an acrylic anhydride by a known method.

A poly(oxyalkylene) diacrylate or the like produced by a known method may also be used.

In the present invention, a copolymer of a monomer represented by formula [1] and a polyoxyalkylene (meth)acrylate is used as an essential component of the optically anisotropic layer, and the copolymer preferably contains a polyoxyethylene (meth)acrylate.

A particularly preferred embodiment is a polymer obtained by copolymerizing three or more monomers of a monomer represented by formula [1], a polyoxyethylene (meth)acrylate and a polyoxyalkylene (meth)acrylate. Here, the polyoxyalkylene (meth)acrylate is a monomer different from the polyoxyethylene (meth)acrylate.

A ternary copolymer of a polyoxyethylene (meth)acrylate, a polyoxypropylene (meth)acrylate and a monomer represented by formula [1] is more preferred.

The copolymerization ratio of polyoxyethylene (meth)acrylate is preferably from 0.5 to 20 mol %, more preferably from 1 to 10 mol %, in all monomers.

The copolymer of a monomer represented by formula [1], a poly(oxyalkylene) acrylate and/or a poly(oxyalkylene) methacrylate and a monomer represented by formula [2] may be a copolymer obtained by reacting these monomers and additionally a monomer copolymerizable therewith.

The copolymerization ratio of this copolymerizable monomer is preferably 20 mol % or less, more preferably 10 mol % or less, in all monomers.

As this monomer, those described in J. Brandrup, *Polymer Handbook,* 2nd ed., Chapter 2, pp. 1-483, Wiley Interscience (1975) may be used.

Examples thereof include compounds having one addition polymerizable unsaturated bond selected from acrylic acid, methacrylic acid, acrylic esters, methacrylic esters, acrylamides, methacrylamides, allyl compounds, vinyl ethers and vinyl esters.

Specific examples of the monomer include the followings.

Acrylic esters:

methyl acrylate, ethyl acrylate, propyl acrylate, chloroethyl acrylate, 2-hydroxyethyl acrylate, trimethylol-propane monoacrylate, benzyl acrylate, methoxybenzyl acrylate, furfuryl acrylate, tetrahydrofurfuryl acrylate, etc.

Methacrylic Esters:

methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, etc.

Acrylamides:

acrylamide, N-alkylacrylamide (the alkyl group is an alkyl group having from 1 to 3 carbon atoms, e.g., methyl, ethyl, propyl), N,N-dialkylacrylamide (the alkyl group is an alkyl group having from 1 to 3 carbon atoms), N-hydroxyethyl-N-methylacrylamide, N-2-acetamidoethyl-N-acetylacrylamide, etc.

Methacrylamides:
methacrylamide, N-alkylmethacrylamide (the alkyl group is an alkyl group having from 1 to 3 carbon atoms, e.g., methyl, ethyl, propyl), N,N-dialkylmethacrylamide (the alkyl group is an alkyl group having from 1 to 3 carbon atoms), N-hydroxyethyl-N-methylmethacrylamide, N-2-acetamidoethyl-N-acetylmethacrylamide, etc.

Allyl Compounds:
allyl esters (e.g., allyl acetate, allyl caproate, allyl caprylate, allyl laurate, allyl palmitate, allyl stearate, allyl benzoate, allyl acetoacetate, allyl lactate), allyl oxyethanol, etc.

Vinyl Ethers:
alkyl vinyl ethers (e.g., hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether), etc.

Vinyl Esters:
vinyl butyrate, vinyl isobutyrate, vinyl trimethyl-acetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, vinyl cyclohexylcarboxylate, etc.

Dialkyl Itaconates:
dimethyl itaconate, diethyl itaconate, dibutyl itaconate, etc.

Dialkyl Esters or Monoalkyl Esters of Fumaric Acid:
dibutyl fumarate, etc.

Others:
crotonic acid, itaconic acid, acrylonitrile, methacrylonitrile, maleylonitrile, styrene, etc.

Some fluorine-base chemical products produced by electrolytic fluorination which has been heretofore preferably used are a less biodegradable and highly bioaccumulating substance and although not in a serious degree, their genital toxicity and growth toxicity are concerned. The fluorine-base polymer for use in the present invention is a substance having higher environmental safety and this is advantageous in industry.

The amount of the fluoroaliphatic group-containing monomer represented by formula [1] in the fluorine-base polymer for use in the present invention is 5 mol % or more, preferably from 5 to 70 mol %, more preferably from 7 to 60 mol %, of the total amount of constituent monomers of the polymer.

The amount of the poly(oxyalkylene) acrylate and/or poly(oxyalkylene) methacrylate as an essential component in the fluorine-base polymer for use in the present invention is 10 mol % or more, preferably from 15 to 70 mol %, more preferably from 20 to 60 mol %, of the total amount of constituent monomers of the fluorine-base polymer.

The amount of monomer represented by formula [2], which is preferably used in the fluorine-base polymer of the present invention, is 3 mol % or more, preferably from 5 to 50 mol %, more preferably from 10 to 40 mol %, of the total amount of constituent monomers of the fluorine-base polymer.

The weight average molecular weight of the fluorine-base polymer for use in the present invention is preferably from 3,000 to 100,000, more preferably from 6,000 to 80,000.

The content of the fluorine-base polymer for use in the present invention is preferably from 0.005 to 8 mass %, more preferably from 0.01 to 1 mass %, still more preferably from 0.05 to 0.5 mass %, based on the coating composition (coating components excluding the solvent) mainly comprising a liquid crystal compound. If the amount of the fluorine-base polymer added is less than 0.005 mass %, the effect is insufficient, whereas if it exceeds 8 mass %, the drying of coating film does not sufficiently proceed or the performance (for example, uniformity of retardation) as the optical film is adversely affected.

The fluorine-base polymer for use in the present invention can be produced by a conventionally and commonly employed method. For example, the fluorine-base polymer can be produced by adding a general-purpose radical polymerization initiator in an organic solvent containing the above-described monomers such as fluoroaliphatic group-containing (meth)acrylate and polyoxyalkylene group-containing (meth)acrylate, and polymerizing these monomers. Also, depending on the case, another addition polymerizable unsaturated compound is further added and thereafter, the fluorine-base polymer can be produced by the same method as above. According to the polymerizability of each monomer, a dropping polymerization method of performing the polymerization while adding dropwise the monomers and the initiator in a reactor may be employed and this is effective for obtaining a polymer having a uniform composition.

Specific structure examples of the fluorine-base polymer for use in the present invention are set forth below, however, the present invention is not limited thereto. In formulae, the numeral shows the molar ratio of each monomer component and Mw represents a weight average molecular weight.

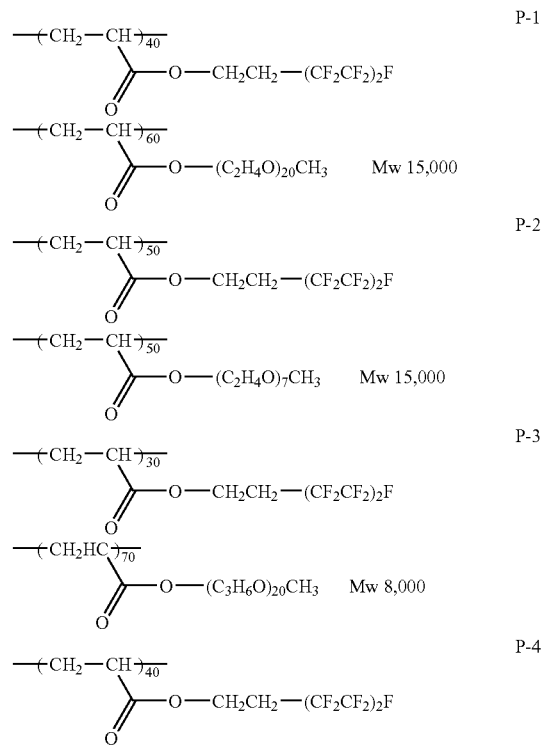

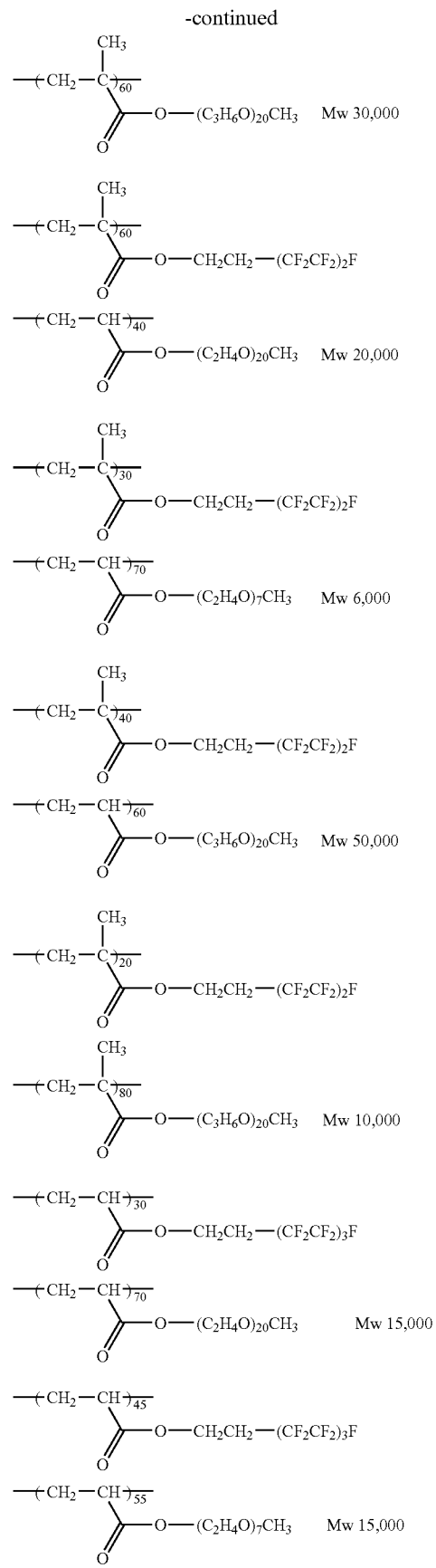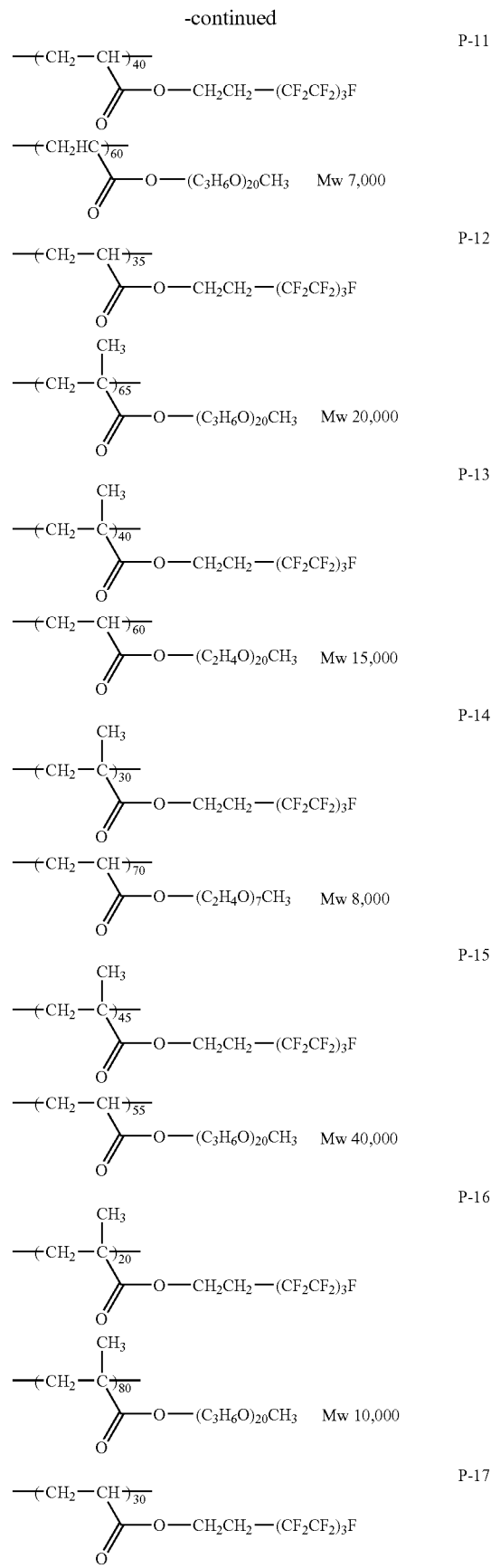

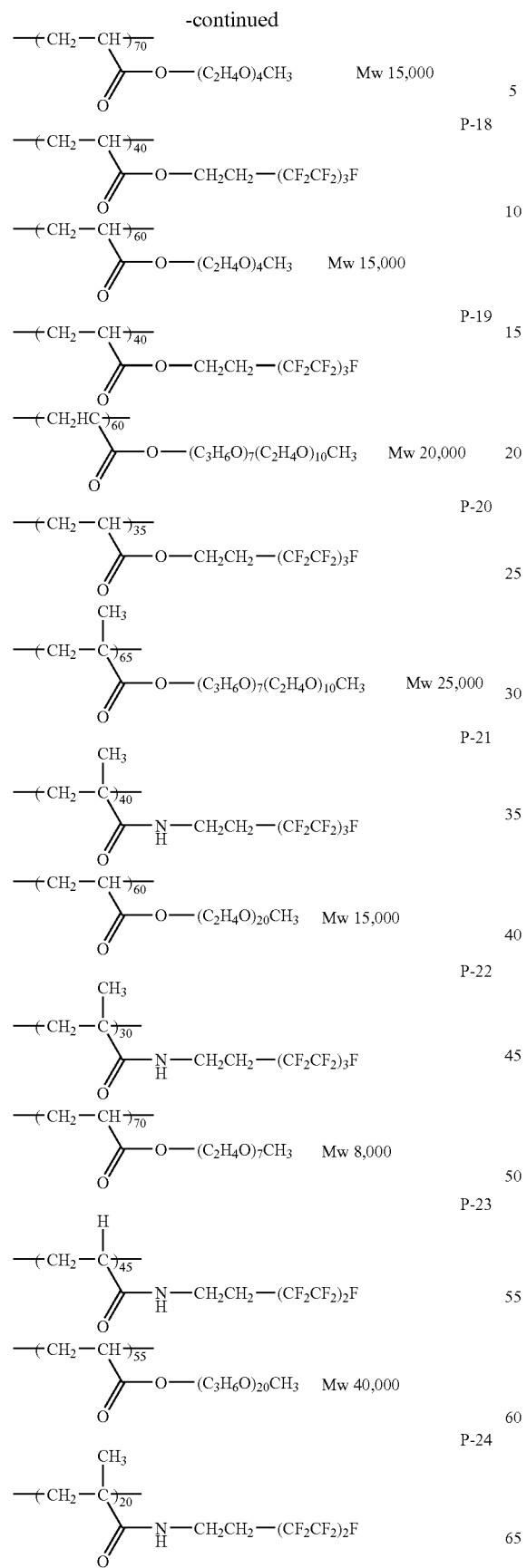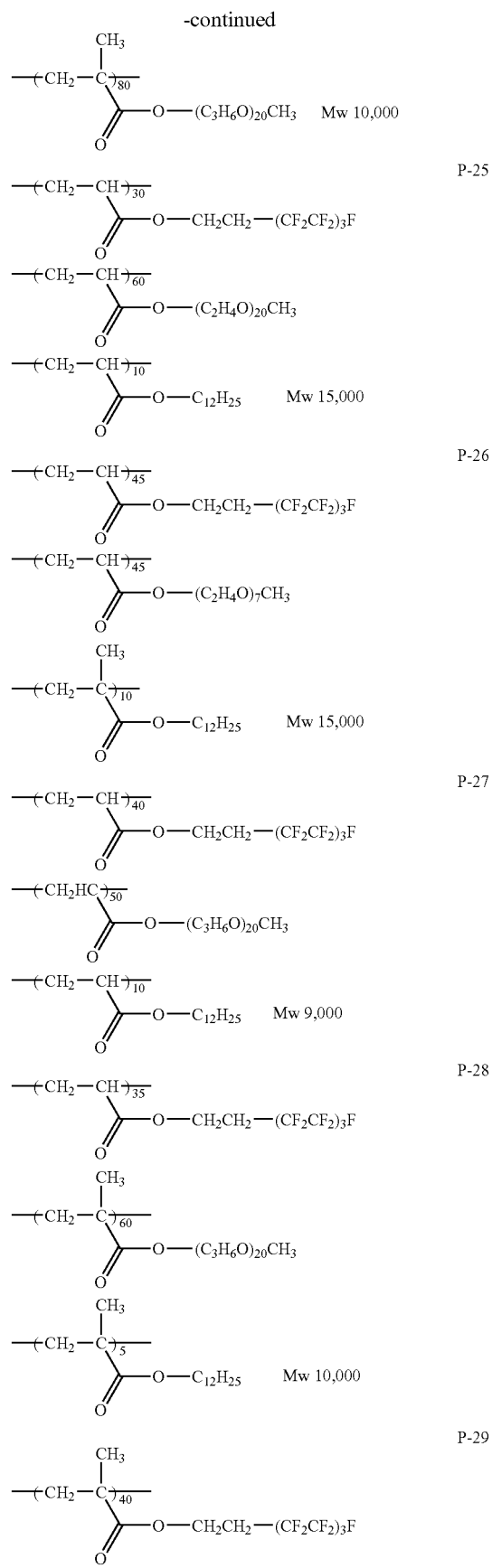

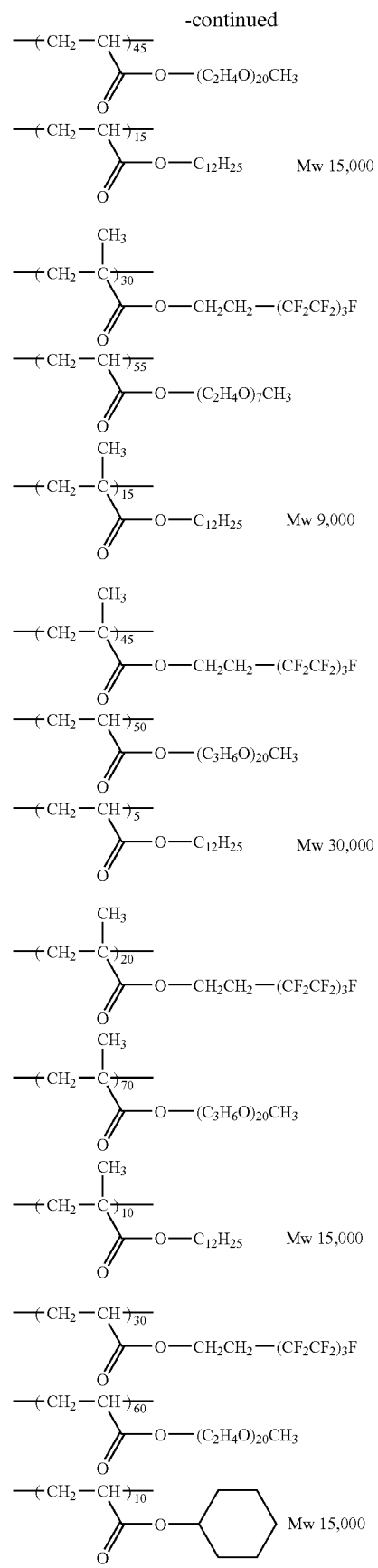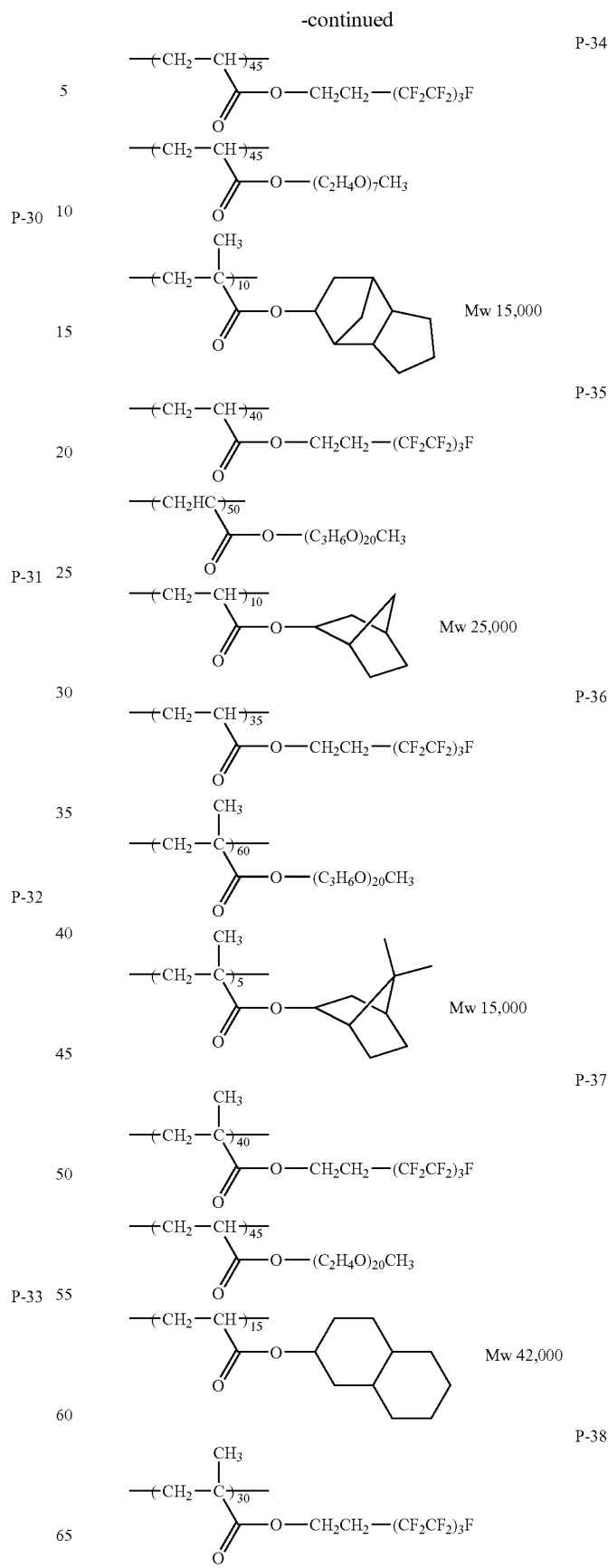

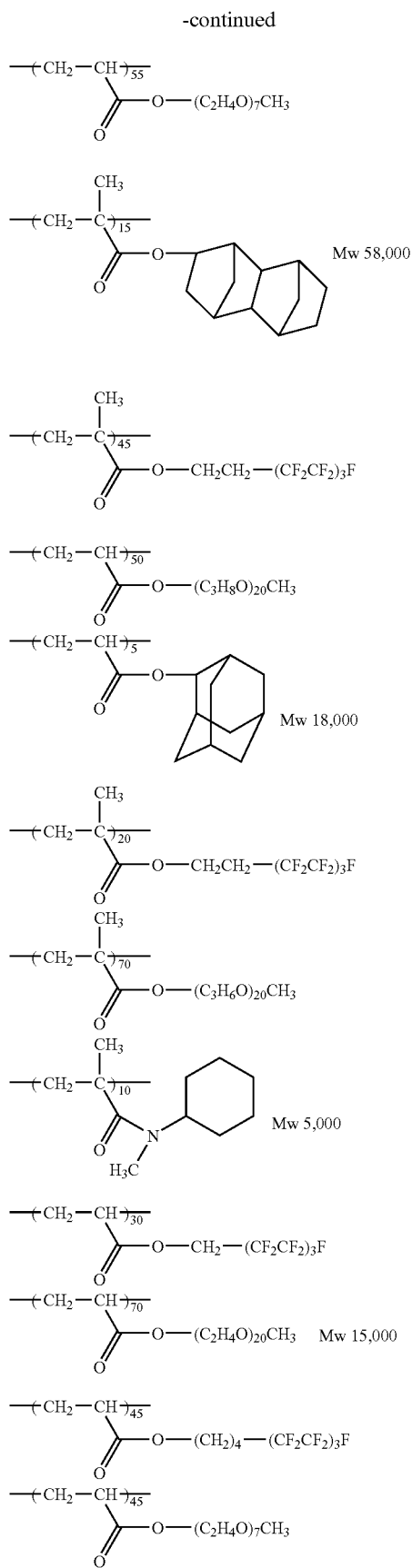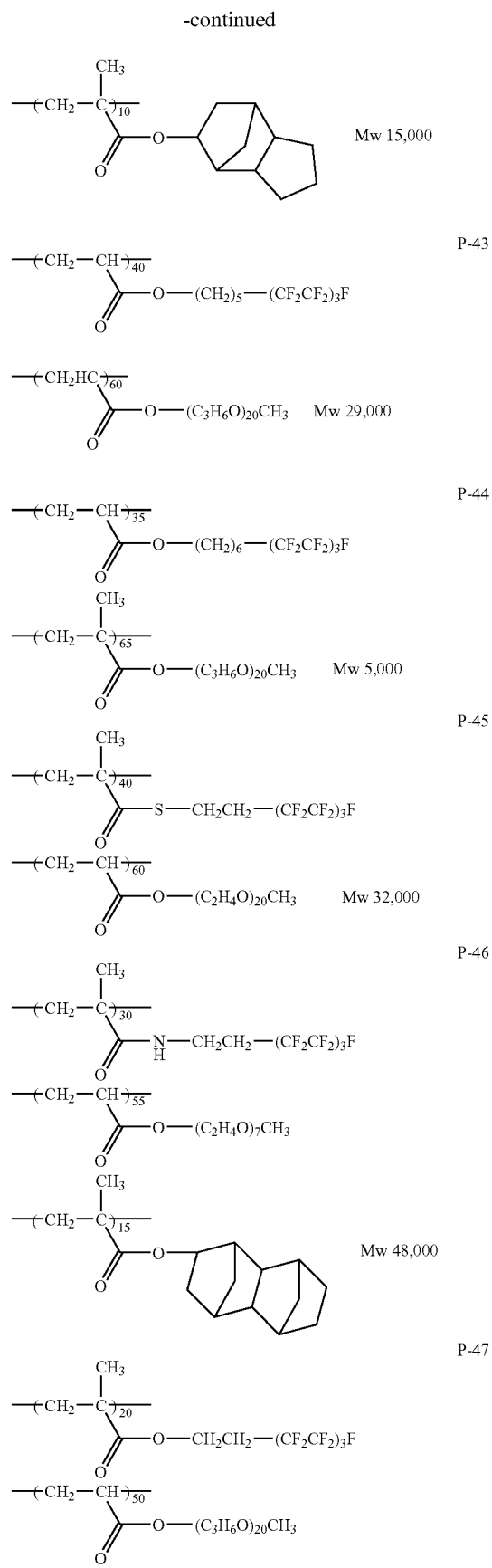

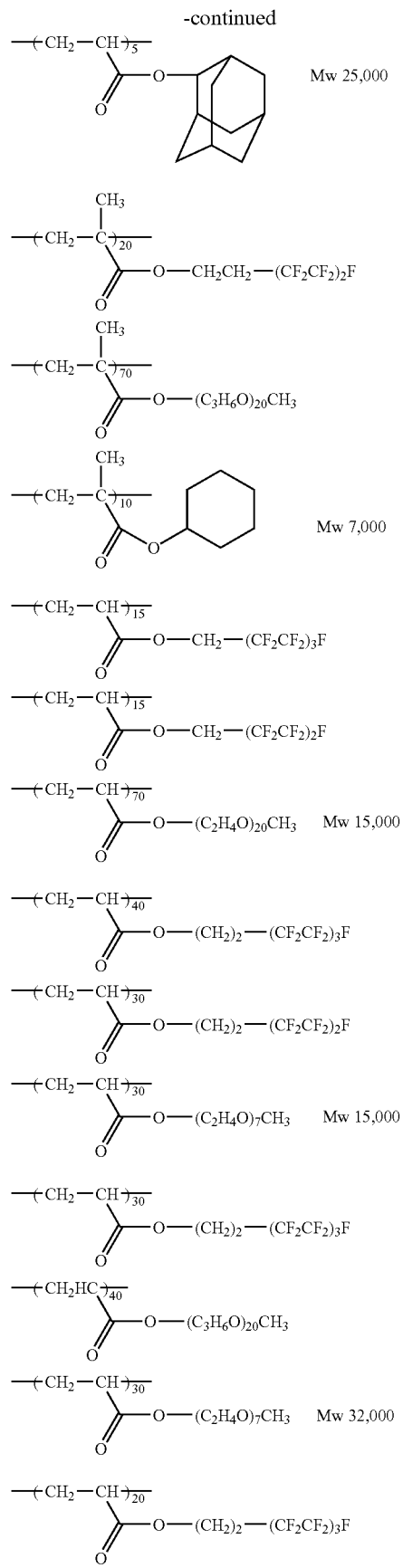
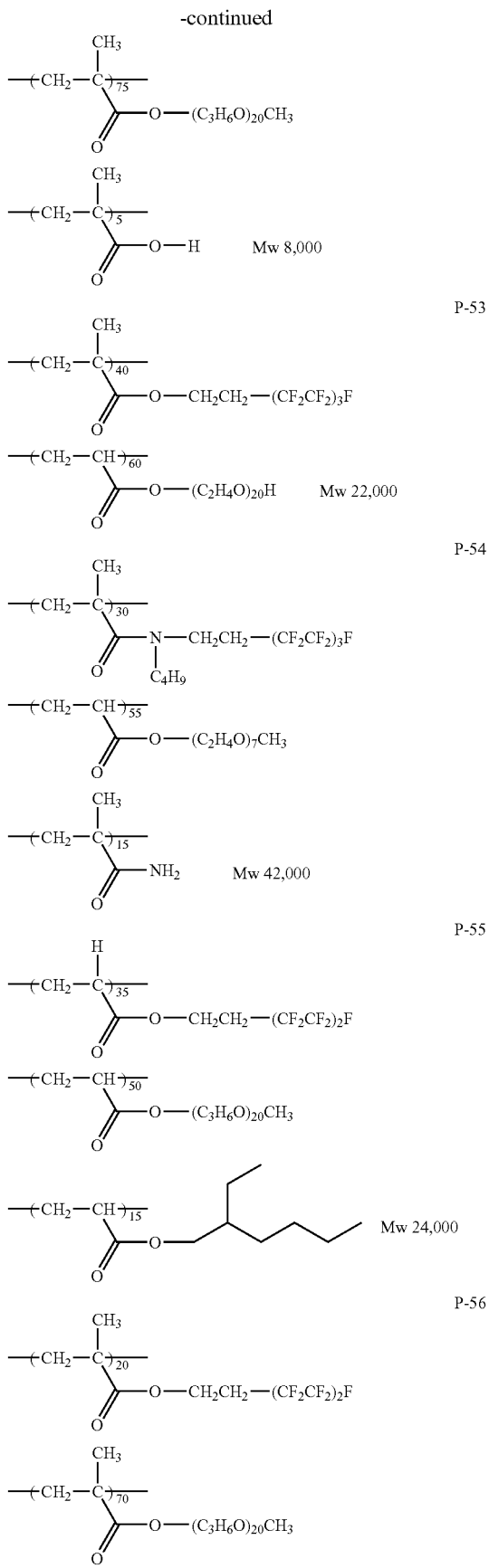

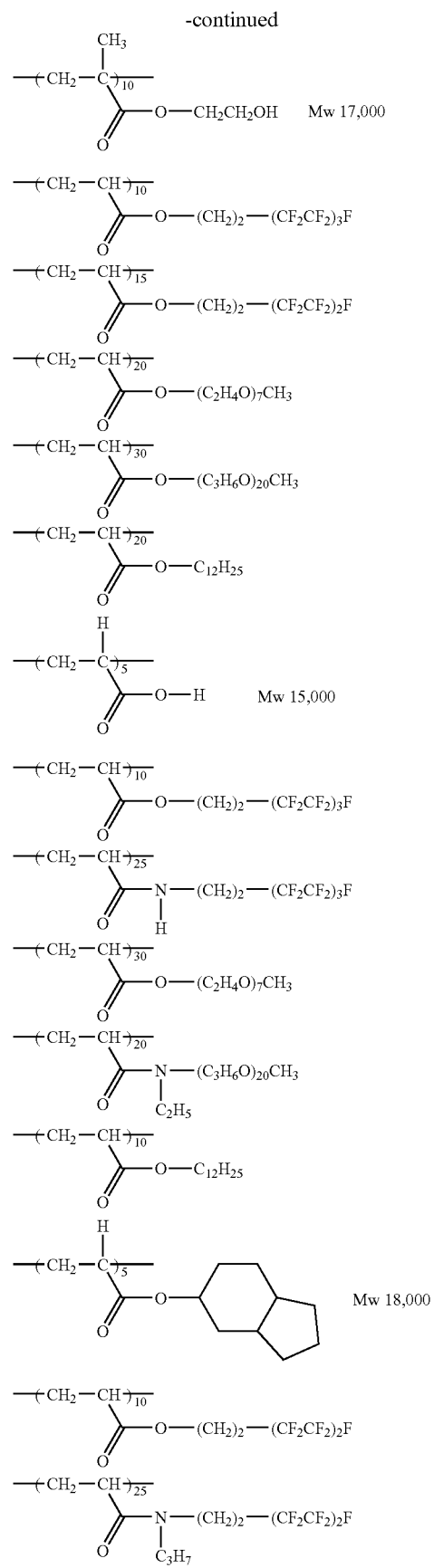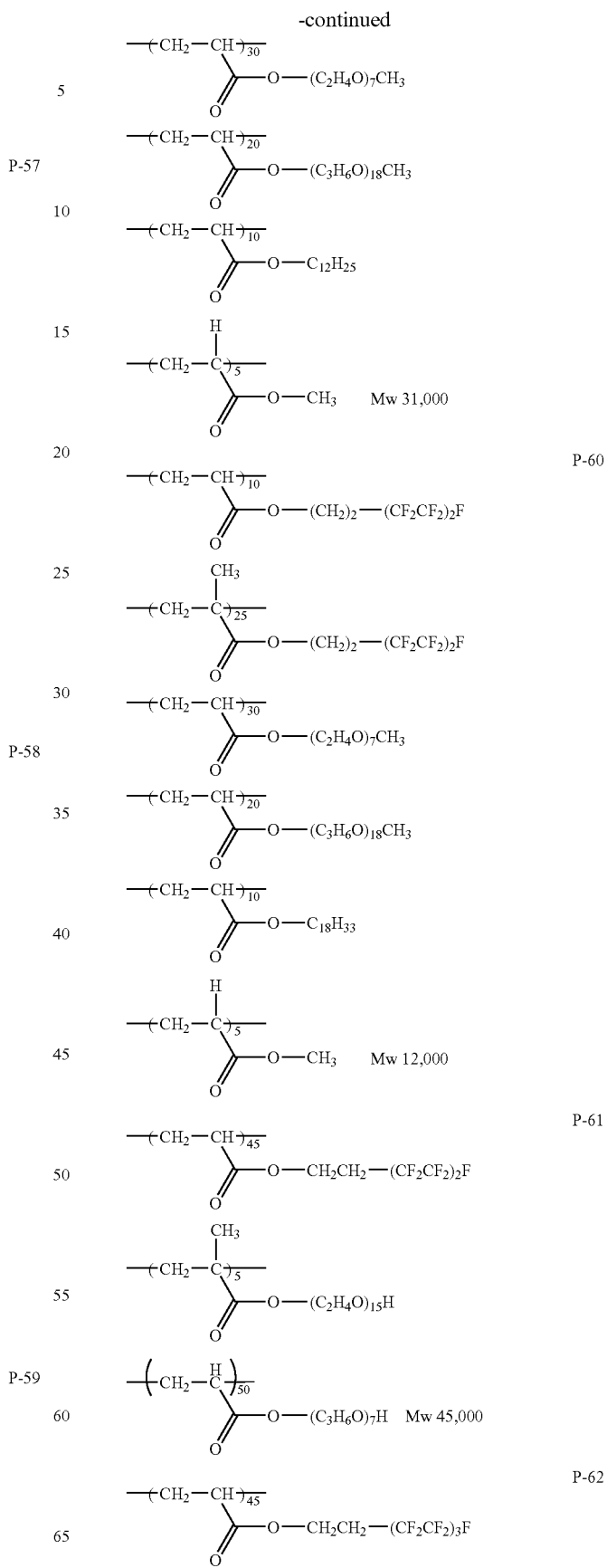

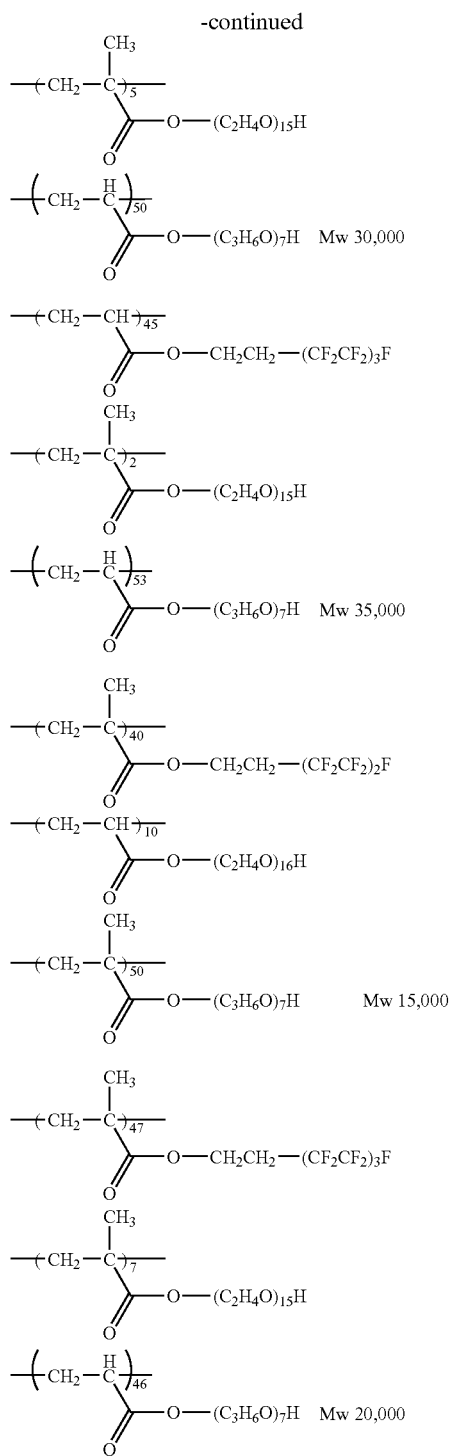

P-63

P-64

P-65

The physical properties of the coating solution for forming the optically anisotropic layer or orientation film in the present invention are described below.

The optically anisotropic layer of the present invention is preferably formed by simultaneously applying a coating solution containing a liquid crystalline molecule and a coating solution containing a surface active agent such that the coating solution containing a surface active agent comes to an upper layer. In this case, the coating solution containing a liquid crystalline molecule and the coating solution containing a surface active agent each preferably has the following liquid properties.

The viscosity of the surface active agent-containing coating solution for forming the orientation film or the like is preferably from 0.1 to 40 cp, more preferably from 1 to 15 cp. The surface tension is preferably 50 dyne/cm or less, more preferably 40 dyne/cm or less. The amount of the coating solution coated is preferably from 1 t0 80 ml/m$^2$, more preferably from 2 to 50 ml/m$^2$.

The viscosity of the liquid crystalline molecule-containing coating solution for forming the optically anisotropic layer is preferably from 0.5 to 200 cp, more preferably from 2 to 100 cp. The amount of the coating solution coated is preferably 2 ml/m$^2$ or more, more preferably 52 ml/m$^2$.

The viscosity of the liquid crystalline molecule-containing coating solution is higher than the viscosity of the coating solution containing a fluorine-containing surface active agent and the difference in the viscosity between two coating solutions is preferably from 1 to 200 cp, more preferably from 2 to 100 cp. The amount coated of the liquid crystalline molecule-containing coating solution is preferably larger than the amount coated of the coating solution containing a fluorine-containing surface active agent and the difference in the amount coated between two coating solutions is preferably from 1 to 200 ml/m$^2$, more preferably from 2 to 100 ml/m$^2$. The surface tension of the liquid crystalline molecule-containing coating solution is preferably higher than the surface tension of the coating solution containing a fluorine-containing surface active agent by 0.5 dyne/cm or more, more preferably by 1.0 dyne/cm or more.

In general, the amount added of the surface active agent for use in the present invention is preferably from 0.001 to 100 mg/m$^2$, preferably from 0.01 to 50 mg/m$^2$.

In the present invention, the coating solution containing a fluorine-containing surface active agent for forming, for example, the orientation film and the liquid crystalline molecule-containing coating solution for forming the optically anisotropic layer are simultaneously coated. The simultaneous coating can be performed by using an extrusion-type hopper or a slide-type hopper.

[Transparent Support]

As the transparent support of the optical compensating sheet, a polymer film having optical isotropy is usually used. The term "transparent" means that the light transmittance is 80% or more. The term "optical isotropy" means that the in-plane retardation (Re) is preferably 10 nm or less, more preferably 5 nm or less. The retardation in the thickness direction (Rth) is preferably 40 nm or less, more preferably 20 nm or less. The in-plane retardation (Re) and the retardation in the thickness direction (Rth) are defined by the following formulae, respectively.

$$Re=(nx-ny)\times d$$

$$Rth=[\{(nx+ny)/2\}-nz]\times d$$

wherein nx and ny each is an in-plane refractive index of the transparent support, nz is a refractive index in the thickness direction of the transparent support, and d is a thickness of the transparent support.

Depending on the type of liquid crystal display mode, an optically anisotropic polymer film is sometimes used as the transparent support. In other words, the optical anisotropy of the liquid crystal cell is sometimes coped with (optically compensated) not only by the optical anisotropy of the optically anisotropic layer but also by the optical anisotropy of the transparent support. In the case of using an optically anisotropic transparent support for such a purpose, the in-plane retardation (Re) of the transparent support is preferably 20 nm or more, more preferably 30 nm or more. The retardation (Rth) in the thickness direction is preferably 80 nm or more, more preferably 120 nm or more.

The material for forming the transparent support is determined according to the type of transparent support, that is, whether the transparent support is an optically isotropic support or an optically anisotropic support. In the case of an optically isotropic support, glass or a cellulose ester is generally used. In the case of an optically anisotropic support, a synthetic polymer (e.g., polycarbonate, polysulfone, polyether sulfone, polyacrylate, polymethacrylate, norbornene resin) is used. By stretching the synthetic polymer, optical anisotropy is obtained. However, a cellulose ester film having high retardation (optical anisotropy) can also be produced by (1) using a retardation increasing agent described in EP-A-0911656, (2) decreasing the acetylation degree of cellulose acetate, or (3) employing a cooling dissolution method. The cellulose ester or synthetic polymer film is preferably formed by a solvent casting method. The thickness of the transparent support is preferably from 20 to 500 µm, more preferably from 50 to 200 µm. In order to improve the adhesion between the transparent support and a layer provided thereon (adhesive layer, orientation film or optically anisotropic layer), the transparent support may be subjected to a surface treatment (e.g., glow discharge treatment, corona discharge treatment, ultraviolet (UV) treatment, flame treatment). An adhesive layer (undercoat layer) may also be provided on the transparent support.

[Orientation Film]

The orientation film has a function of specifying the aligning direction of liquid crystal molecules in the optically anisotropic layer.

The orientation film can be provided by a method such as rubbing treatment of an organic compound (preferably a polymer), oblique vapor deposition of an inorganic compound, formation of a layer having microgrooves, or accumulation of an organic compound (e.g., ω-tricosanoic acid, diocta-decylmethylammonium chloride, methyl stearate) according to a Langmuir-Blodgett (LB film) method. Furthermore, an orientation film where the aligning function is generated upon application of an electric or magnetic field or irradiation with light is also known.

The orientation film is preferably formed by rubbing a polymer. The polymer is preferably a polyvinyl alcohol, more preferably a modified polyvinyl alcohol bonded with a hydrophobic group. The hydrophobic group has affinity for the liquid crystalline molecule of the optically anisotropic layer and therefore, by introducing a hydrophobic group into the polyvinyl alcohol, the liquid crystalline molecules can be uniformly aligned. The hydrophobic group is bonded to the main chain terminal or side chain of polyvinyl alcohol.

The hydrophobic group is preferably an aliphatic group (preferably an alkyl group or an alkenyl group) having 6 or more carbon atoms, or an aromatic group.

In the case of bonding a hydrophobic group to the main chain terminal of polyvinyl alcohol, a linking group is preferably introduced between the hydrophobic group and the main chain terminal. Examples of the linking group include —S—, —C(CN)$R^1$, —$NR^2$—, —CS— and a combination thereof, wherein $R^1$ and $R^2$ each is a hydrogen atom or an alkyl group having from 1 to 6 carbon atoms, preferably an alkyl group having from 1 to 6 carbon atoms.

In the case of introducing the hydrophobic group into the side chain of polyvinyl alcohol, this may be attained by replacing a part of acetyl groups (—CO—$CH_3$) in the vinyl acetate unit of polyvinyl alcohol by an acyl group (—CO—$R^3$) having 7 or more carbon atoms. $R^3$ is an aliphatic group having 6 or more carbon atoms or an aromatic group.

A commercially available modified polyvinyl alcohol (for example, MP103, MP203 and R1130 produced by Kuraray Co., Ltd.) may also be used.

The saponification of the (modified) polyvinyl alcohol used for the orientation film is preferably 80% or more and the polymerization degree of the (modified) polyvinyl alcohol is preferably 200 or more.

The rubbing treatment is performed by rubbing the surface of orientation film with paper or cloth several times along a constant direction. A cloth uniformly flocked with fibers having uniform length and size is preferably used.

When discotic liquid crystalline molecules of the optically anisotropic layer are once aligned by using an orientation film, even if the orientation film is removed thereafter, the aligned state of discotic liquid crystalline molecules can be maintained. That is, the orientation film is essential in the production of an elliptically polarizing plate for aligning discotic liquid crystalline molecules but is not essential in the produced optical compensating sheet.

In the case of providing an orientation film between the transparent support and the optically anisotropic layer, an undercoat layer (adhesive layer) may further be provided between the transparent support and the orientation film.

[Optical Compensating Sheet]

The optical compensating sheet of the present invention can be used for an elliptically polarizing plate by combining it with a polarizing film. Furthermore, when applied in combination with a polarizing film to a transmission-type liquid crystal display device, the optical compensating sheet contributes to the enlargement of view angle.

The elliptically polarizing plate and liquid crystal display device using the optical compensating sheet of the present invention are described below.

[Elliptically Polarizing Plate]

An elliptically polarizing plate can be produced by stacking the optical compensating sheet of the present invention and a polarizing film. By the use of the optical compensating sheet of the present invention, an elliptically polarizing plate capable of enlarging the view angle of a liquid crystal display device can be provided. That is, in a polarizing plate, a protective film is attached to both sides of a polarizing film and in the present invention, the optical compensating sheet of the present invention is used as a protective film in one side.

The polarizing film includes an iodine-type polarizing film, a dye-type polarizing film using a dichroic dye, and a polyene-type polarizing film. The iodine-type polarizing film and dye-type polarizing film are generally produced using a polyvinyl alcohol-base film. The polarization axis of polarizing film corresponds to the direction perpendicular to the stretching direction of film.

The polarizing film is stacked on the optically anisotropic layer side of the optical compensating sheet. On the surface of the polarizing film opposite the side where the optical compensating sheet is stacked, a transparent protective film is preferably formed. The transparent protective film preferably has a light transmittance of 80% or more. The transparent protective film is generally a cellulose ester film, preferably a triacetyl cellulose film. The cellulose ester film is preferably formed by a solvent casting method. The thickness of the transparent protective film is preferably from 20 to 500 μm, more preferably from 50 to 200 μm.

Such a polarizing plate of the present invention can be used for at least either one of polarizing plates disposed in both sides of a liquid crystal cell of a liquid crystal display device.

[Liquid Crystal Display Device]

By the use of the optical compensating sheet of the present invention, a liquid crystal display device enlarged in the view angle can be provided. The optical compensating sheet for TN-mode liquid crystal cells is described in JP-A-6-214116, U.S. Pat. Nos. 5,583,679 and 5,646,703 and German Patent Publication No. 3911620A1. The optical compensating sheet for IPS-mode or FLC-mode liquid crystal cells is described in JP-A-10-54982, the optical compensating sheet for OCB-mode (bend alignment mode) or HAN-mode liquid crystal cells is described in U.S. Pat. No. 5,805,253 and International Patent Publication No. WO96/37804, the optical compensating sheet for STN-mode liquid crystal cells is described in JP-A-9-26572, and the optical compensating sheet for VA-mode (vertically aligned mode) liquid crystal cells is described in Japanese Patent 2,866,372.

In the present invention, the optical compensating sheet for liquid crystal cell in various modes can be produced by referring to those patent publications. The optical compensating sheet of the present invention can be used for a liquid crystal display device by combining it with a liquid crystal cell driven in various modes such as TN (twisted nematic) mode, IPS (in-plane switching) mode, FLC (ferroelectric liquid crystal) mode, OCB (optically compensating bend) mode, STN (super twisted nematic) mode, VA (vertically aligned) mode and HAN (hybrid aligned nematic) mode. The optical compensating sheet of the present invention is effective particularly in a TN (twisted nematic) mode liquid crystal display device.

The optical properties of the optical compensating sheet are determined according to the optical properties of liquid crystal cell, specifically, according to the display mode described above. The liquid crystal molecule such as discotic liquid crystalline molecule has various alignment forms and therefore, when this liquid crystal molecule is used, optical compensating sheets having various optical properties responding to various display modes of liquid crystal cell can be produced. In the case of an optical compensating sheet using a discotic liquid crystalline molecule, optical compensating sheets responding to various display modes have been already proposed.

Constituent materials other than those described above of the optical film are described below.

[Support]

The support for use in the present invention is preferably a glass or a transparent polymer film.

The support preferably has a light transmittance of 80% or more. Examples of the polymer constituting the polymer film include cellulose esters (e.g., cellulose diacetate, cellulose diacetate), norbornene-base polymers, and poly(meth)acrylates. Also, commercially available polymers (as the norbornene-base polymer, ARTON and ZEONEX, both are a trade name) may be used.

Among these, cellulose esters are preferred and lower fatty acid esters of cellulose are more preferred. The lower fatty acid means a fatty acid having 6 or less carbon atoms and in particular, the number of carbon atoms is preferably 2 (cellulose acetate), 3 (cellulose propionate) or 4 (cellulose butyrate). Of these, cellulose acetate is more preferred. A mixed fatty acid ester such as cellulose acetate propionate and cellulose acetate butyrate may also be used.

Furthermore, conventionally known polymers of readily expressing birefringence, such as polycarbonate and polysulfone, can also be used for the optical film of the present invention when the expression of birefringence is inhibited by the modification of molecule as described in WO00/26705.

In the case of using the optical film of the present invention for the polarizing plate protective film or retardation film, the polymer film is preferably a cellulose acetate having an acetylation degree of 55.0 to 62.5%. The acetylation degree is more preferably from 57.0 to 62.0%.

The acetylation degree means an amount of acetic acid bonded per unit mass of cellulose. The acetylation degree can be determined according to the measurement and calculation of acetylation degree described in ASTM: D-817-91 (test method of cellulose acetate, etc.).

The viscosity average polymerization degree (DP) of cellulose acetate is preferably 250 or more, more preferably 290 or more. Furthermore, the cellulose acetate preferably has a narrow molecular weight distribution Mw/Mn (Mw is a mass average molecular weight and Mn is a number average molecular weight) as measured by gel permeation chromatography. Specifically, the Mw/Mn value is preferably from 1.0 to 1.7, more preferably from 1.0 to 1.65, and most preferably from 1.0 to 1.6.

In the cellulose acetate, the hydroxyl groups at the 2-position, 3-position and 6-position of cellulose are not evenly distributed but the substitution degree of hydroxyl group at the 6-position is liable to become small. In the polymer film for use in the present invention, the substitution degree at the 6-position of cellulose is preferably equal to or larger than those at the 2-position and 3-position.

The ratio of the substitution degree at the 6-position to the total of substitution degrees at the 2-, 3- and 6-positions is preferably from 30 to 40%, more preferably from 31 to 40%, and most preferably from 32 to 40%. The substitution degree at the 6-position is preferably 0.88 or more.

The substitution degree at each position can be determined by NMR.

Cellulose acetate having a high substitution degree at the 6-position can be synthesized by referring to the methods described in JP-A-11-5851, that is, Synthesis Example 1 (paragraph Nos. 0043 to 0044), Synthesis Example 2 (paragraph Nos. 0048 to 0049) and Synthesis Example 3 (paragraph Nos. 0051 to 0052).

[Polarizing Film]

The optical film of the present invention remarkably exerts its function when attached to a polarizing plate or used as a protective film of a polarizing plate.

The polarizing film for use in the present invention is preferably a coating-type polarizing film represented by those produced by Optiva, or a polarizing film comprising a binder and iodine or a dichroic dye.

The iodine or dichroic dye in the polarizing film is oriented in the binder and thereby exerts its polarizing function. The iodine or dichroic dye is preferably oriented along the binder molecule or the dichroic dye is preferably oriented in one direction by undergoing self-organization like liquid crystal.

At present, the general-purpose polarizer is commonly produced by dipping a stretched polymer in a bath containing a solution of iodine or dichroic dye and allowing the iodine or dichroic dye to penetrate into the binder.

In the general-purpose polarizing film, iodine or dichroic dye is distributed in the region of about 4 μm from the polymer surface (about 8 μm in total of both sides) and for obtaining a satisfactory polarizing performance, a thickness of at least 10 μm is necessary. The degree of penetration can be controlled by the concentration of iodine or dichroic dye solution, the temperature of bath containing the solution, and the dipping time in the solution.

As described above, the lower limit in the thickness of binder is preferably 10 μm. The upper limit of thickness is not particularly limited, however, in view of light leakage generated when the polarizing plate is used for a liquid crystal display device, a smaller thickness is more preferred.

The upper limit of thickness is preferably lower than that of the existing general-purpose polarizing plate (about 30 μm), that is, the thickness is preferably 25 μm or less, more preferably 20 μm or less. When the thickness is 20 μm or less, the light leakage phenomenon is not observed in a 17-inch liquid crystal display device.

The binder of the polarizing film may be crosslinked. For the crosslinked binder, a self-crosslinkable polymer may be used. A polymer having a functional group or a binder obtained by introducing a functional group into a polymer is exposed to light or heat or changed in the pH to cause a reaction between binders, whereby the polarizing film can be formed.

Also, a crosslinked structure may be introduced into the polymer by a crosslinking agent. This structure can be formed by using a crosslinking agent which is a compound having a high reactivity, and introducing a bonding group derived from the crosslinking agent between binders to crosslink the binders.

The crosslinking is generally performed by applying a coating solution containing a polymer or a mixture of a polymer and a crosslinking agent to a transparent support and then heating it. It may suffice if durability can be ensured at the stage of final commercial product, therefore, the treatment for crosslinking may be performed at any stage until a final polarizing plate is obtained.

The binder of the polarizing film may be a self-crosslinkable polymer or a polymer which is crosslinked by a crosslinking agent. Examples of the polymer include polymethyl methacrylate, polyacrylic acid, polymethacrylic acid, polystyrene, gelatin, polyvinyl alcohol, modified polyvinyl alcohol, poly(N-methylolacrylamide), polyvinyl-toluene, chlorosulfonated polyethylene, nitrocellulose, chlorinated polyolefin (e.g., polyvinyl chloride), polyester, polyimide, polyvinyl acetate, polyethylene, carboxymethyl cellulose, polypropylene, polycarbonate and copolymers thereof (e.g., acrylic acid/methacrylic acid copolymer, styrene/maleinimide copolymer, styrene/vinyl-toluene copolymer, vinyl acetate/vinyl chloride copolymer, ethylene/vinyl acetate copolymer). Among these, preferred are water-soluble polymers (e.g., poly(N-methylol-acrylamide), carboxymethyl cellulose, gelatin, polyvinyl alcohol, modified polyvinyl alcohol), more preferred are gelatin, polyvinyl alcohol and modified polyvinyl alcohol are, and most preferred are polyvinyl alcohol and modified polyvinyl alcohol.

The saponification degree of polyvinyl alcohol or modified polyvinyl alcohol is preferably from 70 to 100%, more preferably from 80 to 100%, and most preferably from 95 to 100%. The polymerization degree of polyvinyl alcohol is preferably from 100 to 5,000.

The modified polyvinyl alcohol is obtained by introducing a modifying group into a polyvinyl alcohol through copolymerization modification, chain transfer modification or block polymerization modification. In the copolymerization modification, COONa, Si(OH)$_3$, N(CH$_3$)$_3$·Cl, C$_9$H$_{19}$COO, SO$_3$Na or C$_{12}$H$_{25}$ can be introduced as the modifying group. In the chain transfer modification, COONa, SH or SC$_{12}$H$_{25}$ can be introduced as the modifying group. The polymerization degree of the modified polyvinyl alcohol is preferably from 100 to 3,000. The modified polyvinyl alcohol is described in JP-A-8-338913, JP-A-9-152509 and JP-A-9-316127.

A non-modified polyvinyl alcohol and an alkylthio-modified polyvinyl alcohol each having a saponification degree of 85 to 95% are particularly preferred.

The polyvinyl alcohols and modified polyvinyl alcohols may be used in combination of two or more thereof.

When the crosslinking agent for binder is added in a large amount, the resistance against humidity and heat of the polarizing film can be enhanced. However, if the crosslinking agent is added in an amount of 50 mass % or more based on the binder, the orientation property of iodine or dichroic dye decreases. The amount of the crosslinking agent added is preferably from 0.1 to 20 mass %, more preferably from 0.5 to 15 mass %, based on the binder.

Even after the completion of crosslinking reaction, the binder somewhat contains an unreacted crosslinking agent. The amount of the crosslinking agent remaining in the binder is preferably 1.0 mass % or less, more preferably 0.5 mass % or less. If the crosslinking agent is contained in the binder layer in an amount exceeding 1.0 mass %, there may arise a problem in the durability. More specifically, when a polarizing film having a large residual amount of crosslinking agent is integrated into a liquid crystal display device and used for a long period of time or left standing in a high-temperature and high-humidity atmosphere for a long period of time, the degree of polarization decreases in some cases.

The crosslinking agent is described in U.S. Pat. No. RE23297. A boron compound (e.g., boric acid, borax) may also be used as the crosslinking agent.

As the dichroic dye, an azo-base dye, a stilbene-base dye, a pyrazolone-base dye, a triphenylmethane-base dye, a quinoline-base dye, an oxazine-base dye, a thiadine-base dye or an anthraquinone-base dye is used. The dichroic dye is preferably water-soluble. Also, the dichroic dye preferably has a hydrophilic substituent (e.g., sulfo, amino, hydroxyl).

Examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59 and C.I. Acid Red 37. The dichroic dye is described in JP-A-1-161202, JP-A-1-172906, JP-A-1-172907, JP-A-1-183602, JP-A-1-248105, JP-A-1-265205 and JP-A-7-261024.

The dichroic dye is used in the form of a free acid, an alkali metal salt, an ammonium salt or an amine salt. By blending two or more dichroic dyes, polarizing films having various color hues can be produced. A polarizing film using a compound (dye) of providing a black color when polarizing axes are crossed at right angle, or a polarizing film or polarizing plate where various dichroic molecules are blended to provide a black color is preferred, because the single plate transmittance and the polarization ratio both are excellent.

In order to increase the contrast ratio of a liquid crystal display device, the transmittance of the polarizing plate is preferably higher and the degree of polarization is also preferably higher. The transmittance of the polarizing plate is preferably from 30 to 50%, more preferably from 35 to 50%, and most preferably from 40 to 50% (the maximum single plate transmittance of the polarizing plate is 50%), with light having a wavelength of 550 nm. The degree of polarization is preferably from 90 to 100%, more preferably from 95 to 100%, and most preferably from 99 to 100%, with light having a wavelength of 550 nm.

The polarizing film and the optically anisotropic layer, or the polarizing film and the orientation film may be provided through an adhesive. As the adhesive, a polyvinyl alcohol-base resin (including a polyvinyl alcohol modified with an acetoacetyl group, a sulfonic acid group, a carboxyl group or an oxyalkylene group) and an aqueous boron compound solution may be used. Of these, a polyvinyl alcohol-base resin is preferred. The thickness of the adhesive layer after drying is preferably from 0.01 to 10 μm, more preferably from 0.05 to 5 μm.

(Production of Polarizing Plate)

In view of yield of the polarizing film, the binder is preferably stretched to tilt at an angle of 10 to 80° with respect to the machine direction (MD direction) (stretching method) or rubbed (rubbing method) and then dyed with iodine or dichroic dye. The binder is preferably stretched such that the tilt angle agrees with the angle between the transmission axis of two polarizing plates attached to both sides of a liquid crystal cell constituting LCD and the longitudinal or crosswise direction of the liquid crystal cell.

The tilt angle is usually 45°, however, in recently developed devices of transmission-type, reflection-type or transreflective LCD, the tilt angle is not necessarily 45°. It is preferred that the stretching direction can be arbitrarily adjusted according to the design of LCD.

In the case of the stretching method, the stretching magnification is preferably from 2.5 to 30.0 times, more preferably from 3.0 to 10.0 times. The stretching may be performed by dry stretching in air or by wet stretching in the state of being dipped in water. The stretching magnification is preferably from 2.5 to 5.0 times at the dry stretching and from 3.0 to 10.0 times at the wet stretching. The stretching step may be performed in parts several times including oblique stretching. By performing the stretching in parts several times, more uniform stretching can be realized even at high magnification stretching. Before the oblique stretching, crosswise or longitudinal stretching may be slightly performed (to an extent of preventing the shrinkage in the width direction).

The stretching can be performed by biaxial stretching where the tenter stretching differs between left and right sides. This biaxial stretching is the same as the stretching method performed in normal film formation. In the biaxial stretching, the film is stretched at different rates in left and right sides and therefore, the thickness of binder film before stretching must be made different between left and right sides. In the cast film formation, the flow rate of binder solution can be made different between left and right sides by tapering the die.

In this way, a binder film obliquely stretched at 10 to 80° with respect to the MD direction of polarizing film is produced.

In the case of the rubbing method, a rubbing treatment widely employed as a treatment for aligning liquid crystals of LCD can be applied. More specifically, the surface of film is rubbed in a constant direction by using paper, gauze, felt, rubber or nylon or polyester fiber, whereby orientation is imparted. In general, the film surface is rubbed several times by using a cloth averagely flocked with fibers having uniform length and size. The rubbing treatment is preferably performed by using a rubbing roller where the circularity, cylindricity and deflection (eccentricity) of the roller itself all are 30 μm or less. The lap angle of film to the rubbing roller is preferably from 0.1 to 90°. However, a stable rubbing treatment can also be obtained by winding the film at 360° or more as described in JP-A-8-160430.

In the case of rubbing a lengthy film, the film is preferably conveyed by a transporting device at a rate of 1 to 100 m/min while applying a constant tension to the film. The rubbing roller is preferably freely rotatable in the horizontal direction with respect to the film traveling direction so as to arbitrarily set the rubbing angle. An appropriate rubbing angle is preferably selected in the range from 0 to 60°. In use for a liquid crystal display device, the rubbing angle is preferably from 40 to 50°, more preferably 45°.

On the surface of the polarizing film opposite the optically anisotropic layer, a polymer film is preferably disposed (to constitute a configuration of optically anisotropic layer/polarizing film/polymer film).

[Optical Compensating Sheet]

The optical compensating sheet of the present invention can be used for an elliptically polarizing plate by combining it with a polarizing film. Furthermore, when applied in combination with a polarizing film to a transmission-type liquid crystal display device, the optical compensating sheet contributes to the enlargement of view angle.

The elliptically polarizing plate and liquid crystal display device using the optical compensating sheet of the present invention are described below.

[Elliptically Polarizing Plate]

An elliptically polarizing plate can be produced by stacking the optical compensating sheet of the present invention and a polarizing film. By the use of the optical compensating sheet of the present invention, an elliptically polarizing plate capable of enlarging the view angle of a liquid crystal display device can be provided. That is, in a polarizing plate, a protective film is attached to both sides of a polarizing film and in the present invention, the optical compensating sheet of the present invention is used as a protective film in one side.

The polarizing film includes an iodine-type polarizing film, a dye-type polarizing film using a dichroic dye, and a polyene-type polarizing film. The iodine-type polarizing film and dye-type polarizing film are generally produced using a polyvinyl alcohol-base film. The polarization axis of polarizing film corresponds to the direction perpendicular to the stretching direction of film.

The polarizing film is stacked on the optically anisotropic layer side of the optical compensating sheet. On the surface of the polarizing film opposite the side where the optical compensating sheet is stacked, a transparent protective film is preferably formed. The transparent protective film preferably has a light transmittance of 80% or more. The transparent protective film is generally a cellulose ester film, preferably a triacetyl cellulose film. The cellulose ester film is preferably formed by a solvent casting method. The thickness of the transparent protective film is preferably from 20 to 500 μm, more preferably from 50 to 200 μm.

Such a polarizing plate of the present invention can be used for at least either one of polarizing plates disposed in both sides of a liquid crystal cell of a liquid crystal display device.

[Liquid Crystal Display Device]

By the use of the optical compensating sheet of the present invention, a liquid crystal display device enlarged in the view angle can be provided. The optical compensating sheet for TN-mode liquid crystal cells is described in JP-A-6-214116, U.S. Pat. Nos. 5,583,679 and 5,646,703 and German Patent Publication No. 3911620A1. The optical compensating sheet for IPS-mode or FLC-mode liquid crystal cells is described in JP-A-10-54982, the optical compensating sheet for OCB-mode (bend alignment mode) or HAN-mode liquid crystal cells is described in U.S. Pat. No. 5,805,253 and International Patent Publication No. WO96/37804, the optical compensating sheet for STN-mode liquid crystal cells is described in JP-A-9-26572, and the optical compensating sheet for VA-mode (vertically aligned mode) liquid crystal cells is described in Japanese Patent 2,866,372.

In the present invention, the optical compensating sheet for liquid crystal cell in various modes can be produced by referring to those patent publications. The optical compensating sheet of the present invention can be used for a liquid crystal display device by combining it with a liquid crystal cell driven in various modes such as TN (twisted nematic) mode, IPS (in-plane switching) mode, FLC (ferroelectric liquid crystal) mode, OCB (optically compensating bend) mode, STN (super twisted nematic) mode, VA (vertically aligned) mode and HAN (hybrid aligned nematic) mode. The optical compensating sheet of the present invention is effective particularly in a TN (twisted nematic) mode liquid crystal display device.

The optical properties of the optical compensating sheet are determined according to the optical properties of liquid crystal cell, specifically, according to the display mode described above. The liquid crystal molecule such as discotic liquid crystalline molecule has various alignment forms and therefore, when this liquid crystal molecule is used, optical compensating sheets having various optical properties responding to various display modes of liquid crystal cell can be produced. In the case of an optical compensating sheet using a discotic liquid crystalline molecule, optical compensating sheets responding to various display modes have been already proposed.

The preferred embodiment of the optically anisotropic layer in each liquid crystal mode is described below.

(TN-Mode Liquid Crystal Display Device)

The TN mode liquid crystal cell is most frequently used as a color TFT liquid crystal display device and this liquid crystal cell is described in many publications.

The TN mode liquid crystal cell in black display has an orientation state such that rod-like liquid crystalline molecules are rising up in the center part of cell and lying down in the vicinity of substrate of the cell.

The rod-like liquid crystalline molecules in the center part of cell can be compensated by discotic liquid crystalline molecules in homeotropic alignment (horizontal alignment such that disc planes are lying down) or the (transparent) support, and the rod-like liquid crystalline molecules in the vicinity of substrate of the cell can be compensated by the discotic liquid crystalline molecules in hybrid alignment (alignment such that the tilt of long axis is changed along the distance from the polarizing film).

Alternatively, the rod-like liquid crystalline molecules in the center part of cell can be compensated by rod-like liquid crystalline molecules in homogeneous alignment (horizontal alignment such that long axes are lying down) or the (transparent) support, and the rod-like liquid crystalline molecules in the vicinity of substrate of the cell can be compensated by the discotic liquid crystalline molecules in hybrid alignment.

The liquid crystalline molecules in homeotropic alignment are aligned by making an angle of 85 to 95° between the average alignment direction of long axes of liquid crystalline molecules and the plane of polarizing film.

The liquid crystalline molecules in homogeneous alignment are aligned by making an angle of less than 5° between the average alignment direction of long axes of liquid crystalline molecules and the plane of polarizing film.

The liquid crystalline molecules in hybrid alignment are preferably aligned by making an angle of 15° or more, more preferably from 15° to 85°, between the average alignment direction of long axes of liquid crystalline molecules and the plane of polarizing film.

The optically anisotropic layer where the (transparent) support or discotic compound is oriented in homeotropic alignment, the optically anisotropic layer where rod-like liquid crystalline molecules are aligned in homogeneous alignment, or the optically anisotropic layer comprising a mixture of a discotic compound in homeotropic alignment and rod-like liquid crystalline molecules in homogeneous alignment preferably has an Rth retardation value of 40 to 200 nm and an Re retardation value of 0 to 70 nm. The Rth retardation value (Rth) is a value defined by the following formula (I) and the Re retardation value (Re) is a value defined by the following formula (II):

$$Rth=\{(nx+ny)/2-nz\}\times d \quad (I)$$

$$Re=(nx-ny)\times d \quad (II)$$

[wherein nx is a refractive index in the slow axis direction in the plane of film, ny is a refractive index in the fast axis in the plane of film, nz is a refractive index in the thickness direction of film, and d is a thickness of the film].

The discotic liquid crystalline molecule layer in homeotropic alignment (horizontal alignment) and the rod-like liquid crystalline molecule layer in homogeneous alignment (horizontal alignment) are described in JP-A-12-304931 and JP-A-12-304932, and the discotic liquid crystalline molecule layer in hybrid alignment is described in JP-A-8-50206.

(OCB-Mode Liquid Crystal Display Device)

The OCB mode liquid crystal cell is a liquid crystal cell in the bend alignment mode where rod-like liquid crystalline molecules are aligned substantially in the reverse direction (symmetrically) between the upper part and the lower part of liquid crystal cell. The liquid crystal display device using a liquid crystal cell in the bend alignment mode is disclosed in U.S. Pat. Nos. 4,583,825 and 5,410,422. Since rod-like liquid crystalline molecules are aligned symmetrically between the upper part and the lower part of liquid crystal cell, the liquid crystal cell of the bend alignment mode has a self-optical compensating function. Therefore, this liquid crystal mode is called an optical compensating bend (OCB) liquid crystal mode.

Similarly to the TN-mode liquid crystal cell, the OCB-mode liquid crystal cell in black display also has an orientation state such that rod-like liquid crystalline molecules are rising up in the center part of cell and lying down in the vicinity of substrate of the cell.

Since the orientation state of liquid crystal cell in black display is the same as that of TN-mode liquid crystal cell, the preferred embodiment is also the same as that of TN mode. However, the OCB mode is large in the range where the liquid crystal compound is rising up in the center part of cell, as compared with the TN mode. Therefore, the optically anisotropic layer where the discotic compound is oriented in homeotropic alignment, or the optically anisotropic layer where rod-like liquid crystalline molecules are aligned in homogeneous alignment is necessary to be slightly adjusted in the retardation value. More specifically, the optically anisotropic layer where the discotic compound on a (transparent) support is oriented in homeotropic alignment, or the optically anisotropic layer where rod-like liquid crystalline molecules are aligned in homogeneous alignment preferably has an Rth retardation value of 150 to 500 nm and an Re retardation value of 20 to 70 nm.

(VA-Mode Liquid Crystal Display Device)

In the VA-mode liquid crystal cell, rod-like liquid crystalline molecules are vertically aligned in substance when voltage is not applied.

The VA-mode liquid crystal cell includes (1) a strict VA-mode liquid crystal cell where the rod-like liquid crystalline molecules are vertically aligned in substance when voltage is not applied, but are horizontally aligned in substance when voltage is applied (described in JP-A-2-176625), (2) a (MVA-mode) liquid crystal cell formed to have multi-domain VA mode so as to enlarge the view angle (described in *SID97, Digest of tech. Papers (preliminaries)*, 28, 845 (1997)), (3) a liquid crystal cell of a mode (n-ASM mode) where rod-like liquid crystal molecules are vertically aligned in substance when voltage is not applied, but are aligned in twisted multi-domain alignment when voltage is applied (described in *Yokoshu of Nippon Ekisho Toronkai (Preliminaries of Liquid Crystal Forum of Japan)*, 58-59 (1998)), and (4) a liquid crystal cell of SURVAIVAL mode (published in LCD international 98).

In black display of the VA-mode liquid crystal display device, the rod-like liquid crystalline molecules in liquid crystal cell are mostly rising up and therefore, it is preferred that the liquid crystal compound is compensated by an optically anisotropic layer where the discotic compound is oriented in homeotropic alignment, or an optically anisotropic layer where rod-like liquid crystalline molecules are aligned in homogeneous alignment, and separately, the view angle dependency of polarizing plate is compensated by an optically anisotropic layer where rod-like liquid crystalline molecules are aligned in homogeneous alignment and the angle between the average alignment direction of long axes of rod-like liquid crystalline molecules and the transmission axis direction of polarizing film is less than 5°.

The optically anisotropic layer where the (transparent) support or discotic compound is oriented in homeotropic alignment, or the optically anisotropic layer where rod-like liquid crystalline molecules are aligned in homogeneous alignment preferably has an Rth retardation value of 150 to 500 nm and an Re retardation value of 20 to 70 nm.

(Other Liquid Crystal Display Devices)

In the ECB-mode and STN-mode liquid crystal display devices, the optical compensation can be performed in the same manner of thinking as above.

EXAMPLES

The present invention is described in greater detail below, however, the present invention is not limited thereto.

Example 1

(Preparation of Cellulose Acetate Solution)

Cellulose Acetate Solution A was prepared by charging the following composition into a mixing tank and stirring it to dissolve each component.

<Composition of Cellulose Acetate Solution A>

| | |
|---|---|
| Cellulose acetate having an acetylation degree of 60.9% | 100 parts by weight |
| Triphenyl phosphate (plasticizer) | 7.0 parts by weight |
| Biphenyldiphenyl phosphate (plasticizer) | 4.0 parts by weight |
| Methylene chloride (first solvent) | 402.0 parts by weight |
| Methanol (second solvent) | 60.0 parts by weight |

(Preparation of Matting Agent Solution)

A matting agent solution was prepared by charging the following composition into a disperser and stirring it to dissolve each component.

<Composition of Matting Agent Solution>

| | |
|---|---|
| Silica particle having an average particle size of 16 nm (AEROSIL R972, produced by Nippon Aerosil Co., Ltd.) | 2.0 parts by weight |
| Methylene chloride (first solvent) | 76.3 parts by weight |
| Methanol (second solvent) | 11.4 parts by weight |
| Cellulose Acetate Solution A | 10.3 parts by weight |

(Preparation of Retardation Increasing Agent Solution)

A cellulose acetate solution was prepared by charging the following composition into a mixing tank and stirring it to dissolve each component.

<Composition of Retardation Increasing Agent Solution>

| | |
|---|---|
| Retardation Increasing Agent I | 19.8 parts by weight |
| UV Absorbent (A) | 0.07 parts by weight |
| UV Absorbent (B) | 0.13 parts by weight |
| Methylene chloride (first solvent) | 58.4 parts by weight |
| Methanol (second solvent) | 8.7 parts by weight |
| Cellulose Acetate Solution A | 12.8 parts by weight |

Retardation Increasing Agent I:

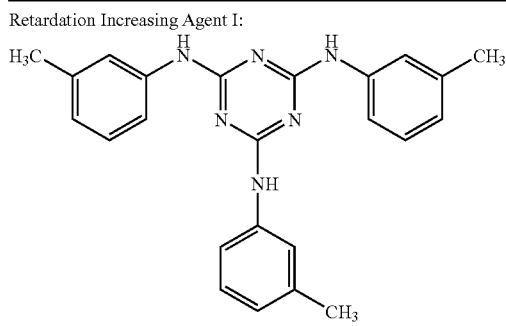

UV Absorbent:
UV Absorbent A:

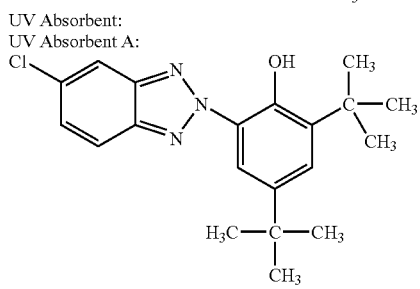

UV Absorbent B:

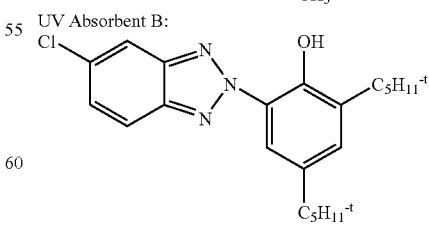

(Production of Cellulose Acetate Film)

94.6 Parts by weight of Cellulose Acetate Solution A, 1.3 parts by weight of the matting agent solution and 4.1 parts by weight of the retardation increasing agent solution were mixed each after filtration and then cast using a band casting machine. The mass ratio of retardation increasing agent to cellulose acetate was 4.6%. When the residual solvent amount became 30 mass %, the film was separated from the band and the film having a residual solvent amount of 13 mass % was transversely stretched at 130° C. to a stretching magnification of 28% by using a tenter and then held at 140° C. for 30 seconds while keeping the width after stretching. Thereafter, clips were removed and the film was dried at 140° C. for 40 minutes to produce a cellulose acetate film. The finished cellulose acetate film had a residual solvent amount of 0.2% and a film thickness of 92 μm.

(Measurement of Optical Properties)

The produced cellulose acetate film was measured on the retardation values by the following method, as a result, Re was 38 nm and Rth was 173 nm.

Measuring Method of Rth Retardation Value

The in-plane retardation Re(0) was measured by using an ellipsometer (M-150, manufactured by JASCO Corporation). Also, after tilting of 40° and −40° by using the slow axis in the plane as a tilt axis, the retardation Re(40) and Re(−40) were measured. With parameters of film thickness and refractive index nx in the slow axis direction, the refractive index ny in the fast axis direction and the refractive index nz in the thickness direction were calculated to fit these measured values Re(0), Re(40) and Re(−40). From the values obtained, the Rth retardation value was determined. The measurement wavelength was 632.8 nm.

(Saponification Treatment)

On the cellulose acetate film produced in Example 1, a solution having the following composition of Saponification Solution A or B was coated to a coverage of 5.2 ml/m² and heated at 60° C. for 10 seconds. The film surface was washed with running water for 10 seconds and then dried by blowing air at 25° C. on the film surface. The saponification treatment with the following composition B could be equivalently performed similar to one with the following composition of Saponification Solution B.

<Composition of Saponification Solution A>

| Isopropyl alcohol | 818 parts by weight |
| Water | 167 parts by weight |
| Propylene glycol | 187 parts by weight |
| Potassium hydroxide | 777 parts by weight |

<Composition B of Saponification Solution>

The composition B of Saponification Solution has the same composition as that Saponification Solution A except that the content of Potassium hydroxide is 68 parts by weight.

(Formation of Orientation Film)

On one surface of the saponified cellulose acetate film (transparent support), a coating solution having the following composition was coated to a coverage of 24 ml/m² by a #14 wire bar coater and then dried with hot water at 60° C. for 60 seconds and further with hot water at 90° C. for 150 seconds.

Thereafter, the film formed was rubbed in the direction at 45° from the stretching direction (almost agreeing with the slow axis) of the cellulose acetate film (transparent support).

<Composition of Coating Solution for Orientation Film>

| Modified polyvinyl alcohol shown below | 20 parts by weight |
| Water | 360 parts by weight |
| Methanol | 120 parts by weight |
| Glutaraldehyde (crosslinking agent) | 1.0 part by weight |

Modified Polyvinyl Alcohol:

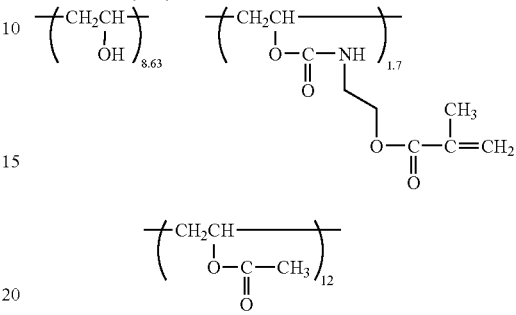

(Formation of Optically Anisotropic Layer)

On the orientation film, a coating solution obtained by dissolving 91 parts by weight of discotic liquid crystalline molecule shown below, 9 parts by weight of ethylene oxide-modified trimethylolpropane triacrylate (V#360, produced by Osaka Organic Chemical Industry Ltd.), 1.5 parts by weight of cellulose acetate butyrate (CAB531-1, produced by Eastman Chemical), 3 parts by weight of photopolymerization initiator (Irgacure 907, produced by Ciba-Geigy) and 1 part by weight of sensitizer (Kayacure DETX, produced by Nippon Kayaku Co., Ltd.) in 214.2 parts by weight of methyl ethyl ketone was coated to a coverage of 5.2 ml m² by a #3 wire bar coater. The resulting film was attached to a metal frame and heated in a constant temperature bath at 130° C. for 2 minutes to align the discotic liquid crystal molecules. Thereafter, UV light was irradiated at 90° C. for 1 minute by using a high-pressure mercury lamp of 120 W/cm to polymerize the discotic liquid crystalline molecules and then the film was allowed to cool to room temperature. In this way, Optical Compensating Sheet 1 was produced.

Discotic Liquid Crystalline Molecule:

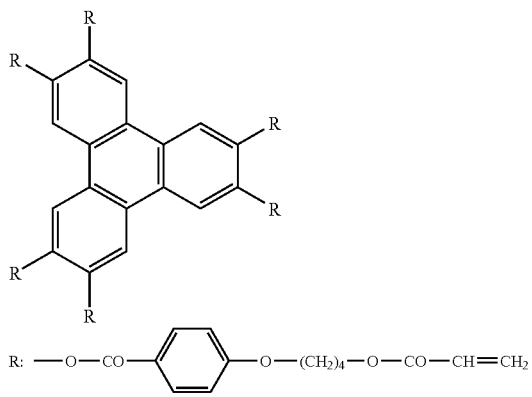

Production of Optical Compensating Sheets 2 to 7:

Optical Compensating Sheets 2 to 7 were produced in the same manner except that in Optical Compensating Sheet 1, a surface active agent shown in the Table below was added in the amount shown below to the coating solution for the optically anisotropic layer.

Production of Optical Compensating Sheets 8 to 13:

Optical Compensating Sheets 8 to 13 were produced by simultaneously applying the same coating solution as in Optical Compensating Sheet 1 and a surface active agent coating solution shown below such that the surface active agent layer became the upper layer.

<Composition of Surface Active Agent Coating Solution>

| Surface active agent | 0.15 parts by weight |
|---|---|
| Methyl ethyl ketone | 1,000 parts by weight |

TABLE 1

| Optical Compensating Sheet | Species of Surface Active Agent | Amount of Surface Active Agent Coated (g/m²) | Layer to Which Added | Remarks |
|---|---|---|---|---|
| 1 | none | none | none | Comparison |
| 2 | FS-21 | 0.003 | optically anisotropic layer | " |
| 3 | P-1 | " | " | " |
| 4 | P-24 | " | " | " |
| 5 | P-32 | " | " | " |
| 6 | P-64 | " | " | " |
| 7 | P-69 | " | " | " |
| 8 | FS-21 | " | upper layer | Invention |
| 9 | P-1 | " | " | " |
| 10 | P-24 | " | " | " |
| 11 | P-32 | " | " | " |
| 12 | P-64 | " | " | " |
| 13 | P-69 | " | " | " |

The structure of each surface active agent species is shown below. Incidentally, FS-21 is described in JP-A-2002-229169 supra and P-1, P-24, P-32 and P-64 are described in JP-A-2002-311577 supra.

FS-21:

$C_8F_{17}CH_2CH_2SO_2N(C_3H_7)CH_2CH_2O(CH_2CH_2O)_nH$

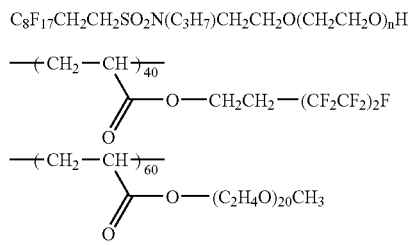

P-1

Mw 15,000

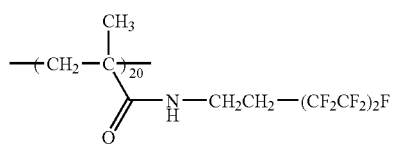

P-24

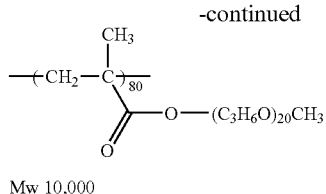

Mw 10,000

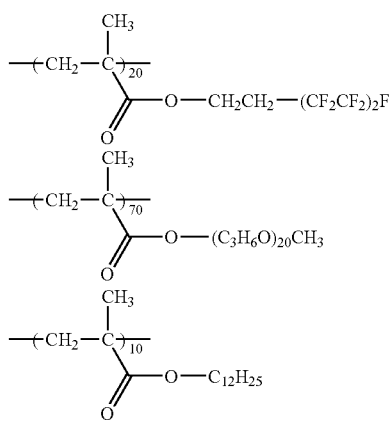

P-32

Mw 15,000

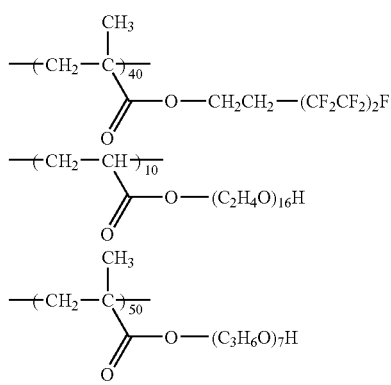

P-64

Mw 15,000

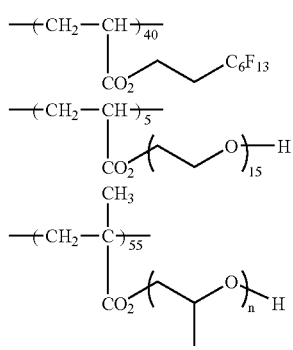

P-69

Mw 22,000

The thus-produced optical compensating sheets each was measured on Re at 25 points in total, that is, 5 points in the coating direction ×5 points in the width direction, and based on the difference between maximum value and minimum value and the standard deviation, uniformity of optical properties in the plane of film was evaluated. The results are shown in Table 2.

TABLE 2

| Optical Compensating Sheet | Maximum Value (nm) | Minimum Value (nm) | Standard Deviation | Remarks |
|---|---|---|---|---|
| 1 | 43.2 | 21.7 | 10.3 | Comparison |
| 2 | 41.3 | 23.5 | 9.1 | " |
| 3 | 40.9 | 23.3 | 8.7 | " |
| 4 | 37.3 | 29.7 | 7.7 | " |
| 5 | 37.9 | 28.9 | 7.2 | " |
| 6 | 38.0 | 29.1 | 7.6 | " |
| 7 | 38.5 | 29.8 | 5.2 | " |
| 8 | 34.7 | 31.6 | 3.1 | Invention |
| 9 | 33.2 | 30.8 | 2.8 | " |
| 10 | 33.5 | 31.0 | 2.6 | " |
| 11 | 33.9 | 30.5 | 3.0 | " |
| 12 | 34.1 | 31.2 | 2.7 | " |
| 13 | 34.0 | 31.4 | 2.5 | " |

(Production of Elliptically Polarizing Plate)

A polarizing film was produced by adsorbing iodine to a stretched polyvinyl alcohol film.

Subsequently, the transparent support side of the optical compensating sheet produced above was attached to one side of the polarizing film by using a polyvinyl alcohol-base adhesive. At this time, the slow axis of transparent support was laid in parallel to the transmission axis of polarizing film.

A commercially available cellulose triacetate film (Fujitac TD80UF, produced by Fuji Photo Film Co., Ltd.) was saponified in the same manner as above and attached to the opposite side of polarizing film (the side where the optical compensating sheet was not attached) by using a polyvinyl alcohol-base adhesive.

In this way, an elliptically polarizing plate was produced.

(Production of Bend Aligned Liquid Crystal Cell)

On a glass substrate with an ITO electrode, a polyimide film was provided as an orientation film and subjected to a rubbing treatment. Two sheets of the obtained glass substrates were disposed to face each other while laying respective rubbing directions in parallel. The cell gap was set to 5.7 μm. In the cell gap, a liquid crystalline compound (ZLI1132, produced by Merck & Co., Inc.) having Δn of 0.1396 was injected to produce a bend aligned liquid crystal cell.

(Production of Liquid Crystal Display Device)

Two sheets of elliptically polarizing plates produced above were attached by interposing the obtained bend aligned cell therebetween. These were arranged such that the optically anisotropic layer of elliptically polarizing plate came to face the cell substrate and the rubbing direction of liquid crystal cell was lying in non-parallel to the rubbing direction of optically anisotropic layer facing the liquid crystal cell.

The thus-fabricated liquid crystal display device was disposed on a backlight and while applying a white display voltage of 2 V and a black display voltage of 6.0 V, the contrast view angle (the angle range of giving a contrast ratio of 10 or more) was measured by using a measuring meter (EZ-Contrast 160D, manufactured by ELDIM). Also, a medium tone voltage of 3 V was applied and the color tinted view angle (the angle rage of giving ΔCuv of 0.02 or less) was measured.

The liquid crystal display device using the optical compensating sheet of the present invention was found to give less display unevenness and provide a good image.

Example 2

Cellulose Acetate Solution B was prepared by charging the following composition into a mixing tank and stirring it under heat to dissolve each component.

<Composition of Cellulose Acetate Solution B>

| | |
|---|---|
| Cellulose acetate having an acetylation degree of 60.9% | 100 parts by weight |
| Triphenyl phosphate (plasticizer) | 7.0 parts by weight |
| Biphenyldiphenyl phosphate (plasticizer) | 4.0 parts by weight |
| Methylene chloride (first solvent) | 402.0 parts by weight |
| Methanol (second solvent) | 60.0 parts by weight |

Into a separate mixing tank, 16 parts by weight of Retardation Increasing Agent I, 80 parts by weight of methylene chloride and 20 parts by weight of methanol were charged and stirred under heat to prepare Retardation Increasing Agent Solution D.

11 Parts by weight of Retardation Increasing Agent Solution D was mixed with 474 parts by weight of Cellulose Acetate Solution B and thoroughly mixed to prepare a dope. The amount of the retardation increasing agent added was 1.6 parts by weight per 100 parts by weight of cellulose acetate.

The obtained dope was cast at a casting rate of 45 m/min by using a band casting machine. After drying until the residual solvent amount became 30 mass %, the film was separated from the band and then dried with dry air at 140° C. for 10 minutes to produce Cellulose Acetate Film 201 having a residual solvent amount of 0.3 mass % and a thickness of 60 μm.

(Measurement of Optical Properties)

The optical properties of Cellulose Acetate Film 201 were measured in the same manner as in Example 1, as a result, Rth was 80.3 and Re was 9.7.

(Saponification Treatment)

Cellulose Acetate Film 201 produced above was saponified in the same manner as in Example 1.

(Formation of Orientation Film)

On the saponified cellulose acetate film, a coating solution having the following composition was coated to a coverage of 28 ml/m² by a #16 wire bar coater and then dried with hot water at 60° C. for 60 seconds and further with hot water at 90° C. for 150 seconds.

Thereafter, the film formed was rubbed in the direction parallel to the longitudinal direction of the cellulose acetate film.

<Composition of Coating Solution for Orientation Film>

| | |
|---|---|
| Modified polyvinyl alcohol shown above | 10 parts by weight |
| Water | 371 parts by weight |
| Methanol | 119 parts by weight |
| Glutaraldehyde (crosslinking agent) | 0.5 part by weight |

(Formation of Optically Anisotropic Layer)

In the same manner as in Optical Compensating Sheet 13 of Example 1, a coating solution for optically anisotropic layer and a coating solution for surface active agent layer were coated on the orientation film such that the surface active-agent layer became the upper layer, to produce Optical Compensating Sheet (D-1).

<Composition of Optically Anisotropic Layer>

| Discotic liquid crystalline compound shown above | 1.57 g/m² |
| --- | --- |
| Ethylene oxide-modified trimethylolpropane triacrylate (V#360, produced by Osaka Organic Chemical Industry Ltd.) | 0.156 g/m² |
| Cellulose acetate butyrate (CAB551-0.2, produced by Eastman Chemical) | 0.0346 g/m² |
| Cellulose acetate butyrate (CAB531-1, produced by Eastman Chemical) | 0.0088 g/m² |
| Photopolymerization initiator (Irgacure 907, produced by Ciba-Geigy) | 0.0518 g/m² |
| Sensitizer (Kayacure DETX, produced by Nippon Kayaku Co., Ltd.) | 0.0173 g/m² |

Composition of Surface Active Agent Layer>

Surface Active Agent P-69 shown above 0.006 g/m²

The Re retardation value of optically anisotropic layer measured at a wavelength of 546 nm was 43 nm. Furthermore, the angle (tilt angle) between the disc plane and the first transparent support plane was 42° on average.

A polarizer was produced by adsorbing iodine to a stretched polyvinyl alcohol film. On one side of the polarizer, Optical Compensating Sheet (D-1) produced above was attached by using a polyvinyl alcohol-base adhesive such that the cellulose acetate film was lying in the polarizer side. At this time, the transmission axis of polarizer was laid in parallel to the slow axis of optically anisotropic layer.

A commercially available cellulose triacetate film (Fujitac TD80UF, produced by Fuji Photo Film Co., Ltd.) was saponified in the same manner as above and attached to the opposite side of the polarizer by using a polyvinyl alcohol-base adhesive to produce a polarizing plate.

(Production of Liquid Crystal Display)

A pair of polarizing plates provided in a 20-inch liquid crystal display device (LC-20V1, manufactured by Sharp Corporation) using a TN-mode liquid crystal cell were peeled off and instead, one sheet of the polarizing plate produced above was attached to each of the observer side and the backlight side through a pressure-sensitive adhesive such that the optical compensating sheet was lying in the liquid crystal cell side. At this time, the transmission axis of polarizing plate in the observer side and the transmission axis of polarizing plate in the backlight side were laid to cross at right angle.

The liquid crystal display device using the optical compensating sheet of the present invention was found to give less display unevenness and provide a good image.

The optical compensating sheet produced by the method of the present invention is free of unevenness and excellent in the optical uniformity in the plane of sheet and the liquid crystal display device using this optical compensating sheet gives less display unevenness and provides a good image.

Example 3

Production of Polymer Substrate

A cellulose acetate solution was prepared by charging the following composition into a mixing tank and stirring it under heat to dissolve each component.

(Composition of Cellulose Acetate Solution)

| Cellulose acetate having an acetylation degree of 60.9% (linter) | 80 parts by weight |
| --- | --- |
| Cellulose acetate having an acetylation degree of 60.8% (linter) | 20 parts by weight |
| Triphenyl phosphate (plasticizer) | 7.8 parts by weight |
| Biphenyldiphenyl phosphate (plasticizer) | 3.9 parts by weight |
| Methylene chloride (first solvent) | 300 parts by weight |
| Methanol (second solvent) | 54 parts by weight |
| 1-Butanol (third solvent) | 11 parts by weight |

Into a separate mixing tank, 4 parts by weight of cellulose acetate having an acetylation degree of 60.9% (linter), 16 parts by weight of retardation increasing agent shown below, 0.5 parts by weight of silica fine particle (particle size: 20 nm, Moh's hardness: about 7), 87 parts by weight of methylene chloride and 13 parts by weight of methanol were charged and stirred under heat to prepare a retardation increasing agent solution.

36 Parts by weight of the retardation increasing agent solution was mixed with 464 parts by weight of the cellulose acetate solution and thoroughly mixed to prepare a dope. The amount of the retardation increasing agent added was 5.0 parts by weight per 100 parts by weight of cellulose acetate.

Retardation Increasing Agent:

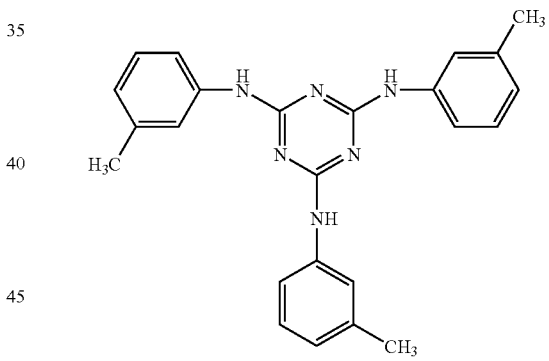

The obtained dope was cast by using a band casting machine. After the film surface temperature became 40° C. on the band, the film was dried for 1 minute and then the film having a residual solvent amount of 43 mass % was separated, dried with dry air at 140° C. and then stretched by 28% in the crosswise direction using a tenter. Thereafter, the film was dried with dry air at 135° C. for 20 minutes to obtain Polymer Substrate (PK-1) having a residual solvent amount of 0.3 mass %.

The obtained Polymer Substrate (PK-1) had a width of 1,340 mm and a thickness of 92 μm. The retardation value (Re) at a wavelength of 590 nm was measured by using an ellipsometer (M-150, manufactured by JASCO Corporation) and found to be 43 nm. Also, the retardation value (Rth) at a wavelength of 590 nm was measured and found to be 175 nm.

The produced Polymer Substrate (PK-1) was dipped in a 2.0N potassium hydroxide solution (25° C.) for 2 minutes, then neutralized with sulfuric acid, washed with pure water and dried. The surface energy of PK-1 was determined by the contact angle method and found to be 63 mN/m.

On PK-1, a coating solution for orientation film having the following composition was coated to a coverage of 28 ml/m² by a #16 wire bar coater and then dried with hot water at 60° C. for 60 seconds and further with hot water at 90° C. for 150 seconds.

(Composition of Coating Solution for Orientation Film)

| | |
|---|---|
| Modified polyvinyl alcohol shown below | 10 parts by weight |
| Water | 371 parts by weight |
| Methanol | 119 parts by weight |
| Glutaraldehyde (crosslinking agent) | 0.5 part by weight |

Modified Polyvinyl Alcohol:

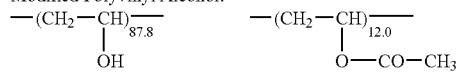

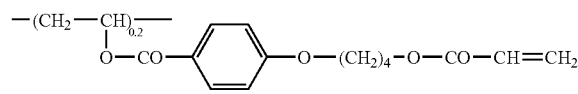

The orientation film was rubbed in the direction at 45° from the slow axis (measured at a wavelength of 632.8 nm) of Polymer Substrate (PK-1).

(Formation of Optically Anisotropic Layer)

In 102 kg of methyl ethyl ketone, 41.01 kg of discotic liquid crystalline molecule shown below, 4.06 kg of ethylene oxide-modified trimethylolpropane triacrylate (V#360, produced by Osaka Organic Chemical Industry Ltd.), 0.35 kg of cellulose acetate butyrate (CAB531-1, produced by Eastman Chemical), 1.35 kg of photopolymerization initiator (Irgacure 907, produced by Ciba-Geigy) and 0.45 kg of sensitizer (Kayacure DETX, produced by Nippon Kayaku Co., Ltd.) were dissolved. To the resulting solution, 0.1 kg of fluoroaliphatic group-containing copolymer (Megafac F780, produced by Dai-Nippon Ink & Chemicals, Inc.) was added to prepare a coating solution. The obtained coating solution was continuously coated on the orientation film by a #3.6 wire bar coater and heated at 130° C. for 20 minutes, thereby orienting the discotic liquid crystalline compound. Thereafter, UV light was irradiated at 100° C. for 1 minute by using a high-pressure mercury lamp of 120 W/cm to polymerize the discotic liquid crystalline compound and then the film was allowed to cool to room temperature. In this way, Optical Compensating Sheet (KH-1) with an optically anisotropic layer was produced.

The Re retardation value of optically anisotropic layer measured at a wavelength of 546 nm was 38 nm. Furthermore, the angle (tilt angle) between the disc plane and the first transparent support plane was 33° on average.

In 102 kg of methyl ethyl ketone, 41.01 kg of discotic liquid crystalline molecule shown below, 4.06 kg of ethylene oxide-modified trimethylolpropane triacrylate (V#360, produced by Osaka Organic Chemical Industry Ltd.), 0.45 kg of cellulose acetate butyrate (CAB531-1, produced by Eastman Chemical), 1.35 kg of photopolymerization initiator (Irgacure 907, produced by Ciba-Geigy) and 0.45 kg of sensitizer (Kayacure DETX, produced by Nippon Kayaku Co., Ltd.) were dissolved. To the resulting solution, 0.1 kg of fluoroaliphatic group-containing copolymer (Megafac F780, produced by Dai-Nippon Ink & Chemicals, Inc.) was added to prepare a coating solution. The obtained coating solution was continuously coated on the orientation film by a #3.6 wire bar coater and heated at 130° C. for 20 minutes, thereby orienting the discotic liquid crystalline compound. Thereafter, UV light was irradiated at 100° C. for 1 minute by using a high-pressure mercury lamp of 120 W/cm to polymerize the discotic liquid crystalline compound and then the film was allowed to cool to room temperature. In this way, Optical Compensating Sheet (KH-1-1) with an optically anisotropic layer was produced.

The Re retardation value of optically anisotropic layer measured at a wavelength of 546 nm was 30 nm. Furthermore, the angle (tilt angle) between the disc plane and the first transparent support plane was 33° on average.

Polarizing plates were disposed in cross-Nicol arrangement and unevenness of the resulting optical compensating sheets (KH-1) and (KH-1-1) were observed. As a result, even when viewed from the front or from the direction tilted at 60° C. from the normal line, unevenness was not detected.

(Production of Polarizer)

PVA having an average polymerization degree of 1,700 and a saponification degree of 99.5 mol % (thikness: 80 μm, width: 2,500 mm) was subjected to a vertically uniaxial stretching in water at 40° C. to a stretching magnification of 8 times, and the stretched film was dipped as it was in an aqueous solution containing 0.2 g/L of iodine and 60 g/L of potassium iodide at 30° C. for 5 minutes and then dipped in an aqueous solution containing 100 g/L of boric acid and 30 g/L of potassium iodide at 70° C. of 5 minutes to form a film having a width of 1,300 mm and a thickness of 17 μm.

Thereafter, the film was washed at 20° C. for 10 seconds in a washing bath, and then was dipped in an aqueous solution containing 0.1 g/L of iodine and 20 g/L of potassium iodide at 30° C. for 15 seconds, and then dried at room temperature for 24 hours to obtain iodine-base Polarizer (HF-01).

(Production of Polarizing Plate)

On one side of Polarizer (HF-01), the Polymer Substrate (PK-1) surface of KH-1 (optical compensating sheet) was attached by using a polyvinyl alcohol-base adhesive. Also, a 80 μm-thick triacetyl cellulose film (TD80U, produced by Fuji Photo Film Co., Ltd.) was saponified and attached to the opposite side of the polarizer by using a polyvinyl alcohol-base adhesive.

At this time, the transmission axis of polarizer and the slow axis of Polymer Substrate (PK-1) were laid in parallel and the transmission axis of polarizer and the slow axis of triacetyl cellulose film were laid to cross at right angle. In this way, Polarizing Plate (HB-1) was produced.

Comparative Example 1

Optical Compensating Sheet (KH-H1) and Polarizing Plate (HB-H1) with KH-H1 were produced in the same manner as in Example 1 except for not adding a fluoroaliphatic group-containing copolymer to the optically anisotropic layer.

Example 4

Production of Polymer Substrate

Into a mixing tank, 16 parts by weight of retardation increasing agent used in Example 3, 80 parts by weight of methylene chloride and 20 parts by weight of methanol were charged and stirred under heat to prepare a retardation increasing agent solution.

25 Parts by weight of the retardation increasing agent solution was mixed with 474 parts by weight of the cellulose acetate solution prepared in Example 3 and thoroughly mixed to prepare a dope. The amount of the retardation increasing agent added was 3.5 parts by weight per 100 parts by weight of cellulose acetate.

The obtained dope was cast by using a band casting machine. After the film surface temperature became 40° C. on the band, the film was dried for 1 minute, separated and then dried with dry air at 140° C. to obtain Polymer Substrate (PK-2) having a residual solvent amount of 0.3 mass %.

The obtained Polymer Substrate (PK-2) had a width of 1,500 mm and a thickness of 65 μm. The retardation value (Re) at a wavelength of 590 nm was measured by using an ellipsometer (M-150, manufactured by JASCO Corporation) and found to be 4 nm. Also, the retardation value (Rth) at a wavelength of 590 nm was measured and found to be 78 nm.

(Production of Optical Compensating Sheet with Optically Anisotropic Layer)

Polymer Substrate (PK-2) was dipped in a 2.0N potassium hydroxide solution (25° C.) for 2 minutes, then neutralized with sulfuric acid, washed with pure water and dried. The surface energy of PK-2 was determined by the contact angle method and found to be 63 mN/m.

<Formation of Orientation Film>

On the produced PK-2, a coating solution having the following composition was coated to a coverage of 28 ml/m² by a #16 wire bar coater and then dried with hot water at 60° C. for 60 seconds and further with hot water at 90° C. for 150 seconds.

<Composition of Coating Solution for Orientation Film>

| Modified polyvinyl alcohol of Example 3 | 10 parts by weight |
|---|---|
| Water | 371 parts by weight |
| Methanol | 119 parts by weight |
| Glutaraldehyde (crosslinking agent) | 0.5 part by weight |

The resulting modified polyvinyl alcohol film was rubbed to impart orientation in parallel to the longitudinal direction of PK-2.

<Formation of Optically Anisotropic Layer>

In 102 kg of methyl ethyl ketone, 41.01 kg of discotic liquid crystalline molecule of Example 3, 4.06 kg of ethylene oxide-modified trimethylolpropane triacrylate (V#360, produced by Osaka Organic Chemical Industry Ltd.), 0.90 kg of cellulose acetate butyrate (CAB551-0.2, produced by Eastman Chemical), 0.23 kg of cellulose acetate butyrate (CAB531-1, produced by Eastman Chemical), 1.35 kg of photopolymerization initiator (Irgacure 907, produced by Ciba-Geigy) and 0.45 kg of sensitizer (Kayacure DETX, produced by Nippon Kayaku Co., Ltd.) were dissolved. To the resulting solution, 0.1 kg of fluoroaliphatic group-containing copolymer (P-29) was added to prepare a coating solution. The obtained coating solution was coated on the orientation film by a #3.4 wire bar coater and heated at 130° C. for 2 minutes in a constant temperature zone, thereby orienting the discotic liquid crystalline compound. Thereafter, UV light was irradiated in an atmosphere at 60° C. for 1 minute by using a high-pressure mercury lamp of 120 W/cm to polymerize the discotic liquid crystalline compound and then the film was allowed to cool to room temperature. In this way, the optically anisotropic layer was formed and Optical Compensating Sheet (KH-2) was produced.

The Re retardation value of optically anisotropic layer measured at a wavelength of 546 nm was 40 nm. Furthermore, the angle (tilt angle) between the disc plane and the first transparent support plane was 39° on average.

Polarizing plates were disposed in cross-Nicol arrangement and unevenness of the resulting optical compensating sheet was observed. As a result, even when viewed from the front or from the direction tilted at 60° C. from the normal line, unevenness was not detected.

(Production of Polarizing Plate)

On one side of Polarizer (HF-1), KH-2 (optical compensating sheet) was attached by using a polyvinyl alcohol-base adhesive. Also, a 80 μm-thick triacetyl cellulose film (TD80U, produced by Fuji Photo Film Co., Ltd.) was saponified and attached to the opposite side of the polarizer by using a polyvinyl alcohol-base adhesive.

At this time, the transmission axis of polarizer and the slow axis of PK-2 were laid in parallel and the transmission axis of polarizer and the slow axis of triacetyl cellulose film were laid to cross at right angle. In this way, Polarizing Plate (HB-2) was produced.

Comparative Example 2

Optical Compensating Sheet (KH-H2) and Polarizing Plate (HB-H2) with KG-H2 were produced in the same manner as in Example 2 except for not adding a fluoroaliphatic group-containing copolymer to the optically anisotropic layer.

(Production of Bend Aligned Liquid Crystal Cell)

On a glass substrate with an ITO electrode, a polyimide film was provided as an orientation film and subjected to a rubbing treatment. Two sheets of the obtained glass substrates were disposed to face each other while laying respective rubbing directions in parallel. The cell gap was set to 6 μm. In the cell gap, a liquid crystalline compound (ZLI1132, produced by Merck & Co., Inc.) having Δn (difference between refractive indexes $n_e$ and $n_o$) of 0.1396 was injected to produce a bend aligned liquid crystal cell. The size of the liquid crystal cell was 20 inches.

Two sheets of polarizing plates (HB-1) produced in Example 3 were attached by interposing the obtained bend aligned cell therebetween. These were arranged such that the optically anisotropic layer of elliptically polarizing plate came to face the cell substrate and the rubbing direction of liquid crystal cell was lying in non-parallel to the rubbing direction of optically anisotropic layer facing the liquid crystal cell.

A rectangular wave voltage of 55 Hz was applied to the liquid crystal cell. The mode was set to a normally white mode with white display of 2 V and black display of 5 V. By taking the transmittance ratio (white display/black display) as the contrast ratio, the view angle was measured in 8 stages from black display (L1) to white display (L8) by using a measuring meter (EZ-Contrast 160D, manufactured by ELDIM).

In the same manner, Polarizing Plate (HB-H1) produced in Comparative Example 1 was attached and the view angle was measured. As the index for the evaluation of view angle, an open angle value in the range of maintaining a contrast ratio of 10 or more on the image in the visual field and being free from occurrence of gradation reversal in the black side (that is, free from occurrence of reversal between black display (L1) and next level (L2)) was used. The measurement results are shown in Table 3.

TABLE 3

| Liquid Crystal Display Device | View Angle (range having contrast ratio of 10 or more and free from Glay scale inversion) | | |
|---|---|---|---|
| | Upward | Downward | Right and Left |
| Example 3 | 80° | 80° | 80° |
| Comparative Example 1 | 80° | 80° | 80° |

(Note)
Gradation reversal in black side:
Occurrence of Glay scale inversion between L1 and L2.

In case that the optical compensating sheet (KH-1-1) was used in place of optical compensating sheets (KH-1) in the above, the equivalent result to the above was obtained.

(Evaluation of Unevenness on Panel of Liquid Crystal Display Device)

The display panel of each of liquid crystal display devices produced in Example 3 and Comparative Example 1 was adjusted to a medium tone over the entire surface and evaluated on the unevenness. In Example 3, unevenness was not observed on viewing from any direction, but in Comparative Example 1, lattice-like unevenness was detected at an upward visual angle of 45° or more.

(Evaluation with TN Liquid Crystal Cell)

A pair of polarizing plates provided in a liquid crystal display device (AQUOS LC-20C1S, manufactured by Sharp Corporation) using a TN-mode liquid crystal cell were peeled off and instead, one sheet of Polarizing Plate (HB-2) produced in Example 4 was attached to each of the observer side and the backlight side through a pressure-sensitive adhesive such that Optical Compensating Sheet (KH-2) was lying in the liquid crystal cell side. At this time, the transmission axis of polarizing plate in the observer side and the transmission axis of polarizing plate in the backlight side were laid to form an O-mode.

The liquid crystal display device manufactured was measured on the visual angle in 8 stages from black display (L1) to white display (L8) by using a measuring meter (EX-Contrast 160D, manufactured by ELDIM). The measurement results are shown in Table 4.

TABLE 4

| Liquid Crystal Display Device | View Angle (range having contrast ratio of 10 or more and free from gradation reversal in black side) | | |
|---|---|---|---|
| | Upward | Downward | Right and Left |
| Example 4 | 80° | 60° | 80° |
| Comparative Example 2 | 80° | 45° | 80° |

(Note)
Gradation reversal in black side:
Occurrence of gradation reversal between L1 and L2.

(Evaluation of Unevenness on Panel of Liquid Crystal Display Device)

The display panel of each of liquid crystal display devices produced in Example 4 and Comparative Example 2 was adjusted to a medium tone over the entire surface and evaluated on the unevenness. In Example 4, unevenness was not observed on viewing from any direction, but in Comparative Example 2, lattice-like unevenness was detected at an upward visual angle of 45° or more.

Example 5

Formation of Optically Anisotropic Layer

A commercially available triacetyl cellulose film (Fujitac, produced by Fuji Photo Film Co., Ltd.) was dipped in a 2.0N potassium hydroxide solution (25° C.) for 2 minutes, then neutralized with sulfuric acid, washed with pure water and dried. The surface energy of PK-2 was determined by the contact angle method and found to be 63 mN/m.

<Formation of Orientation Film>

On the Fujitac, a coating solution having the following composition was coated to a coverage of 28 ml/m$^2$ by a #16 wire bar coater and then dried with hot water at 60° C. for 60 seconds and further with hot water at 90° C. for 150 seconds.

<Composition of Coating Solution for Orientation Film>

| Modified polyvinyl alcohol of Example 3 | 10 parts by weight |
|---|---|
| Water | 371 parts by weight |
| Methanol | 119 parts by weight |
| Glutaraldehyde (crosslinking agent) | 0.5 part by weight |

In methyl ethyl ketone, 90 parts by weight of discotic compound of Example 3, 10 parts by weight of ethylene oxide-modified trimethylolpropane triacrylate (V#360, produced by Osaka Organic Chemical Industry Ltd.), 0.6 parts by weight of melamine formaldehyde/acrylic acid copolymer (Aldrich reagent), 3.0 parts by weight of photopolymerization initiator (Irgacure 907, produced by Ciba-Geigy) and 1.0 part by weight of photosensitizer (Kayacure DETX, produced by Nippon Kayaku Co., Ltd.) were dissolved to prepare a solution having a solid concentration of 38 mass %. To the resulting solution, 0.5 kg of fluoroaliphatic group-containing copolymer (P-45) was further added to prepare a coating solution.

The obtained coating solution was coated on the orientation film to the same coverage as in Example 4 and dried. Thereafter, the film was heated at 130° C. for 1 minute to orient the discotic compound and immediately cooled to room temperature and then, UV light of 500 mJ/cm$^2$ was irradiated to polymerize the discotic compound and thereby fix the aligned state. In this way, Optical Compensating Sheet (KH-3) was produced. The thickness of the optically anisotropic layer formed was 1.7 μm.

The angle dependency of retardation of the optically anisotropic layer was measured by an ellipsometer (manufactured by JASCO Corporation). As a result, the angle between the disc plane of discotic compound and the orientation film plane was 0.2°, the retardation (Rth) in the thickness direction was 150 nm. The transmission axis of polarizer and the slow axis of PK-2 were laid in parallel, and the transmission axis of polarizer and the slow axis of the commercially available triacetyl cellulose film were laid to cross at right angle. In this way, Polarizing Plate (HB-3) was produced.

(Production of Polarizing Plate)

On one side of Polarizer (HF-1), Polymer Substrate (KH-3) was attached by using a polyvinyl alcohol-base adhesive. Also, a 80 μm-thick triacetyl cellulose film (TD80U, produced by Fuji Photo Film Co., Ltd.) was saponified and attached to the opposite side of the polarizer by using a polyvinyl alcohol-base adhesive.

At this time, the transmission axis of polarizer and the slow axis of KH-3 were laid in parallel and the transmission axis of polarizer and the slow axis of the commercially available triacetyl cellulose film were laid to cross at right angle. In this way, Polarizing Plate (HB-3) was produced.

Optical Compensating Sheet (KH-H3) and Polarizing Plate (HB-H3) with KH-H3 were produced in the same manner as in Example 3 except for not adding a fluoroaliphatic group-containing copolymer to the optically anisotropic layer.

(Vertical Alignment-Mode Liquid Crystal Cell)

A pair of polarizing plates and a pair of retardation plates provided in a liquid crystal display device (VL-1530S, manufactured by Fujitsu Ltd.) using a vertical alignment-mode liquid crystal cell were peeled off and instead, Polarizing Plate (HB-3) was attached through a pressure-sensitive adhesive such that Polymer Substrate (PF-1) was lying in the liquid crystal cell side. At this time, the polarizing plates were disposed in cross-Nicol arrangement such that the transmission axis of polarizing plate in the observer side was running in the vertical direction and the transmission axis of polarizing plate in the backlight side was running in the transverse direction.

(Evaluation of Unevenness on Panel)

The liquid crystal display devices produced in Example 5 and Comparative Example 3 each was adjusted to a medium tone over the entire surface and evaluated on the unevenness. In Example 5, unevenness was not observed on viewing from any direction, but in Comparative Example 3, when the visual field was tilted at 45°, lattice-like unevenness was detected in all directions.

INDUSTRIAL APPLICABILITY

The present invention provides a method for optically compensating a liquid crystal cell by using a polarizing plate having an optically compensating function, and an optical film for use therein, particularly, a method for displaying an image having high display grade and an optical film for use therein. The present invention also provides a liquid crystal display device using the optical film or the polarizing plate.

Furthermore, the present invention provides an optical compensating sheet comprising a support having thereon a liquid crystalline compound-containing layer, which is free of unevenness and favored with excellent optical uniformity in the plane of sheet, a production method thereof, and a polarizing plate and a liquid crystal display device each using this optical compensating sheet.

The invention claimed is:

1. A method for producing an optical compensating sheet, comprising a step of simultaneously coating at least two coating solutions on a transparent support, wherein a first coating solution simultaneously coated in said step contains a liquid crystalline compound, and a second coating solution simultaneously coated in said step comprises a surface active agent comprising a fluoroaliphatic group-containing copolymer that comprises a repeating unit derived from a poly(oxyalkylene)acrylate and/or a poly(oxyalkylene)methacrylate, wherein the viscosity of the second coating solution containing the fluoroaliphatic group-containing copolymer is lower than the viscosity of the first coating solution containing the liquid crystalline compound, and wherein the optical compensating sheet comprises: an optically anisotropic layer formed from a first coating solution which comprises a liquid crystalline compound, and a surfactant layer constituting an upper layer of the optically anisotropic layer, formed from a second coating solution which comprises a surface active agent comprising a fluoroaliphatic group-containing copolymer that comprises a repeating unit derived from a poly(oxyalkylene)acrylate and/or a poly(oxyalkylene)methacrylate.

2. A method comprising a step of simultaneously coating at least two coating solutions on the transparent support, the at least two coating solutions comprising a first coating solution which comprises a liquid crystalline compound, and a second coating solution which comprises a fluoroaliphatic group-containing copolymer, wherein the viscosity of the second coating solution containing the fluoroaliphatic group-containing copolymer is lower than the viscosity of the first coating solution containing the liquid crystalline compound, the fluoroaliphatic group-containing copolymer containing a repeating unit derived from the following monomer (i) and a repeating unit derived from the following monomer (ii):

(i) a fluoroaliphatic group-containing monomer represented by the following formula [1],

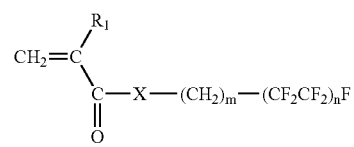

wherein $R_1$ represents a hydrogen atom or a methyl group, X represents an oxygen atom, a sulfur atom or $-N(R_2)-$, m represents an integer of 1 to 6, n represents an integer of 2 to 4, and $R_2$ represents a hydrogen atom or an alkyl group having from 1 to 4 carbon atoms, and (ii) a poly(oxyalkylene) acrylate and/or a poly(oxyalkylene) methacrylate.

3. A method comprising a step of simultaneously coating at least two coating solutions on the transparent support, the at least two coating solutions comprising a first coating solution which comprises a liquid crystalline compound, and a second coating solution which comprises a fluoroaliphatic group-containing copolymer, wherein the viscosity of the second coating solution containing the fluoroaliphatic group-containing copolymer is lower than the viscosity of the first coating solution containing the liquid crystalline compound, the fluoroaliphatic group-containing copolymer containing a repeating unit derived from the following monomer (i), a repeating unit derived from the following monomer (ii) and a repeating unit derived from the following monomer (iii):

(i) a fluoroaliphatic group-containing monomer represented by the following formula [1]:

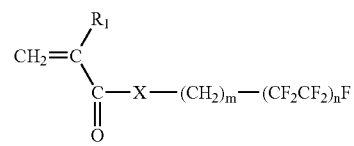

wherein $R_1$ represents a hydrogen atom or a methyl group, X represents an oxygen atom, a sulfur atom or $-N(R_2)-$, m represents an integer of 1 to 6, n represents an integer of 2 to 4, and $R_2$ represents a hydrogen atom or an alkyl group having from 1 to 4 carbon atoms, (ii) a poly(oxyalkylene) acrylate and/or a poly(oxyalkylene) methacrylate, and (iii) a monomer copolymerizable with (i) and (ii) and represented by the following formula [2]:

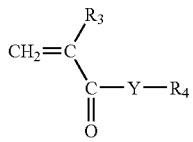

[2]

wherein $R_3$ represents a hydrogen atom or a methyl group, Y represents a divalent linking group, and $R_4$ represents a linear, branched or cyclic alkyl group having from 4 to 20 carbon atoms, which may have a substituent.

4. An optical compensating sheet produced by a method comprising a step of simultaneously coating at least two coating solutions on a transparent support, wherein the optical compensating sheet comprises: an optically anisotropic layer formed from a first coating solution which comprises a liquid crystalline compound, and a surfactant layer constituting an upper layer of the optically an isotropic layer, formed from a second coating solution which comprises a surface active agent comprising a fluoroaliphatic group-containing copolymer that comprises a repeating unit derived from a poly(oxyalkylene)acrylate and/or a poly(oxyalkylene)methacrylate, wherein the viscosity of the second coating solution containing the fluoroaliphatic group-containing copolymer is lower than the viscosity of the first coating solution containing the liquid crystalline compound.

5. A polarizing plate comprising the optical compensating sheet claimed in claim 4.

6. A liquid crystal display device comprising a liquid crystal cell and two polarizing plates disposed on both sides of the liquid crystal cell, wherein at least one of the polarizing plates is the polarizing plate claimed in claim 5.

7. The liquid crystal display device as claimed in claim 6, wherein the liquid crystal cell is a TN-mode, bend alignment-mode or vertical alignment-mode liquid crystal cell.

8. A liquid crystal display device comprising the optical compensating sheet claimed in claim 4.

9. A polarizing plate comprising a polarizing film and protective films disposed on both sides of the polarizing film, wherein one of the protective films is an optical compensating sheet having an optically anisotropic layer comprising a liquid crystalline compound, and said optical compensating sheet is the optical compensating sheet claimed in claim 4.

10. A liquid crystal display device comprising a liquid crystal cell and two polarizing plates disposed on the both sides of the liquid crystal cell, wherein at least one of the polarizing plates is the polarizing plate claimed in claim 9.

11. The liquid crystal display device as claimed in claim 10, wherein the liquid crystal cell is a TN-mode, bend alignment-mode or vertical alignment-mode liquid crystal cell.

12. An optical film comprising a support having thereon an optically anisotropic layer comprising a liquid crystalline compound and a surfactant layer that constitutes an upper layer of the optically anisotropic layer, the surfactant layer comprising a fluoroaliphatic group-containing copolymer, wherein said fluoroaliphatic group- containing copolymer comprises a repeating unit derived from the following monomer (i) and a repeating unit derived from the following monomer (ii):

(i) a fluoroaliphatic group-containing monomer represented by the following formula [1], and (ii) a poly(oxyalkylene) acrylate and/or a poly(oxyalkylene) methacrylate,

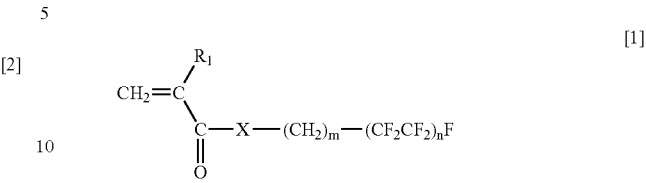

[1]

wherein $R_1$ represents a hydrogen atom or a methyl group, X represents an oxygen atom, a sulfur atom or $-N(R_2)-$, m represents an integer of 1 to 6, n represents an integer of 2 to 4, and $R_2$ represents a hydrogen atom or an alkyl group having from 1 to 4 carbon atoms, and wherein the optical film is produced by a method comprising a step of simultaneously coating at least two coating solutions on the transparent support, the at least two coating solutions comprising a first coating solution which comprises the liquid crystalline compound, and a second coating solution which comprises the fluoroaliphatic group-containing copolymer, wherein the viscosity of the second coating solution containing the fluoroaliphatic group-containing copolymer is lower than the viscosity of the first coating solution containing the liquid crystalline compound.

13. The optical film as claimed in claim 12, wherein said optically anisotropic layer comprises a fluoroaliphatic group-containing copolymer containing a repeating unit derived from the following monomer (i), a repeating unit derived from the following monomer (ii) and a repeating unit derived from the following monomer (iii):

(i) a fluoroaliphatic group-containing monomer represented by formula [1], (ii) a poly(oxyalkylene) acrylate and/or a poly(oxyalkylene) methacrylate, and (iii) a monomer copolymerizable with (i) and (ii) and represented by the following formula [2]:

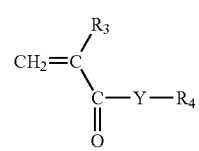

[2]

wherein $R_3$ represents a hydrogen atom or a methyl group, Y represents a divalent linking group, and $R_4$ represents a linear, branched or cyclic alkyl group having from 4 to 20 carbon atoms, which may have a substituent.

14. The optical film as claimed in claim 12, wherein said liquid crystalline compound is a discotic compound.

15. A polarizing plate comprising the optical film claimed in claim 12.

16. A liquid crystal display device comprising a liquid crystal cell and two polarizing plates disposed on both sides of the liquid crystal cell, wherein at least one of the polarizing plates is the polarizing plate claimed in claim 15.

17. The liquid crystal display device as claimed in claim 16, wherein the liquid crystal cell is a TN-mode, bend alignment-mode or vertical alignment-mode liquid crystal cell.

18. A liquid crystal display device comprising the optical compensating sheet claimed in claim 12.

\* \* \* \* \*